US011140084B2

(12) United States Patent
Hall et al.

(10) Patent No.: US 11,140,084 B2
(45) Date of Patent: Oct. 5, 2021

(54) TCP/UDP ACCELERATION

(71) Applicant: Oracle America Inc., Redwood City, CO (US)

(72) Inventors: Howard Hall, Groton, MA (US); Ilia Sokolinski, Brighton, MA (US); Milan Merhar, Brookline, MA (US)

(73) Assignee: ORACLE AMERICA, INC., Redwood City, CA (US)

(*) Notice: Subject to any disclaimer, the term of this patent is extended or adjusted under 35 U.S.C. 154(b) by 643 days.

(21) Appl. No.: 15/488,113

(22) Filed: Apr. 14, 2017

(65) Prior Publication Data

US 2017/0237668 A1 Aug. 17, 2017

Related U.S. Application Data

(60) Continuation of application No. 14/459,539, filed on Aug. 14, 2014, now Pat. No. 9,639,553, which is a division of application No. 10/415,330, filed as application No. PCT/US01/45772 on Nov. 2, 2001, now Pat. No. 8,949,471.

(60) Provisional application No. 60/301,378, filed on Jun. 27, 2001, provisional application No. 60/245,295, filed on Nov. 2, 2000.

(51) Int. Cl.

| | |
|---|---|
| ***H04L 12/801*** | (2013.01) |
| ***H04L 29/06*** | (2006.01) |
| ***G06F 16/178*** | (2019.01) |
| ***G06F 16/182*** | (2019.01) |
| ***H04L 12/851*** | (2013.01) |
| ***H04L 12/833*** | (2013.01) |
| ***H04L 12/803*** | (2013.01) |
| ***H04L 12/855*** | (2013.01) |
| ***H04L 12/911*** | (2013.01) |
| *H04L 12/931* | (2013.01) |

(52) U.S. Cl.

CPC .......... *H04L 47/193* (2013.01); *G06F 16/178* (2019.01); *G06F 16/183* (2019.01); *H04L 29/06* (2013.01); *H04L 47/125* (2013.01); *H04L 47/2458* (2013.01); *H04L 47/2466* (2013.01); *H04L 47/2483* (2013.01); *H04L 47/726* (2013.01); *H04L 69/10* (2013.01); *H04L 69/16* (2013.01); *H04L 69/165* (2013.01); *H04L 49/00* (2013.01)

(58) Field of Classification Search

CPC ........ H04L 47/193; H04L 69/10; H04L 69/16

See application file for complete search history.

(56) References Cited

U.S. PATENT DOCUMENTS 4,630,262 A * 12/1986 Callens .................. H04L 12/64 370/352
5,249,292 A * 9/1993 Chiappa ................. H04L 29/06 370/392
5,450,578 A * 9/1995 Mackenthun ....... G06F 11/2007 714/4.2

(Continued)

*Primary Examiner* — Asad M Nawaz
*Assistant Examiner* — Berhanu D Belete
(74) *Attorney, Agent, or Firm* — Snell & Wilmer LLP; Kent A. Lembke

(57) ABSTRACT

A method for accelerating TCP/UDP packet switching. The method involves determining whether exception processing is necessary; if not, the packet is forwarded to a special stack for expedited processing. Packets requiring exception processing are forwarded to the conventional stack.

13 Claims, 48 Drawing Sheets

(56) References Cited

U.S. PATENT DOCUMENTS

| | | | | | |
|---|---|---|---|---|---|
| 5,598,410 | A * | 1/1997 | Stone | H04L 29/06 | 370/469 |
| 5,781,910 | A * | 7/1998 | Gostanian | G06F 11/202 | 707/610 |
| 5,881,229 | A * | 3/1999 | Singh | G06F 12/0875 | 709/203 |
| 5,887,146 | A * | 3/1999 | Baxter | G06F 11/2289 | 710/104 |
| 5,913,024 | A * | 6/1999 | Green | G06F 9/468 | 726/3 |
| 5,938,776 | A * | 8/1999 | Sicola | G06F 11/22 | 714/25 |
| 6,032,190 | A * | 2/2000 | Bremer | H04L 49/25 | 370/389 |
| 6,147,976 | A * | 11/2000 | Shand | H04L 29/12009 | 370/254 |
| 6,247,060 | B1 * | 6/2001 | Boucher | G06F 5/10 | 709/230 |
| 6,256,740 | B1 * | 7/2001 | Muller | H04L 29/12009 | 726/12 |
| 6,393,466 | B1 * | 5/2002 | Hickman | G06F 16/10 | 709/214 |
| 6,427,171 | B1 * | 7/2002 | Craft | H04L 29/06 | 709/230 |
| 6,434,620 | B1 * | 8/2002 | Boucher | H04L 29/06 | 709/230 |
| 6,601,101 | B1 * | 7/2003 | Lee | H04L 67/1008 | 709/202 |
| 6,711,607 | B1 * | 3/2004 | Goyal | G06F 9/5044 | 709/203 |
| 6,826,613 | B1 * | 11/2004 | Wang | G06F 3/0607 | 709/202 |
| 6,901,517 | B1 * | 5/2005 | Redmore | H04L 49/351 | 370/252 |
| 7,106,736 | B2 * | 9/2006 | Kalkunte | H04L 12/462 | 370/391 |
| 7,237,036 | B2 * | 6/2007 | Boucher | G06F 13/385 | 370/396 |
| 7,809,847 | B2 * | 10/2010 | Boucher | H04L 49/9073 | 709/230 |
| 2002/0009084 | A1 * | 1/2002 | Kalkunte | H04L 45/16 | 370/391 |
| 2003/0079033 | A1 * | 4/2003 | Craft | H04L 69/163 | 709/230 |
| 2004/0030745 | A1 * | 2/2004 | Boucher | H04L 29/06 | 709/203 |
| 2004/0117509 | A1 * | 6/2004 | Craft | H04L 67/10 | 709/250 |
| 2005/0141561 | A1 * | 6/2005 | Craft | H04L 69/163 | 370/474 |
| 2005/0144300 | A1 * | 6/2005 | Craft | H04L 49/9042 | 709/230 |
| 2005/0160139 | A1 * | 7/2005 | Boucher | H04L 67/34 | 709/203 |
| 2005/0204058 | A1 * | 9/2005 | Philbrick | H04L 29/06 | 709/238 |
| 2006/0075130 | A1 * | 4/2006 | Craft | G02B 7/36 | 709/230 |

* cited by examiner

NAS COHERENCY MANAGER

+ACTIVE : BOOL
-CURRENT SETS[fsid]
-JOINING SETS[fsid]
-CONFIGURED SETS[fsid]
-CHECKPOINT VALUES[fsid]

<<MIC AGENT>> +SET CONFIGURED SERVER SET INFO ()
<<MIC AGENT>> +NFS EXPORTS FILE CHANGE()
<<NAS AGENT>> +SERVER PRESENT(NAD id)()
<<LB AGENT>> +SERVER FAILURE(NAS id)()
<<MIC AGENT>> -GET STATUS OF CURRENT FILESYSTEM SERVER SET(fsid, & STATUS)()
<<INTERNAL>> -CREATE CURRENT FILESYSTEM SERVER SET(fsid)()
<<INTERNAL>> -ADD MEMBER TO CURRENT FILESYSTEM SERVER SET(fsid)()
<<INTERNAL>> -CHECKPOINT CURRENT FILESYSTEM SERVER SET(fsid)()
<<INTERNAL>> -ACTIVATE CURRENT FILESYSTEM SERVER SET(fsid)()
<<INTERNAL>> -PAUSE CURRENT FILESYSTEM SERVER SET(fsid)()
<<INTERNAL>> -CONTINUE CURRENT FILESYSTEM SERVER SET(fsid)()
<<INTERNAL>> -DEACTIVATE CURRENT FILESYSTEM SERVER SET(fsid)()

IXP LOAD BALANCER

-ID
-FORWARDING TABLE[fsid][inode]
-FILESYSTEM SERVERS[fsid]

<<NFS CLIENT AGENT>> +FORWARD INODE CREATE Op()
<<NFS CLIENT AGENT>> +FORWARD INDOE REMOVE Op()
<<NFS CLIENT AGENT>> +FORWARD MODIFY()
<<NFS CLIENT AGENT>> +FORWARD READ()
<<NCM AGENT>> +UPDATE SERVER SET(fsid, bitmask)()
<<NCM AGENT>> + ACTIVATE SERVER SET(fsid)()
<<NCM AGENT>> + PAUSE SERVER SET(fsid)()
<<NCM AGENT>> + CONTINUE SERVER SET(fsid)()
<<NCM AGENT>> +DEACTIVATE SERVER SET(fsid)()
<<INTERNAL>> -DETERMINE WHICH NAS(filehandle)()

NAS SERVER

-ID
-SERVER STATE
-NFS MODIFICATION SEQUENCE NUMBER[fsid]

<<LB AGENT>> +NFS WRITE OPERATION(fhandle, args)()
<<LB AGENT>> +NFS READ OPERATION(fhandle, args)()
<<NCM AGENT>> +GET FS CHECKPOINT VALUS(fsid, & value)()
<<NCM AGENT>> +CHECKPOINT FS(fsid, value)()
<<NCM AGENT>> +UPDATE EXPORTS FILE()
<<NCM AGENT>> + CREATE COPY BIT MAP(fsid)()
<<NCM AGENT>> + DELETE COPY BIT MAP(fsid)()
<<NCM AGENT>> + START COPY(fsid)()
<<NCM AGENT>> +ABORT COPY(fsid)()
<<NAS AGENT>> +COPY OBJECT(object)()
<<MIC AGENT>> +VOLUME OPERATION()
<<MIC AGENT>> +FILESYSTEM OPERATION()

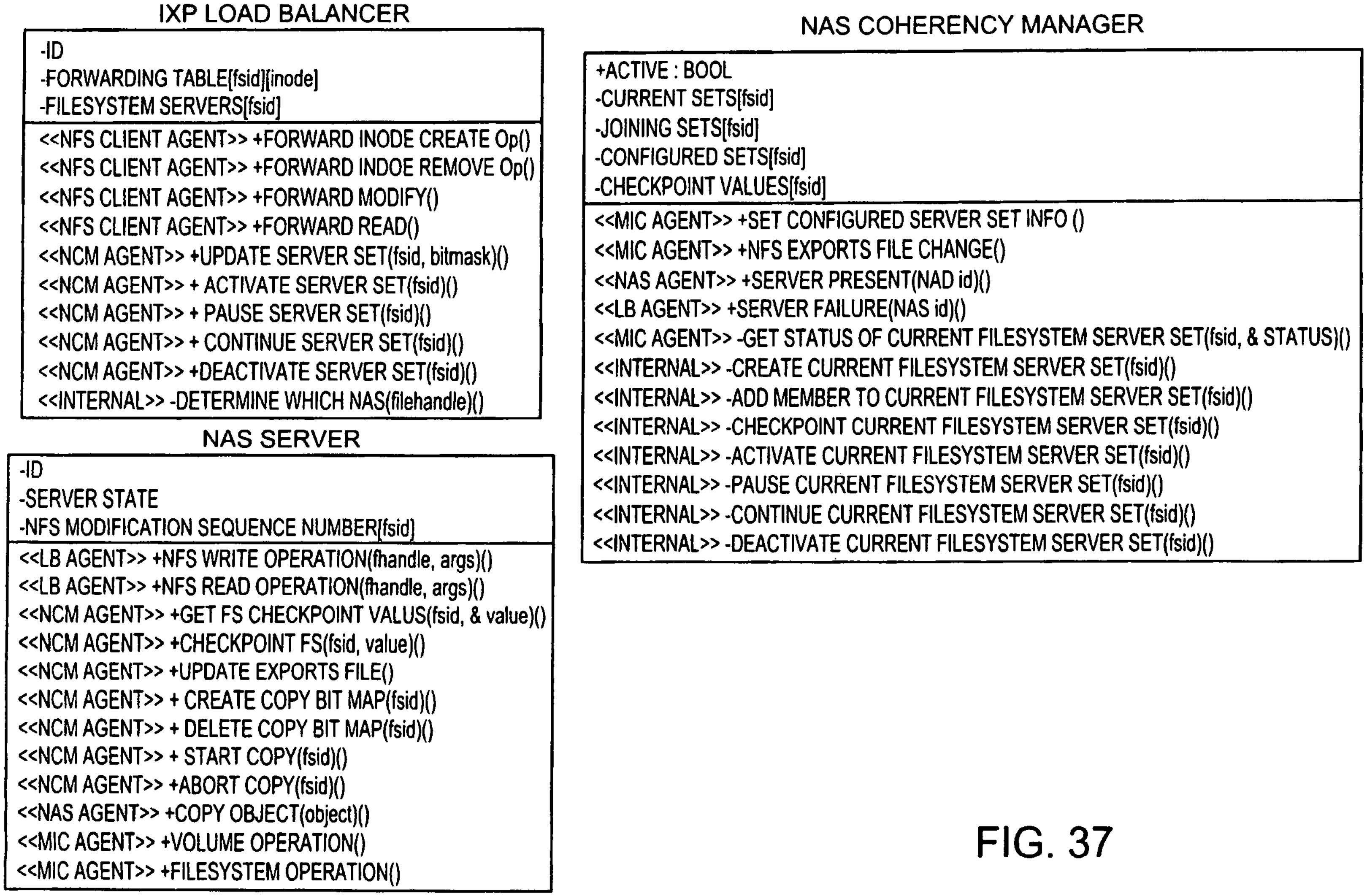

FIG. 37

TCP/UDP ACCELERATION

CROSS REFERENCE TO RELATED APPLICATIONS

This application is a continuation of U.S. Ser. No. 14/459,539, entitled "TCP/UDP ACCELERATION," and filed on Aug. 14, 2014, which is a divisional of U.S. Ser. No. 10/415,330, entitled "TCP/UDP ACCELERATION," and filed on Sep. 3, 2003, which is the National Stage of International Application No. PCT/US2001/045772, entitled "TCP/UDP ACCELERATION," and filed on Nov. 2, 2001, which claims priority to each of U.S. Ser. No. 60/301,378, entitled "TCP/UDP ACCELERATION METHODS AND SYSTEM," and filed on Jun. 27, 2001, and U.S. Ser. No. 60/245,295, entitled "STORAGE SYSTEM," and filed on Nov. 2, 2000; each of the above applications is incorporated herein in full as if set forth in its entirety.

FIELD OF THE INVENTION

The present invention relates to digital information processing, and particularly to methods, systems and protocols for managing storage in digital networks.

BACKGROUND OF THE INVENTION

The rapid growth of the Internet and other networked systems has accelerated the need for processing, transferring and managing data in and across networks.

In order to meet these demands, enterprise storage architectures have been developed, which typically provide access to a physical storage pool through multiple independent SCSI channels interconnected with storage via multiple front-end and back-end processors/controllers. Moreover, in data networks based on IP/Ethernet technology, standards have been developed to facilitate network management. These standards include Ethernet, Internet Protocol (IP), Internet Control Message Protocol (ICMP), Management Information Block (MIB) and Simple Network Management Protocol (SNMP). Network Management Systems (NMSs) such as HP Open View utilize these standards to discover and monitor network devices. Examples of networked architectures are disclosed in the following patent documents, the disclosures of which are incorporated herein by reference:

U.S. Pat. No. 5,941, 972 Crossroads Systems, Inc.
U.S. Pat. No. 6,000,020 Gadzoox Network, Inc.
U.S. Pat. No. 6,041,381 Crossroads Systems, Inc.
U.S. Pat. No. 6,061,358 McData Corporation
U.S. Pat. No. 6,067,545 Hewlett-Packard Company
U.S. Pat. No. 6,118,776 Vixel Corporation
U.S. Pat. No. 6,128,656 Cisco Technology, Inc.
U.S. Pat. No. 6,138,161 Crossroads Systems, Inc.
U.S. Pat. No. 6,148,421 Crossroads Systems, Inc.
U.S. Pat. No. 6,151,331 Crossroads Systems, Inc.
U.S. Pat. No. 6,199,112 Crossroads Systems, Inc.
U.S. Pat. No. 6,205,141 Crossroads Systems, Inc.
U.S. Pat. No. 6,247,060 Alacritech, Inc.
WO 01/59966 Nishan Systems, Inc.

Conventional systems, however, do not enable seamless connection and interoperability among disparate storage platforms and protocols. Storage Area Networks (SANs) typically use a completely different set of technology based on Fibre Channel (FC) to build and manage storage networks. This has led to a "re-inventing of the wheel" in many cases. Users are often require to deal with multiple suppliers of routers, switches, host bus adapters and other components, some of which are not well-adapted to communicate with one another. Vendors and standards bodies continue to determine the protocols to be used to interface devices in SANs and NAS configurations; and SAN devices do not integrate well with existing IP-based management systems.

Still further, the storage devices (Disks, RAID Arrays, and the like), which are Fibre Channel attached to the SAN devices, typically do not support IP (and the SAN devices have limited IP support) and the storage devices cannot be discovered/managed by IP-based management systems. There are 2 essentially two sets of management products-one for the IP devices and one for the storage devices.

Accordingly, it is desirable to enable servers, storage and network-attached storage (NAS) devices, IP and Fibre Channel switches on storage-area networks (SAN), WANs or LANs to interoperate to provide improved storage data transmission across enterprise networks.

In addition, among the most widely used protocols for communications within and among networks, TCP/IP (TCP/internet Protocol) is the suite of communications protocols used to connect hosts on the Internet. TCP provides reliable, virtual circuit, end-to-end connections for transporting data packets between nodes in a network. Implementation examples are set forth in the following patent and other publications, the disclosures of which are incorporated herein by reference:

U.S. Pat. No. 5,260,942 IBM
U.S. Pat. No. 5,442,637 ATT
U.S. Pat. No. 5,566,170 Storage Technology Corporation
U.S. Pat. No. 5,598,410 Storage Technology Corporation
U.S. Pat. No. 5,598,410 Storage Technology Corporation
U.S. Pat. No. 6,006,259 Network Alchemy, Inc.
U.S. Pat. No. 6,018,530 Sham Chakravorty
U.S. Pat. No. 6,122,670 TSI Telsys, Inc.
U.S. Pat. No. 6,163, 812 IBM
U.S. Pat. No. 6,178,448 IBM "TCP/IP Illustrated Volume 2", Wright, Stevens;

"SCSI over TCP", IETF draft, IBM, CISCO, Sangate, February 2000;

"The SCSI Encapsulation Protocol (SEP)", IETF draft, Adaptec Inc., May 2000;

RFC 793 "Transmission Control Protocol", September 1981.

Although TCP is useful, it requires substantial processing by the system CPU, thus limiting throughput and system performance. Designers have attempted to avoid this limitation through various inter-processor communications techniques, some of which are described in the above-cited publications. For example, some have offloaded TCP processing tasks to an auxiliary CPU, which can reside on an intelligent network interface or similar device, thereby reducing load on the system CPU. However, this approach does not eliminate the problem, but merely moves it elsewhere in the system, where it remains a single chokepoint of performance limitation.

Others have identified separable components of TCP processing and implemented them in specialized hardware. These can include calculation or verification of TCP checksums over the data being transmitted, and the appending or removing of fixed protocol headers to or from such data. These approaches are relatively simple to implement in hardware to the extent they perform only simple, condition-invariant manipulations, and do not themselves cause a change to be applied to any persistent TCP state variables. However, while these approaches somewhat reduce system CPU load, they have not been observed to provide substantial performance gains.

Some required components of TCP, such as retransmission of a TCP segment following a timeout, are difficult to implement in hardware, because of their complex and condition-dependent behavior. For this reason, systems designed to perform substantial TCP processing in hardware often include a dedicated CPU capable of handling these exception conditions. Alternatively, such systems may decline to handle TCP segment retransmission or other complex events and instead defer their processing to the system CPU.

However, a major difficulty in implementing such "fast path/slow path" solutions is ensuring that the internal state of the TCP connections, which can be modified as a result of performing these operations, is consistently maintained, whether the operations are performed by the "fast path" hardware or by the "slow path" system CPU.

It is therefore desirable to provide methods, devices and systems that simplify and improve these operations.

It is also desirable to provide methods, devices and systems that simplify management of storage in digital networks, and enable flexible deployment of NAS, SAN and other storage systems, and Fibre Channel (FC), IP/Ethernet and other protocols, with storage subsystem and location independence.

SUMMARY OF THE INVENTION

The invention addresses the noted problems typical of prior art systems, and in one aspect, provides a switch system having a first configurable set of processor elements to process storage resource connection requests, a second configurable set of processor elements capable of communications with the first configurable set of processor elements to receive, from the first configurable set of processor elements, storage connection requests representative of client requests, and to route the requests to at least one of the storage elements, and a configurable switching fabric interconnected between the first and second sets of processor elements, for receiving at least a first storage connection request from one of the first set of processor elements, determining an appropriate one of the second set of processors for processing the storage connection request, automatically configuring the storage connection request in accordance with a protocol utilized by the selected one of the second set of processors, and forwarding the storage connection request to the selected one of the second set of processors for routing to at least one of the storage elements.

Another aspect of the invention provides methods, systems and devices for enabling data replication under NFS servers.

A further aspect of the invention provides mirroring of NFS servers using a multicast function.

Yet another aspect of the invention provides dynamic content replication under NFS servers.

In another aspect, the invention provides load balanced NAS using a hashing or similar function, and dynamic data grooming and NFS load balancing across NFS servers.

The invention also provides, in a further aspect, domain sharing across multiple FC switches, and secure virtual storage domains (SVSD).

Still another aspect of the invention provides TCP/UDP acceleration, with IP stack bypass using a network processors (NP). The present invention simultaneously maintaining TCP state information in both the fast path and the slow path. Control messages are exchanged between the fast path and slow path processing engines to maintain state synchronization, and to hand off control from one processing engine to another. These control messages can be optimized to require minimal processing in the slow path engines (e.g., system CPU) while enabling efficient implementation in the fast path hardware.

This distributed synchronization approach significantly accelerates TCP processing, but also provides additional benefits, in that it permits the creation of more robust systems.

The invention, in another aspect, also enables automatic discovery of SCSI devices over an IP network, and mapping of SNMP requests to SCSI.

In addition, the invention also provides WAN mediation caching on local devices.

Each of these aspects will next be described in detail, with reference to the attached drawing figures.

BRIEF DESCRIPTION OF THE DRAWINGS

FIG. 37 depicts server classes.

DETAILED DESCRIPTION

I. Overview

Figure 1:
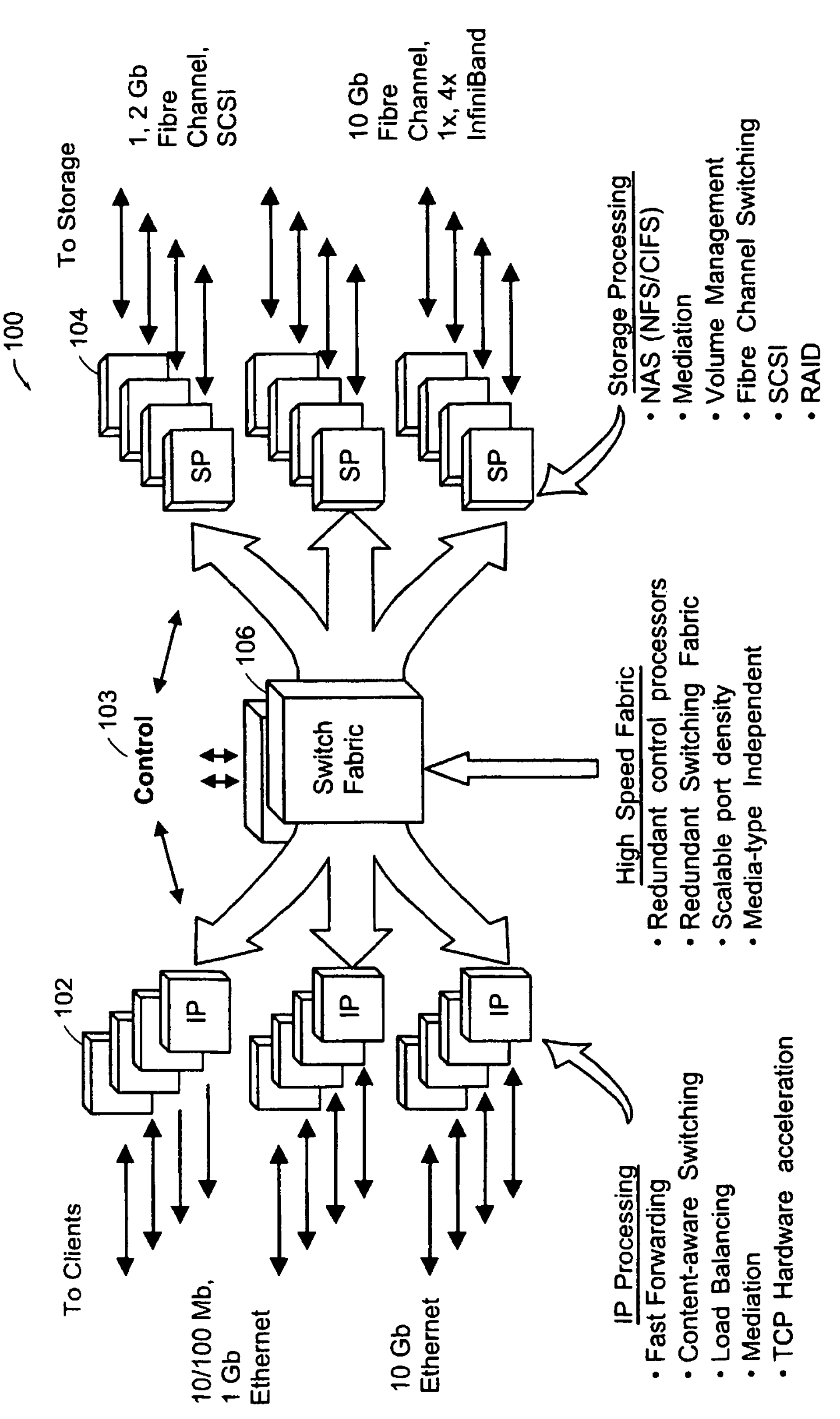
FIG. 1 depicts a hardware architecture of one embodiment of the switch system aspect of the invention.

FIG. 1 depicts the hardware architecture of one embodiment of a switch system according to the invention. As shown therein, the switch system 100 is operable to interconnect clients and storage. As discussed in detail below, storage processor elements 104 (SPs) connect to storage; IP processor elements 102 (IP) connect to clients or other devices; and a high speed switch fabric 106 interconnects the IP and SP elements, under the control of control elements 103.

The IP processors provide content-aware switching, load balancing, mediation, TCP/UDP hardware acceleration, and fast forwarding, all as discussed in greater detail below. In one embodiment, the high speed fabric comprises redundant control processors and a redundant switching fabric, provides salable port density and is media-independent. As described below, the switch fabric enables media-independent module interconnection, and supports low-latency Fibre Channel (F/C) switching. In an embodiment of the invention commercially available from the assignee of this application, the fabric maintains QoS for Ethernet traffic, is salable from 16 to 256 Gbps, and can be provisioned as fully redundant switching fabric with fully redundant control processors, ready for 10 Gb Ethernet, InfiniBand and the like. The SPs support NAS (NFS/CIFS), mediation, volume management, Fibre Channel (F/C) switching, SCSI and RAID services.

Figure 2:
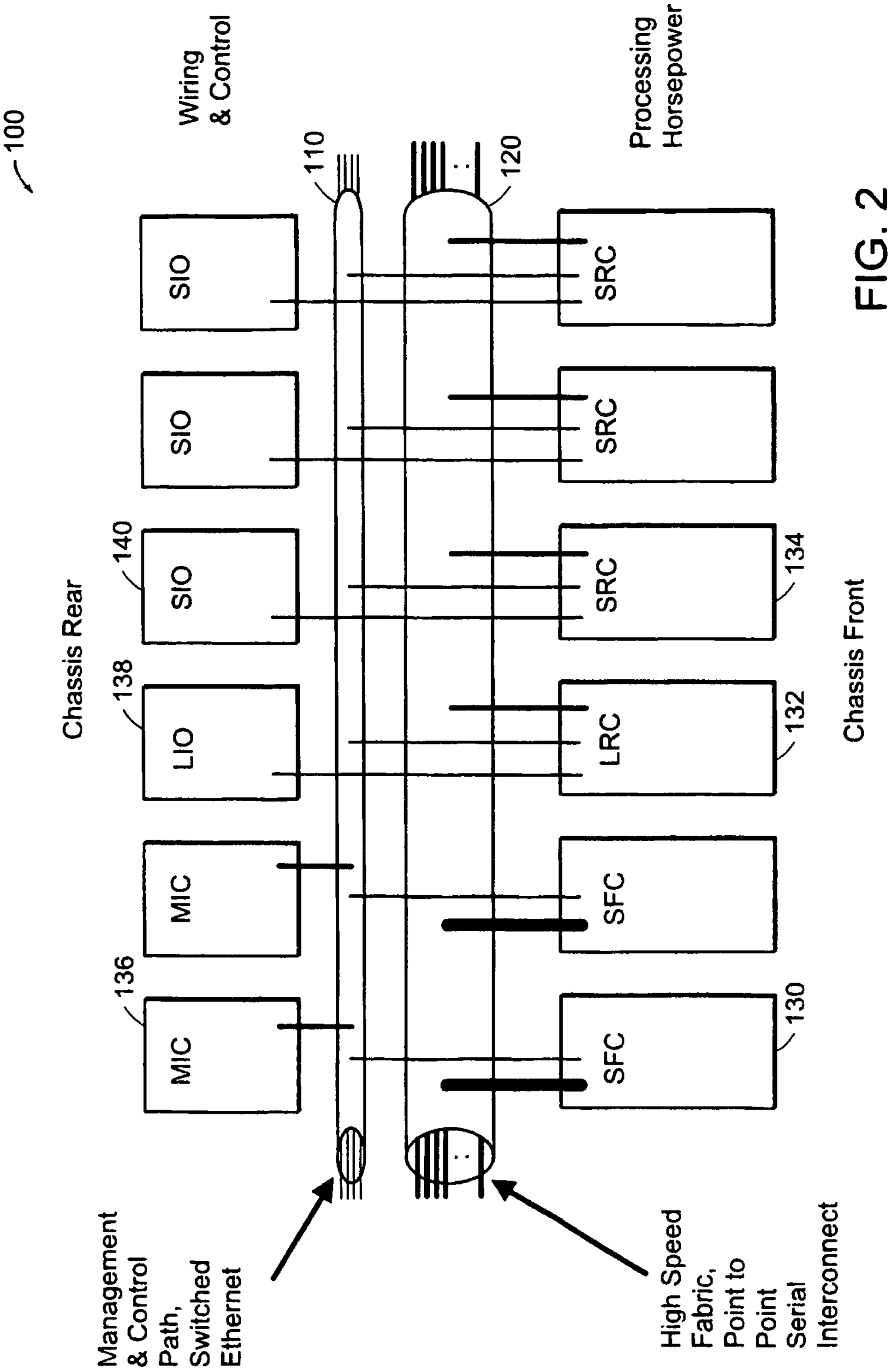
FIG. 2 depicts interconnect architecture useful in the embodiment of FIG. 1.

FIG. 2 depicts an interconnect architecture adapted for use in the switching system 100 of FIG. 1. As shown therein, the architecture includes multiple processors interconnected by dual paths 110,120. Path 110 is a management and control path adapted for operation in accordance with switched Ethernet. Path 120 is a high speed switching fabric, supporting a point to point serial interconnect. Also as shown in FIG. 2, front-end processors include SFCs 130, LAN Resource Cards (LRCs) 132, and Storage Resource Cards (SRCs) 134, which collectively provide processing power for the functions described below. Rear-end processors include MICs 136, LIOs 138 and Slows 140, which collectively provide wiring and control for the functions described below.

In particular, the LRCs provide interfaces to external LANs, servers, WANs and the like (such as by 4 × Gigabit Ethernet or 32×10/100 Base-T Ethernet interface adapters); perform load balancing, content-aware switching of internal services; implement storage mediation protocols; and provide TCP hardware acceleration.

Figure 3:
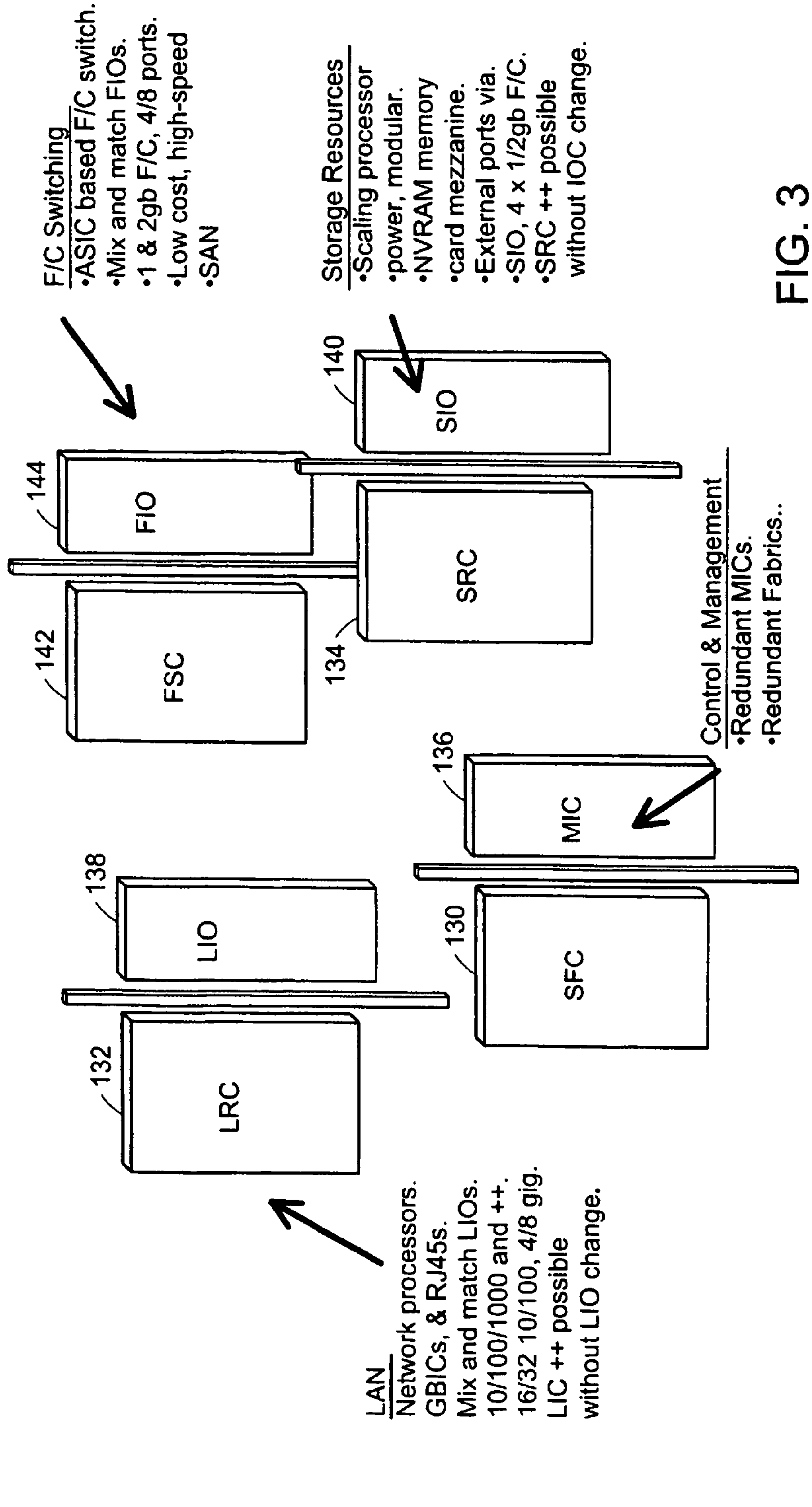
FIG. 3 depicts processing and switching modules.

The SRCs interface to external storage or other devices (such as via Fibre Channel, 1 or 2 Gbps, FC-AL or FC-N) As shown in FIG. 3, LRCs and LIOs are network processors providing LAN-related functions. They can include GBICs and RJ45 processors. MICs provide control and management. As discussed below, the switching system utilizes redundant MICs and redundant fabrics. The FIOs shown in FIG. 3 provide F/C switching. These modules can be commercially available ASIC- based F/C switch elements, and collectively enable low cost, high-speed SAN using the methods described below.

Figure 4:
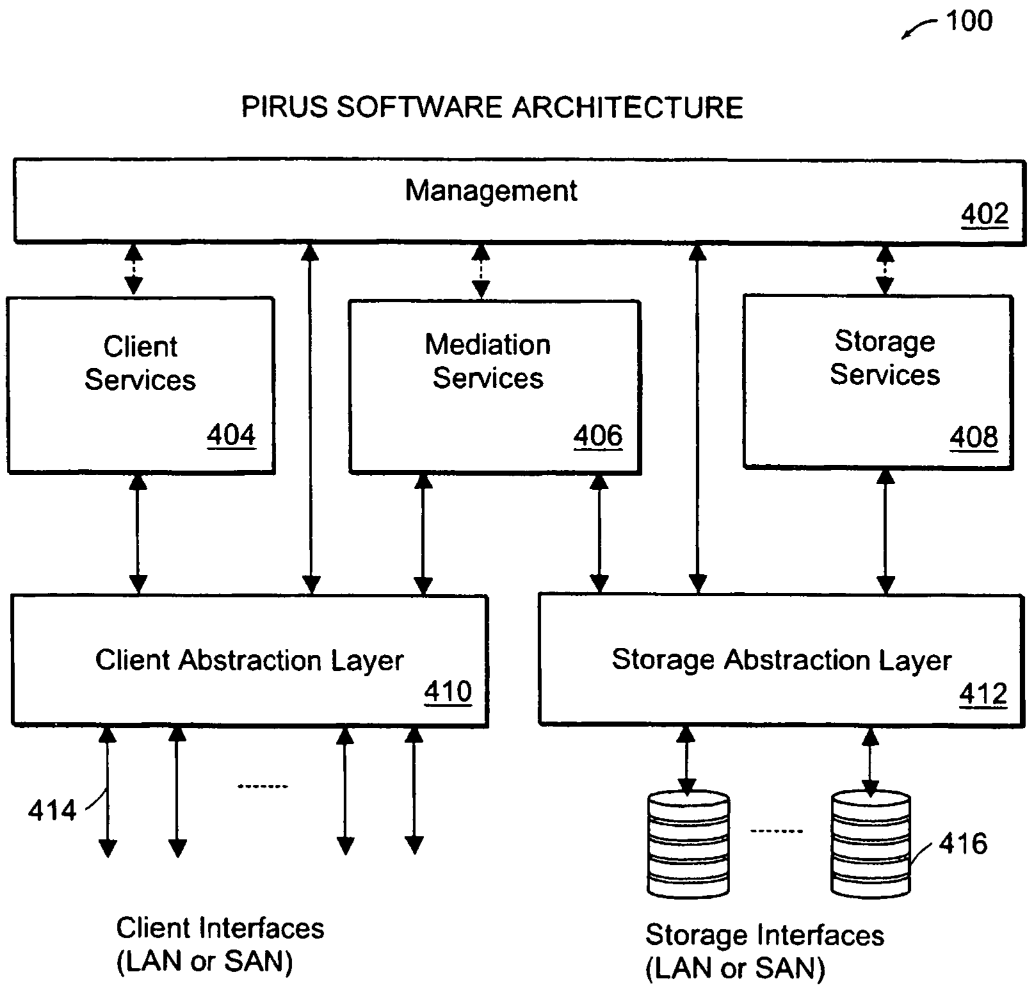
FIG. 4 depicts software architecture in accordance with one embodiment of the invention.

FIG. 4 depicts a software architecture adapted for use in an embodiment of switching system 100, wherein a management layer 402 interconnects with client services 404, mediation services 406, storage services 408, a client abstraction layer 410, and a storage abstraction layer 412. In turn, the client abstraction layer interconnects with client interfaces (LAN, SAN or other) 414, and the storage abstraction layer interconnects with storage devices or storage interfaces (LAN, SAN or other) 416.

The client abstraction layer isolates, secures, and protects internal resources; enforces external group isolation and user authentication; provides firewall access security; supports redundant network access with fault failover, and integrates IP routing and multiport LAN switching. It addition, it presents external clients with virtual service" abstraction of internal services, so that there is no need to reconfigure clients when services are changed. Further, it provides internal services a consistent network interface, wherein service configuration is independent of network connectivity, and there is no impact from VLAN topology, multihoming or peering.

Figure 5:
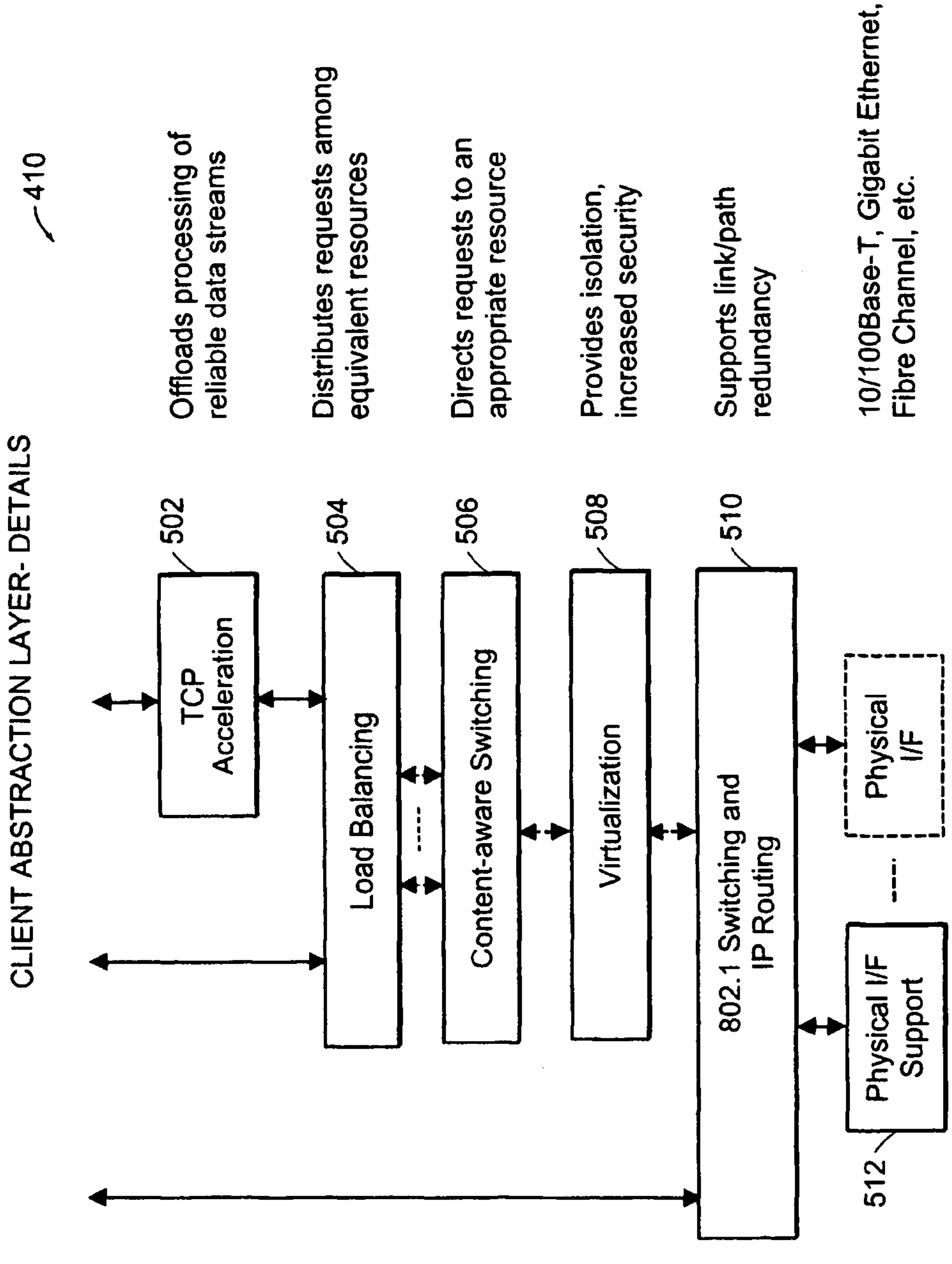
FIG. 5 depicts detail of the client abstraction layer.

FIG. 5 provides detail of the client abstraction layer. As shown therein, it can include TCP acceleration function 502 (which, among other activities, offloads processing reliable data streams); load balancing function 504 (which distributes requests among equivalent resources); content-aware switching 506 (which directs requests to an appropriate resource based on the contents of the requests/packets); virtualization function 508 (which provides isolation and increased security); 802.1 switching and IP routing function 510 (which supports link/path redundancy), and physical I/F support functions 512 (which can support 10/100 Base-T, Gigabit Ethernet, Fibre Channel and the like).

In addition, an internal services layer provides protocol mediation, supports NAS and switching and routing. In particular, in FISCS) applications the internal services layer uses TCP/IP or the like to provide LAN-attached servers with access to block-oriented storage; in FC/IP it interconnects Fibre Channel SAN"islands" across an Internet backbone; and in IP/FC applications it extends IP connectivity across Fibre Channel. Among NAS functions, the internal services layer includes support for NFS (industry-standard Network File Service, provided over UDP/IP (LAN) or TCP/IP (WAN); and CIFS (compatible with Microsoft Windows File Services, also known as SMB. Among switching and routing functions, the internal services layer supports Ethernet, Fibre Channel and the like.

Figure 6:
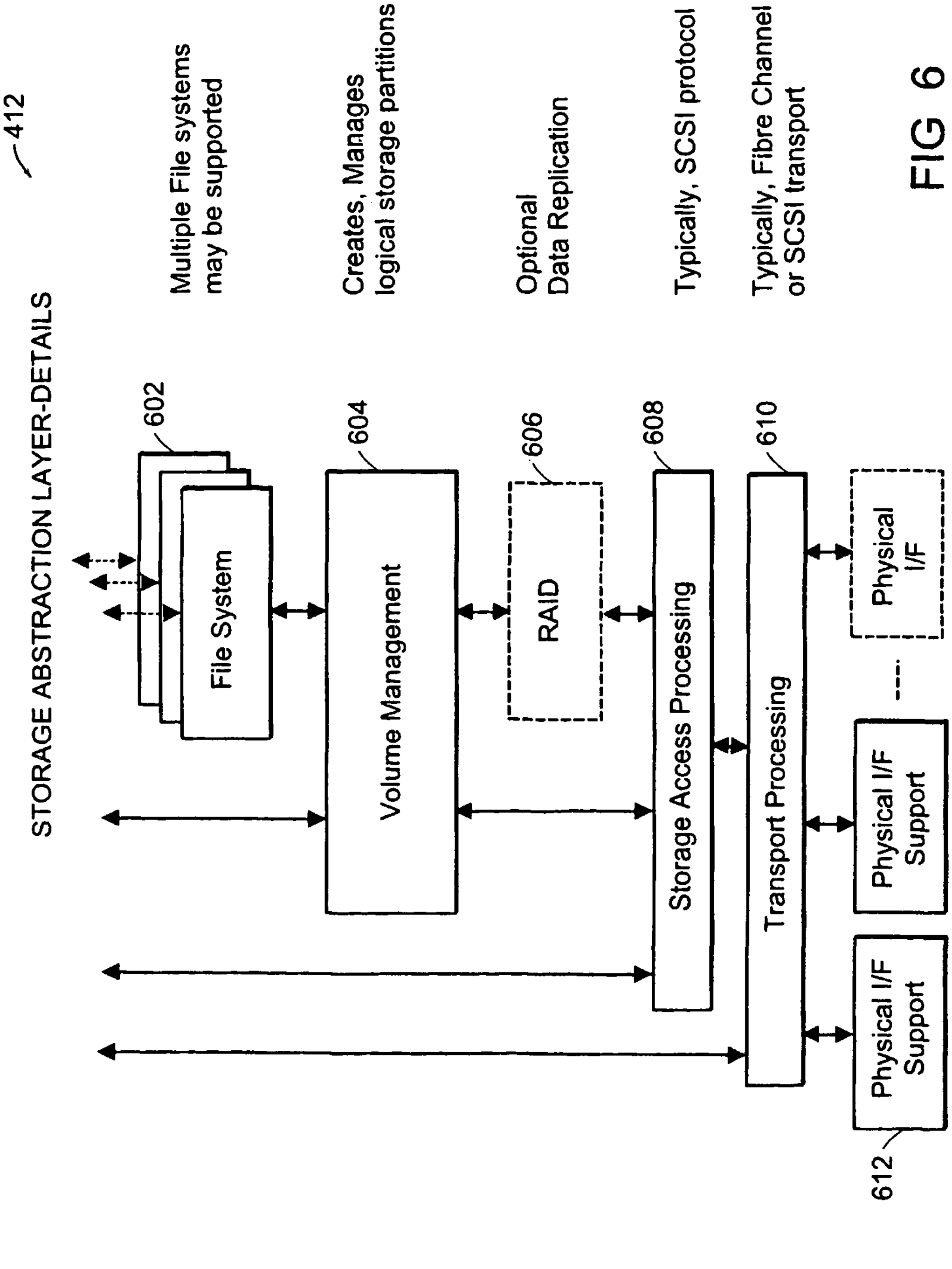
FIG. 6 depicts the storage abstraction layer.

The storage abstraction layer shown in FIG. 6 includes file system 602, volume management 604, RAID function 606, storage access processing 608, transport processing 610 an physical I/F support 612. File system layer 602 supports multiple file systems; the volume management layer creates and manages logical storage partitions; the RAID layer enables optional data replication; the storage access processing layer supports SCSI or similar protocols, and the transport layer is adapted for Fibre Channel or SCSI support. The storage abstraction layer consolidates external disk drives, storage arrays and the like into a sharable, pooled resource; and provides volume management that allows dynamically resizeable storage partitions to be created within the pool; RAID service that enables volume replication for data redundancy, improved performance; and file service that allows creation of distributed, sharable file systems on any storage partition.

A technical advantage of this configuration is that a single storage system can be used for both file and block storage access (NAS and SAN).

Figure 7:
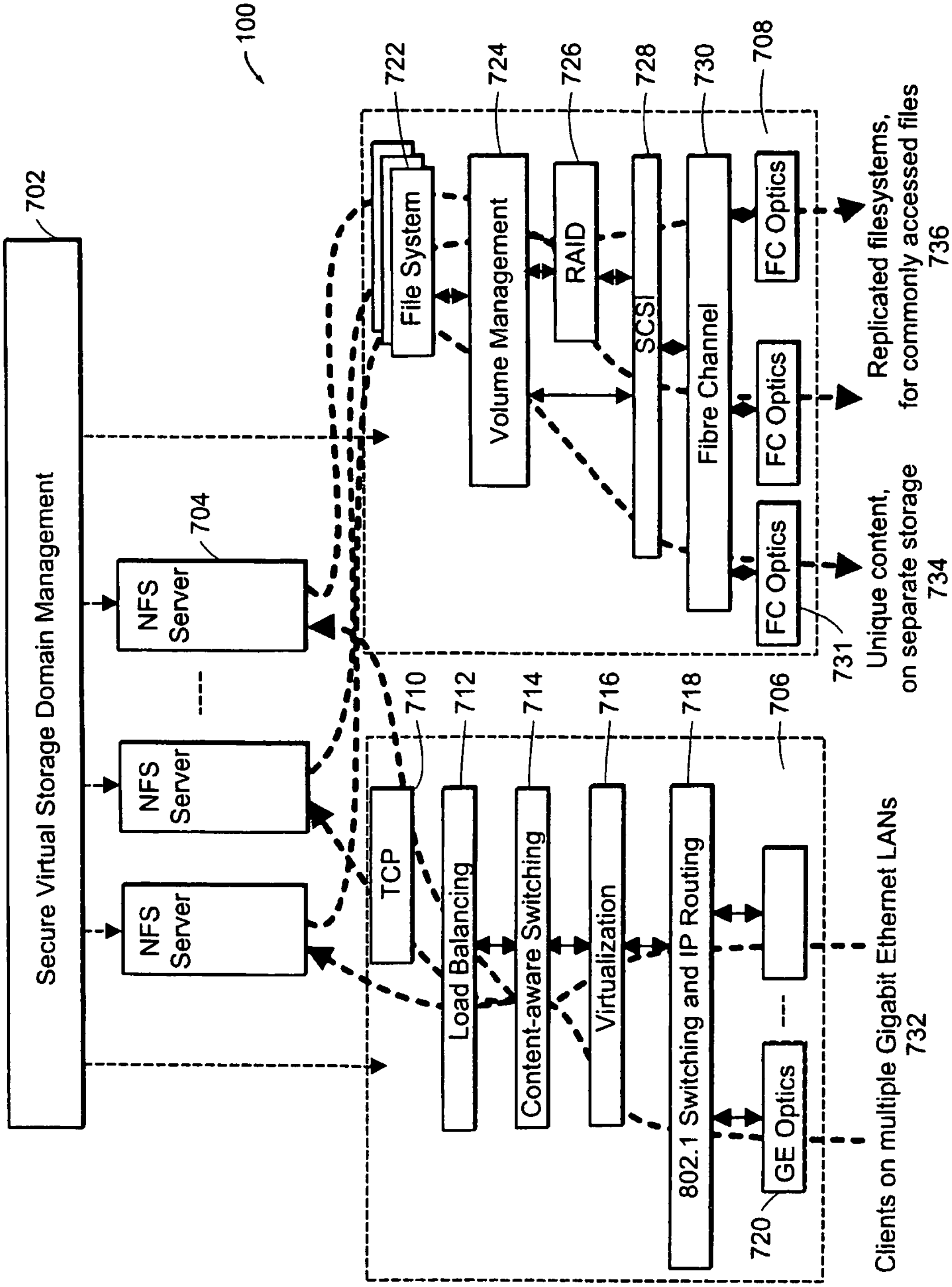
FIG. 7 depicts saleable NAS.
Figure 8:
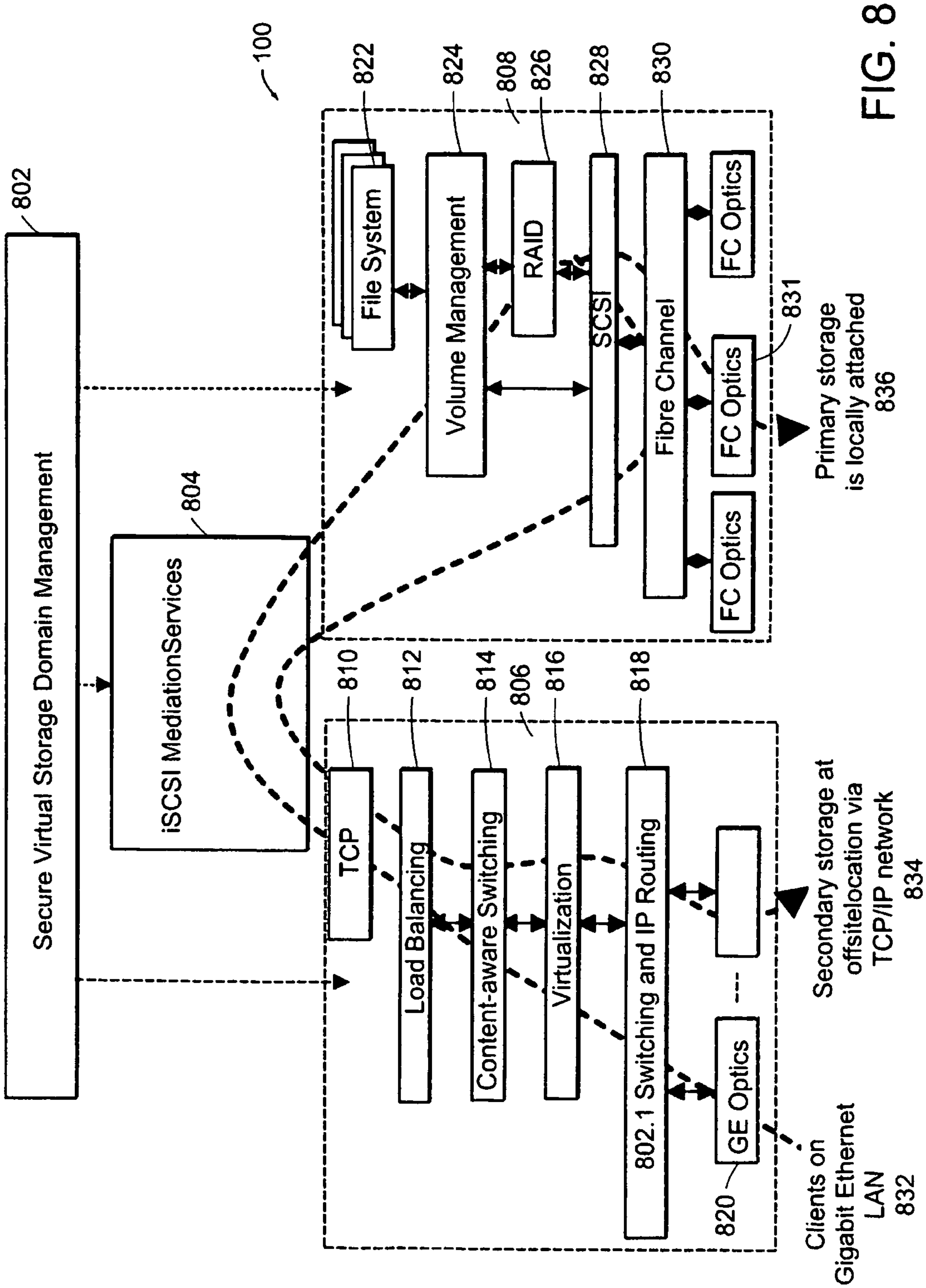
FIG. 8 depicts replicated local/remote storage.

FIGS. 7 and 8 depict examples of data flows through the switching system 100. (It will be noted that these configurations are provided solely by way of example, and that other configurations are possible.) In particular, as will be discussed in greater detail below, FIG. 7 depicts a saleable NAS example, while FIG. 8 depicts a replicated local/remote storage example. As shown in FIG. 7, the switch system 100 includes secure virtual storage domain (SVSD) management layer 702, NFS servers collectively referred to by numeral 704, and modules 706 and 708.

Gigabit module 706 contains TCP 710, load balancing 712, content-aware switching 714, virtualization 716,802. 1 switching and IP routing 718, and Gigabit (GV) optics collectively referred to by numeral 720.

FC module 708 contains file system 722, volume management 724, RAID 726, SCSI 728, Fibre Channel 730, and FC optics collectively referred to by numeral 731.

As shown in the saleable NAS example of FIG. 7, the switch system 100 connects clients on multiple Gigabit Ethernet LANs 732 (or similar) to (1) unique content on separate storage 734 and replicated filesystems for commonly accessed files 736. The data pathways depicted run from the clients, through the GB optics, 802.1 switching and IP routing, virtualization, content-aware switching, load balancing and TCP, into the NFS servers (under the control/configuration of SVSD management), and into the file system, volume management, RAID, SCSCI, Fibre Channel, and FC optics to the unique content (which bypasses RAID), and replicated filesystems (which flows through RAID).

Similar structures are shown in the replicated local/remote storage example of FIG. 8. However, in this case, the interconnection is between clients on Gigagbit Ethernet LAN (or similar) 832, secondary storage at an offsite location via a TCP/IP network 834, and locally attached primary storage 836. In this instance, the flow is from the clients, through the GB optics, 802.1 switching and IP routing, virtualization, content-aware switching, load: balancing and TCP, then through FISCS) mediation services 804 (under the control/configuration of SVSD management 802), then through volume management 824, and RAID 826. Then, one flow is from RAID 826 through SCSI 828, Fibre Channel 830 and FC Optics 831 to the locally attached storage 836; while another flow is from RAID 826 back to TCP 810, load balancing 812, content-aware switching 814, virtualization 816,802. 1 switching and IP routing 818 and GB optics 820 to secondary storage at an offsite location via a TCP/IP network 834.

II. Hardware/Software Architecture

This section provides an overview of the structure and function of the invention (alternatively referred to hereinafter as the "Pirus box"). In one embodiment, the Pirus box is a 6 slot, carrier class, high performance, multi-layer switch, architected to be the core of the data storage infrastructure. The Pirus box will be useful for ASPs (Application Storage Providers), SSPs (Storage Service Providers) and large enterprise networks. One embodiment of the Pirus box will support Network Attached Storage (NAS) in the form of NFS attached disks off of Fibre Channel ports. These attached disks are accessible via 10/100/1000 switched Ethernet ports. The Pirus box will also support standard layer 2 and Layer 3 switching with port-based VLAN support, and layer 3 routing (on unlearned addresses). RIP will be one routing protocol supported, with OSPF and others also to be supported. The Pirus box will also initiate and terminate a wide range of SCSI mediation protocols, allowing access to the storage media either via Ethernet or SCSI/FC. The box is manageable via a CLI, SNMP or an HTTP interface.

1. Software Architecture Overview

Figure 9:
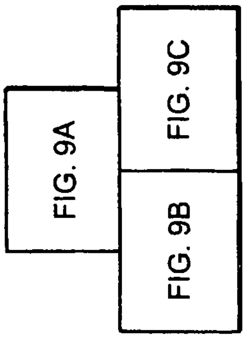
FIG. 9 depicts a software structure useful in one embodiment of the invention.
Figure 9A:
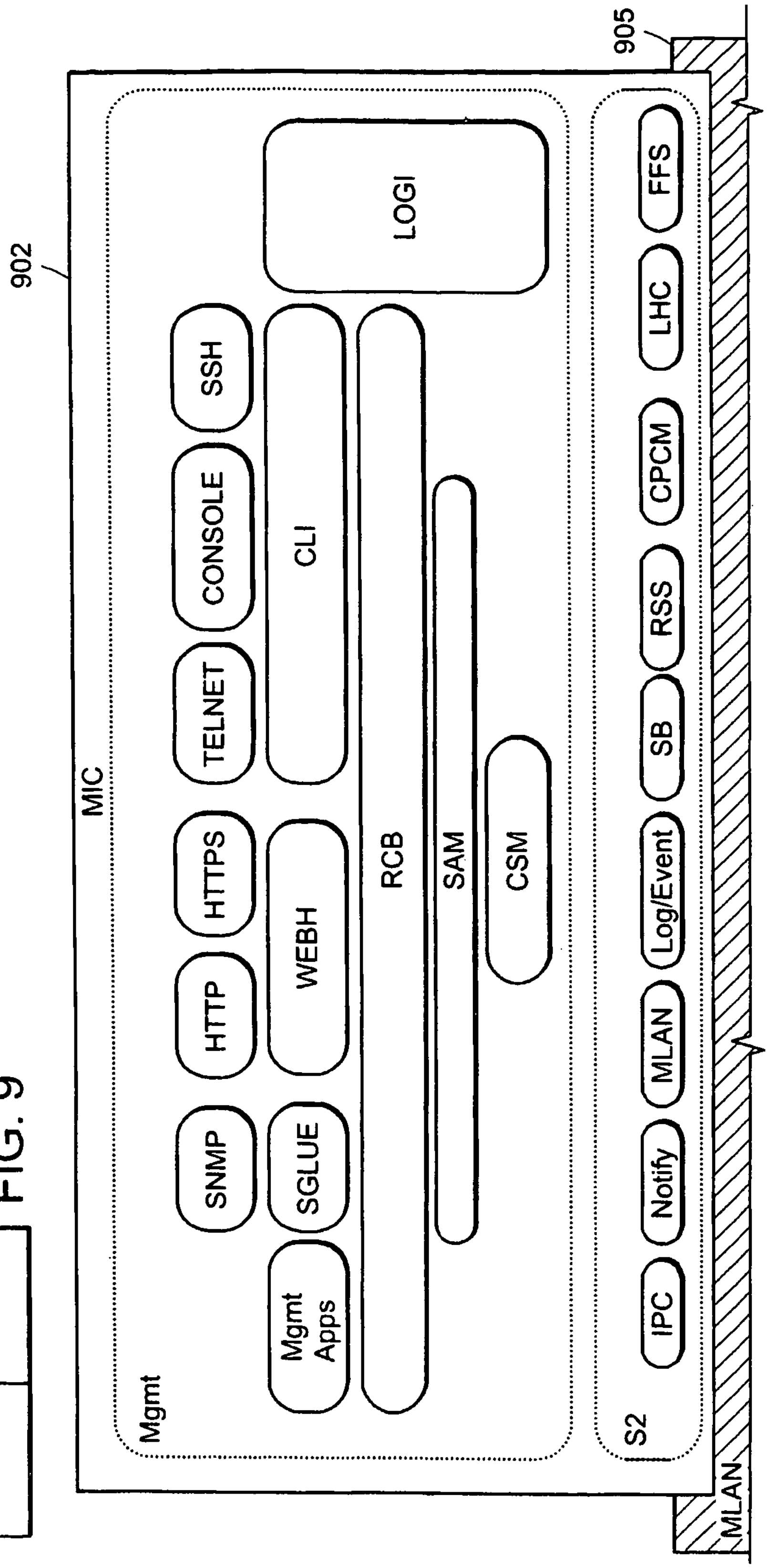
FIG. 9*a* depicts the MIC and MLAN components of FIG. 9
Figure 9B:
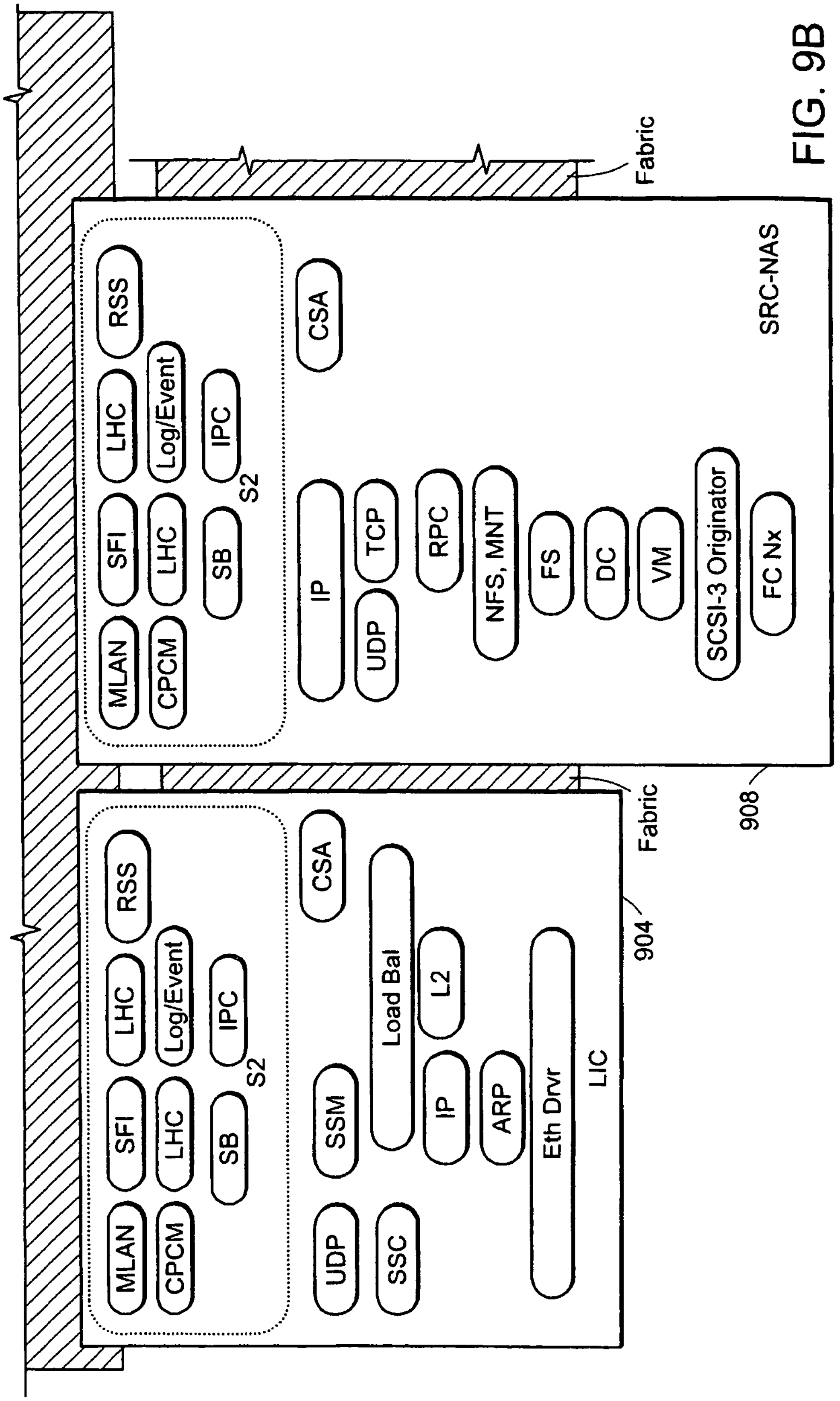
FIG. 9*b* depicts the MLAN, LIC and SRC-NAS and fabric components of FIG. 9
Figure 9C:
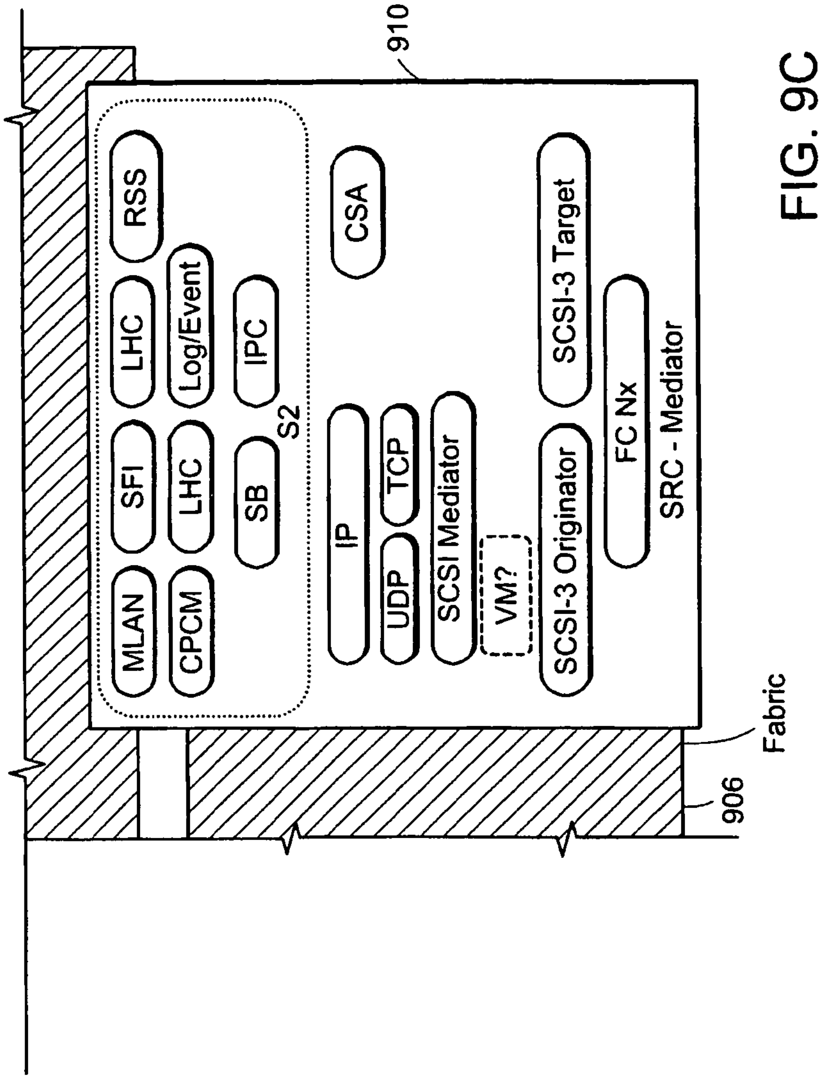
FIG. 9*c* depicts the SRC-Mediator component and fabric of FIG. 9

FIG. 9 is a block diagram illustrating the software modules used in the Pirus box (the terms of which are defined in the glossary set forth below). As shown in FIG. 9, the software structures correspond to MIC 902, LIC 904, SRC-NAS 908 and SRC-Mediator 910, interconnected by MLAN 905 and fabric 906. The operation of each of the components shown in the drawing is discussed below.

1.1 System Services

Figure 10:
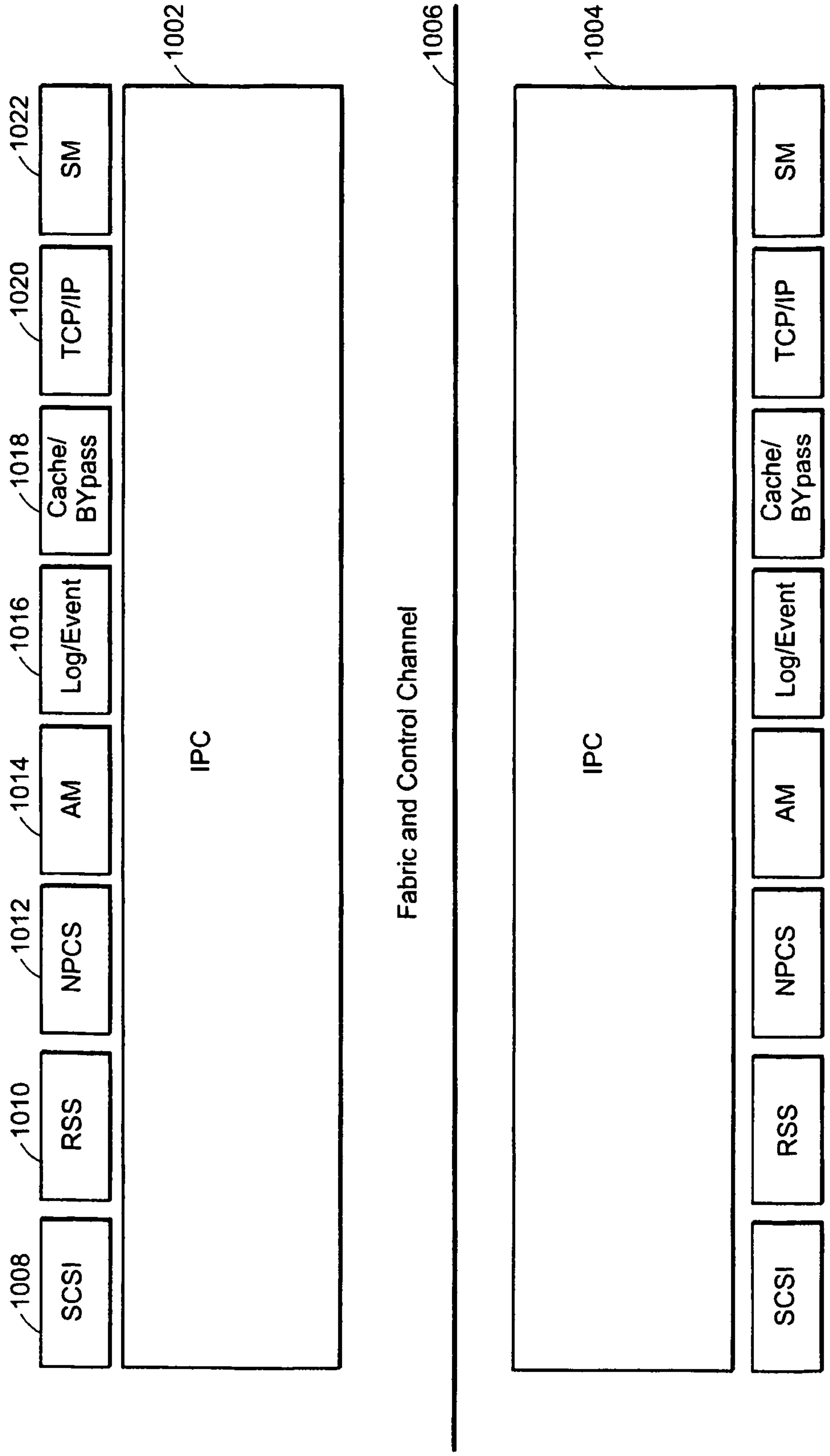
FIG. 10 depicts system services.

The term System Service is used herein to denote a significant function that is provided on every processor in every slot. It is contemplated that many such services will be provided; and that they can be segmented into 2 categories: 1) abstracted hardware services and 2) client/server services. The attached FIG. 10 is a diagram of some of the exemplary interfaces. As shown in FIG. 10, the system services correspond to IPCs 1002 and 1004 associated with fabric and control channel 1006, and with services SCSI 1008, RSS 1010, NPCS 1012, AM 1014, Log/Event 1016, Cache/Bypass 1018, TCP/IP 1020, and SM 1022.

1.1.1 SanStreaM (SSM) System Services (S2)

SSM system service can be defined as a service that provides a software API layer to application software while "hiding" the underlying hardware control. These services may add value to the process by adding protocol layering or robustness to the standard hardware functionality.

System services that are provided include:

Card Processor Control Manager (CPCM). This service provides a mechanism to detect and manage the issues involved in controlling a Network Engine Card (NEC) and its associated Network Processors (NP). They include insertion and removal, temperature control, crash management, loader, watchdog, failures etc.

Local Hardware Control (LHC). This controls the hardware local to the board itself. It includes LEDS, fans, and power.

Inter-Processor Communication (IPC). This includes control bus and fabric services, and remote UART.

1.1.2 SSM Application Service (AS)

Application services provide an API on top of SSM system services. They are useful for executing functionality remotely. Application Services include:

Remote Shell Service (RSS)-includes redirection of debug and other valuable info to any pipe in the system.

Statistics Provider-providers register with the stats consumer to provide the needed information such as mib read only attributes.

Network Processor Config Service (NPCS)-used to receive and process configuration requests.

Action Manager-used to send and receive requests to execute remote functionality such as rebooting, clearing stats and re-syncing with a file system.

Logging Service-used to send and receive event logging information.

Buffer Management-used as a fast and useful mechanism for allocating, typing, chaining and freeing message buffers in the system.

HTTP Caching/Bypass service-sub-system to supply an API and functional service for HTTP file caching and bypass. It will make the determination to cache a file, retrieve a cached file (on board or off), and bypass a file (on board or not). In addition this service will keep track of local cached files and their associated TTL, as well as statistics on file bypassing. It will also keep a database of known files and their caching and bypassing status. Multicast services-A service to register, send and receive multicast packets across the MLAN.

2. Management Interface Card

The Management Interface Card (MIC) of the Pirus box has a single high performance microprocessor and multiple 10/100 Ethernet interfaces for administration of the SANStream management subsystem. This card also has a PCMCIA device for bootstrap image and configuration storage.

In the illustrated embodiments, the Management Interface Card will not participate in any routing protocol or forwarding path decisions. The IP stack and services of VxWorks will be used as the underlying IP facilities for all processes on the MIC. The MIC card will also have a flash based, DOS file system.

The MIC will not be connected to the backplane fabric but will be connected to the MLAN (Management LAN) in order to send/receive data to/from the other cards in the system. The MLAN is used for all MIC g g"other cards" communications.

2.1. Management Software

Management software is a collection of components responsible for configuration, reporting (status, statistics, etc), notification (events) and billing data (accounting information). The management software may also include components that implement services needed by the other modules in the system.

Some of the management software components can exist on any processor in the system, such as the logging server. Other components reside only on the MIC, such as the WEB Server providing the WEB user interface.

The strategy and subsequent architecture must be flexible enough to provide a long-term solution for the product family. In other words, the 1.0 implementation must not preclude the inclusion of additional management features in subsequent releases of the product.

The management software components that can run on either the MIC or NEC need to meet the requirement of being able to"run anywhere" in the system.

2.2 Management Software Overview

Figure 11:
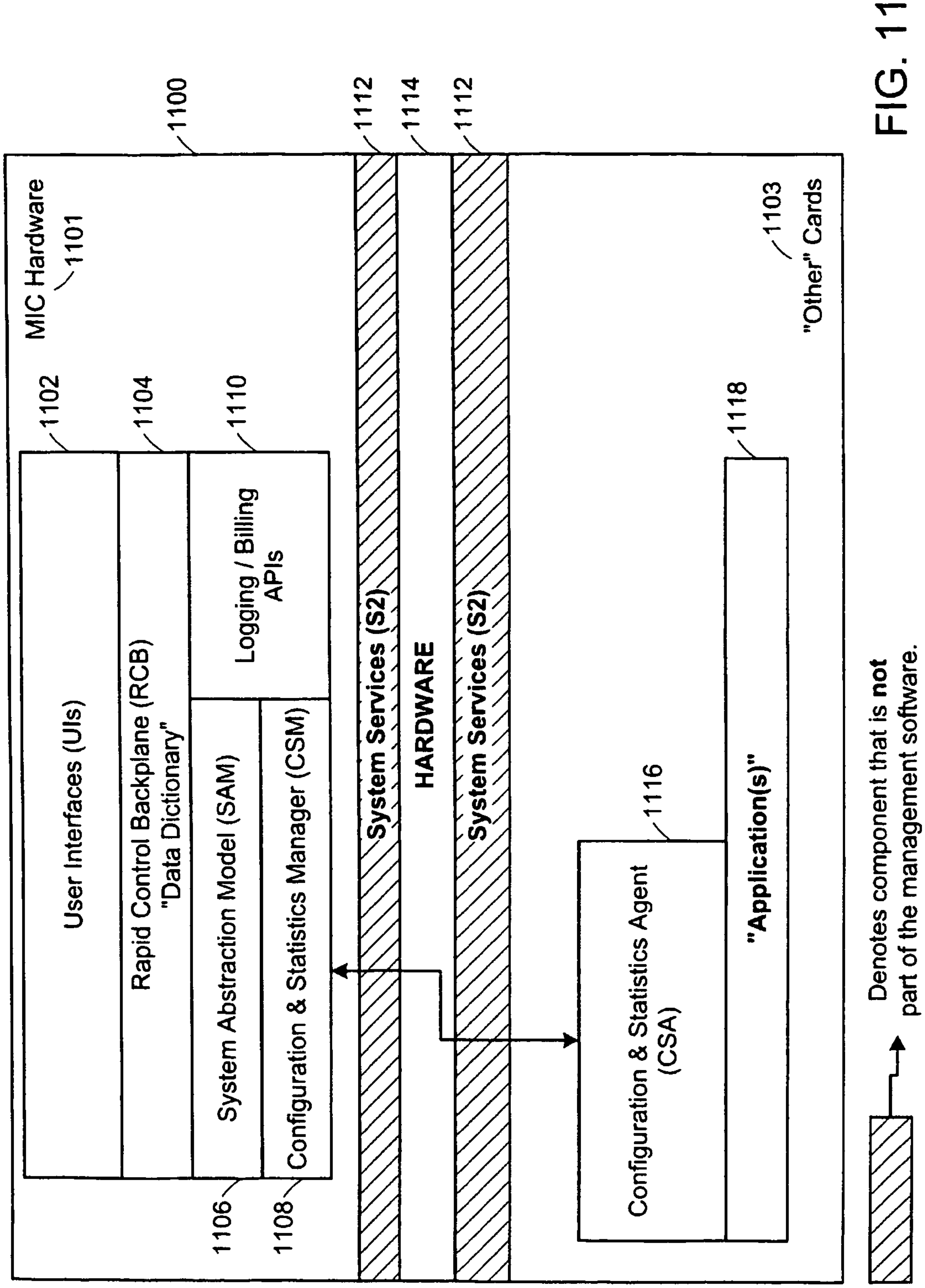
FIG. 11 depicts a management software overview.

In the illustrated embodiments the management software decomposes into the following high-level functions, shown in FIG. 11. As shown in the example of FIG. 11 (other configurations are also possible and within the scope of the invention), management software can be organized into User Interfaces (Uls) 1102, rapid control backplane (RCB) data dictionary 1104, system abstraction model (SAM) 1106, configuration & statistics manager (CSM) 1108, and logging/billing APIs 1110, on module 1101. This module can communicate across system services (S2) 1112 and hardware elements 1114 with configuration & statistics agent (CSA) 1116 and applications 1118.

The major components of the management software include the following:

2.2.1 User Interfaces (Uls)

These components are the user interfaces that allow the user access to the system via a CLI, HTTP Client or SNMP Agent.

2.2.2 Rapid Control Backplane (RCB)

These components make up the database or data dictionary of settable/gettable objects in the system. The Uls use "Rapid Marks" (keys) to reference the data contained within the database. The actual location of the data specified by a Rapid Mark may be on or off the MIC.

2.2.3 System Abstraction Model (SAM)

These components provide a software abstraction of the physical components in the system. The SAM works in conjunction with the RCB to get/set data for the Uls. The SAM determines where the data resides and if necessary interacts with the CSM to get/set the data.

2.2.4 Configuration & Statistics Manager (CSM)

These components are responsible for communicating with the other cards in the system to get/set data. For example the CSM sends configuration data to a card/processor when a UI initiates a change and receives statistics from a card/processor when a UI requests some data.

2.2.5 Logging/Billing APIs These components interface with the logging and event servers provided by System Services and are responsible for sending logging/billing data to the desired location and generating SNMP traps/alerts when needed.

2.2.6 Configuration & Statistics Agent (CSA)

These components interface with the CSM on the MIC and responds to CSM messages for configuration/statistics data.

2.3 Dynamic Configuration

The SANStream management system will support dynamic configuration updates. A significant advantage is that it will be unnecessary to reboot the entire chassis when an NP's configuration is modified. The bootstrap configuration can follow similar dynamic guidelines. Bootstrap configuration is merely dynamic configuration of an NP that is in the reset state.

Both soft and hard configuration will be supported. Soft configuration allows dynamic modification of current system settings.

Hard configuration modifies bootstrap or start-up parameters. A hard configuration is accomplished by saving a soft configuration. A hard configuration change can also be made by (T) FTP of a configuration file. The MIC will not support local editing of configuration files.

In a preferred practice of the invention DNS services will be available and utilized by MIC management processes to resolve hostnames into IP addresses.

2.4 Management Applications

In addition to providing "rote" management of the system, the management software will be providing additional management applications/functions. The level of integration with the WEB Ul for these applications can be left to the implementer. For example the Zoning Manager could be either be folded into the HTML pages served by the embedded HTTP server OR the HTTP server could serve up a stand-alone JAVA Applet.

2.4.1 Volume Manager

A preferred practice of the invention will provide a volume manager function. Such a Volume Manager may support:

Raid 0-Striping

Raid 1-Mirroring 0

Hot Spares

Aggregating several disks into a large volume.

Partitioning a large disk into several smaller volumes.

2.4. 2 Load Balancer

This application configures the load balancing functionality. This involves configuring policies to guide traffic through the system to its ultimate destination. This application will also report status and usage statistics for the configured policies.

2.4.3 Server-less Backup (NDMP)

This application will support NDMP and allow for server-less back up.

This will allow users the ability to back up disk devices to tape devices without a server intervening.

2.4.4 IP-ized Storage Management

This application will "hide" storage and FC parameters from IP-centric administrators. For example, storage devices attached to FC ports will appear as IP devices in an HP-Open View network map. These devices will be "ping-able", "discoverable" and support a limited scope of MIB variables.

In order to accomplish this IP addresses be assigned to the storage devices (either manually or automatically) and the MIC will have to be sent all IP Mgmt (exact list TBD) packets destined for one of the storage IP addresses.

The MIC will then mediate by converting the IP packet (request) to a similar FC/SCSI request and sending it to the device.

For example an IP Ping would become a SCSI Inquiry while a SNMP get of sysDescription would also be a SCSI Inquiry with some of the returned data (from the Inquiry) mapped into the MIB variable and returned to the requestor.

These features are discussed in greater detail in the IP Storage Management section below.

2.4.5 Mediation Manager

This application is responsible for configuring, monitoring and managing the mediation between storage and networking protocols. This includes session configurations, terminations, usage reports, etc. These features are discussed in greater detail in the Mediation Manager section below.

2.4.6 VLAN Manager

Port level VLANs will be supported. Ports can belong to more than one VLAN.

The VLAN Manager and Zoning Manager could be combined into a VDM (or some other name) Manager as a way of unifying the Ethernet and FC worlds.

2.4.7 File System Manager The majority of file system management will probably be to"accept the defaults". There may be an exception if it is necessary to format disks when they are attached to a Pirus system or perform other disk operations.

2.5 Virtual Storage Domain (VSD) Virtual storage domains serve 2 purposes.

1. Logically group together a collection of resources.
2. Logically group together and"hide" a collection of resources from the outside world.

The 2 cases are very similar. The second case is used when we are load balancing among NAS servers.

Figure 12:
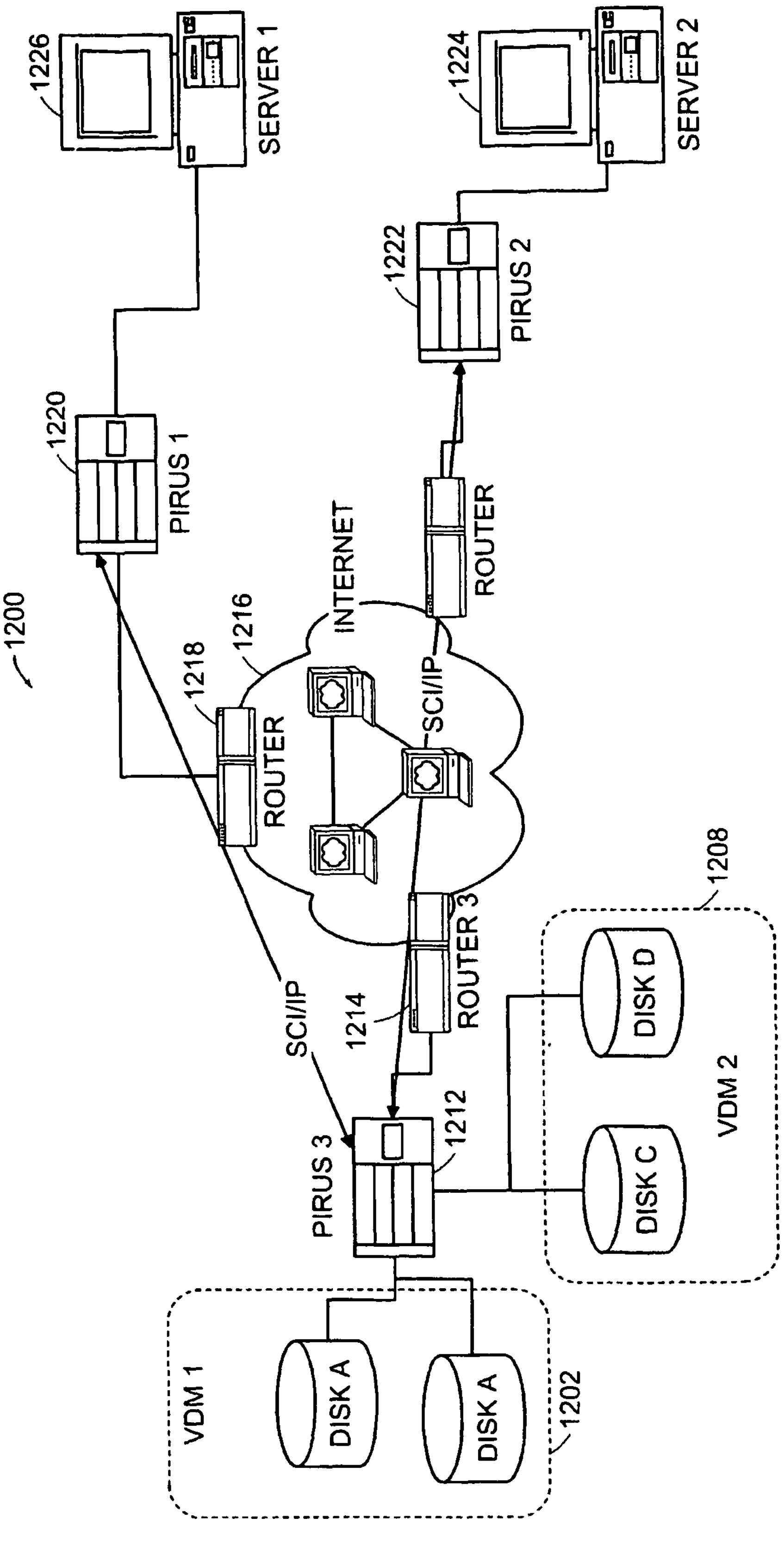
FIG. 12 depicts a virtual storage domain.

FIG. 12 illustrates the first example: In this example Server 1 1226 is using SCSI/IP to communicate to Disks A and B at a remote site while Server 2 1224 is using SCSI/IP to communicate with Disks C and D 1208 at the same remote site. For this configuration Disks A, B, C, and D must have valid IP addresses. Logically inside the PIRUS system 2 Virtual Domains are created, one for Disks A and B and one for Disks C and D. The IFF software doesn't need to know about the VSDs since the IP addresses for the disks are valid (exportable) it can simply forward the traffic to the correct destination. The VSD is configured for the management of the resources (disks).

Figure 13:
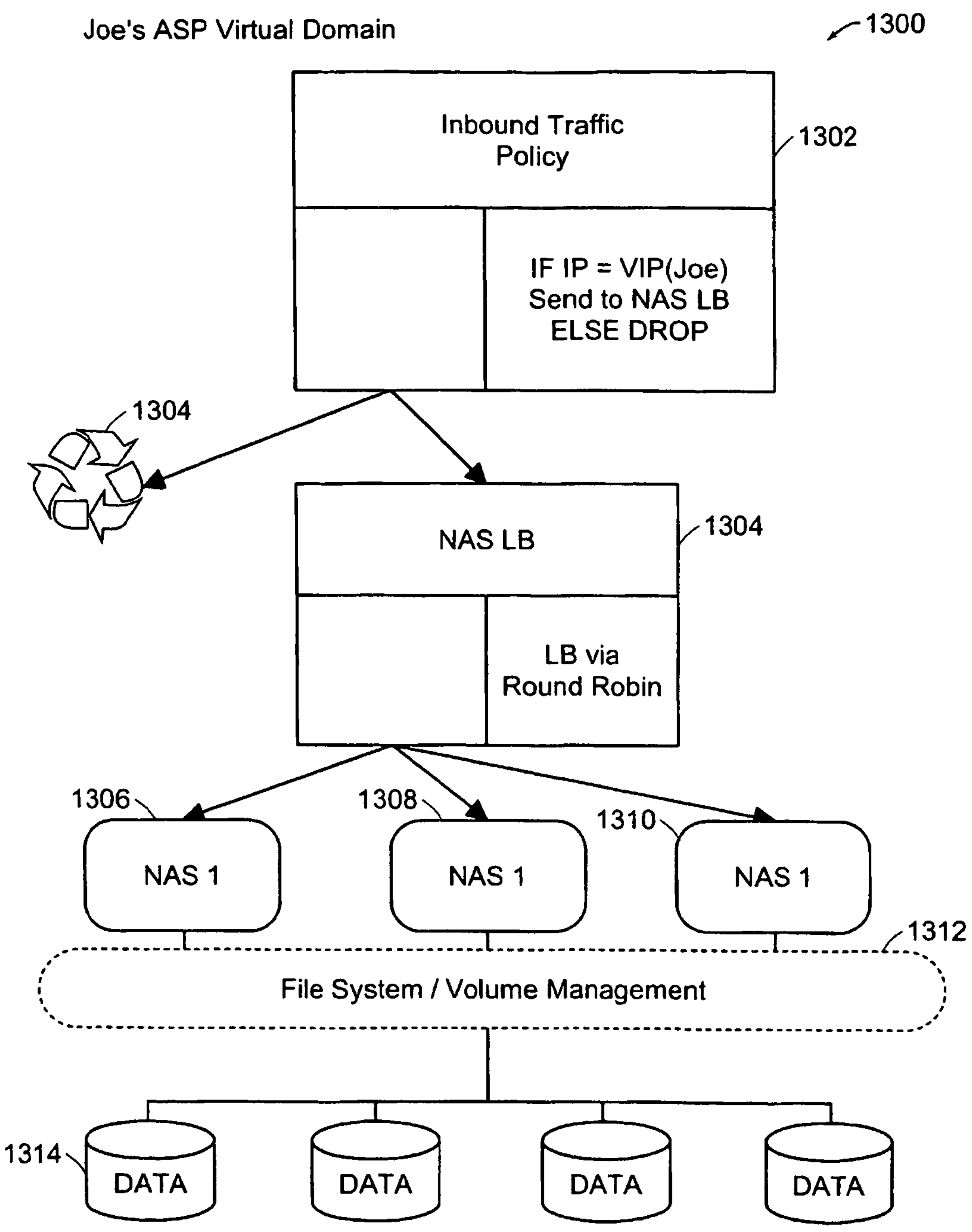
FIG. 13 depicts another virtual storage domain.

The second usage of virtual domains is more interesting. In this case let's assume we want to load balance among 3 NAS servers. A VSD would be created and a Virtual IP Address (VIP) assigned to it. External entities would use this VIP to address the NAS and internally the PIRUS system would use NAT and policies to route the request to the correct NAS server. FIG. 13 illustrates this.

In this example users of the NAS service would simple reference the VIP for Joe's ASP NAS LB service. Internally, through the combination of virtual storage domains and policies the Pirus system load balances the request among 3 internal NAS servers 1306,1308, 1310, thus providing a scalable, redundant NAS solution.

Virtual Domains can be use to virtualize the entire Pirus system.

Within VSDs the following entities are noteworthy:

2.5.1 Services

Services represent the physical resources. Examples of services are:

1. Storage Devices attached to FC or Ethernet ports. These devices can be simple disks, complex RAID arrays, FC-AL connections, tape devices, etc.
2. Router connections to the Internet.
3. NAS-Internally defined ones only.

2.5.2 Policies

A preferred practice of the invention can implement the following types of policies:

1. Configuration Policy-A policy to configure another policy or a feature. For example a NAS Server in a virtual domain will be configured as a "Service". Another way to look at it is that a Configuration Policy is simply the collection of configurable parameters for an object.

2. Usage Policy-A policy to define how data is handled. In our case load balancing is an example of a "Usage Policy". When a user configures load balancing they are defining a policy that specifies how to distribute client requests based on a set of criteria.

There are many ways to describe a policy or policies. For our purposes we will define a policy as composed of the following: 1. Policy Rules-1 or more rules describing "what to do". A rule is made up of condition (s) and actions. Conditions can be as simple as "match anything" r as complex as if source IP address 1.1. 1.1 and it's 2: 05".

Likewise, actions can be as simple as "send to 2.2. 2. 2" or complex as " load balance using LRU between 3 NAS servers.) 2. Policy Domain-A collection of object (s) Policy Rules apply to. For example, suppose there was a policy that said "load balance using round robin". The collection of NAS servers being load balanced is the policy domain for the policy.

Policies can be nested to form complex policies.

2.6 Boot Sequence and Configuration

The MIC and other cards coordinate their actions during boot up configuration processing via System Service's Notify Service. These actions need to be coordinated in order to prevent the passing of traffic before configuration file processing has completed.

The other cards need to initialize with default values and set the state of their ports to "hold down" and wait for a "Config Complete" event from the MIC.

Figure 14:
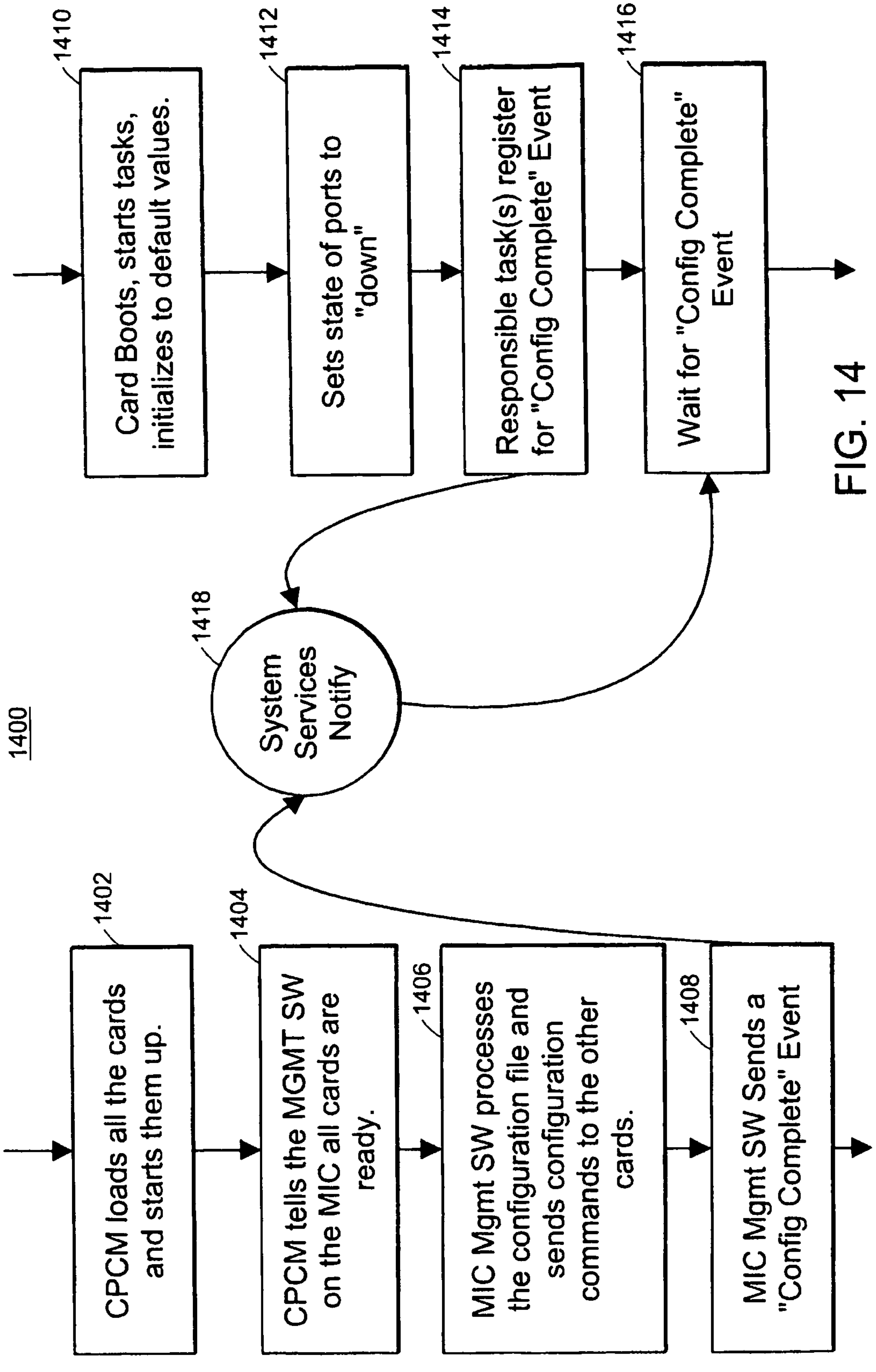
FIG. 14 depicts configuration processing boot-up sequence.

Once this event is received the ports can be released and process traffic according to the current configuration. (Which may be default values if there were no configuration commands for the ports in the configuration file.) FIG. 14 illustrates this part of the boot up sequence and interactions between the MIC, S2 Notify and other cards.

There is an error condition in this sequence where the card never receives the "Config Complete" event. Assuming the software is working properly than this condition is caused by a hardware problem and the ports on the cards will be held in the "hold down" state. If CSM/CSA is working properly than the MIC Mgmt Software will show the ports down or CPCM might detect that the card is not responding and notify the MIC. In any case there are several ways to learn about and notify users about the failure.

3. LIC Software

The LIC (Lan Interface Card) consists of LAN Ethernet ports of 10/100/1000 Mbps variety. Behind the ports are 4 network engine processors.

Each port on a LIC will behave like a layer 2 and layer 3 switch. The functionality of switching and intelligent forwarding is referred to herein as IFF-Intelligent Forwarding and Filtering. The main purpose of the network engine processors is to forward packets based on Layer 2, 3, 4 or 5 information. The ports will look and act like router ports to hosts on the LAN. Only RIP will be supported in the first release, with OSPF to follow.

3.1 VLANs

The box will support port based VLANs. The division of the ports will be based on configuration and initially all ports will belong to the same VLAN. Alternative practices of the invention can include VLAN classification and tagging, including possibly 802. 1 p and 802. 1 Q support.

3.1.1 Intelligent Filtering and Forwarding (IFF)

The IFF features are discussed in greater detail below.

Layer 2 and layer 3 switching will take place inside the context of IFF. Forwarding table entries are populated by layer 2 and 3 address learning. If an entry is not known the packet is sent to the IP routing layer and it is routed at that level.

3.2 Load Balance Data Flow

NFS load balancing will be supported within a SANStream chassis. Load balancing based upon VIRUTAL IP addresses, content and flows are all possible.

The SANStream box will monitor the health of internal NFS servers that are configured as load balancing servers and will notify network management of detectable issues as well as notify a disk management layer so that recovery may take place. It will in these cases, stop sending requests to the troubled server, but continue to load balance across the remaining NFS servers in the virtual domain.

3.3 LIC-NAS Software 3.3.1 Virtual Storage Domains (VSD)

Figure 15:
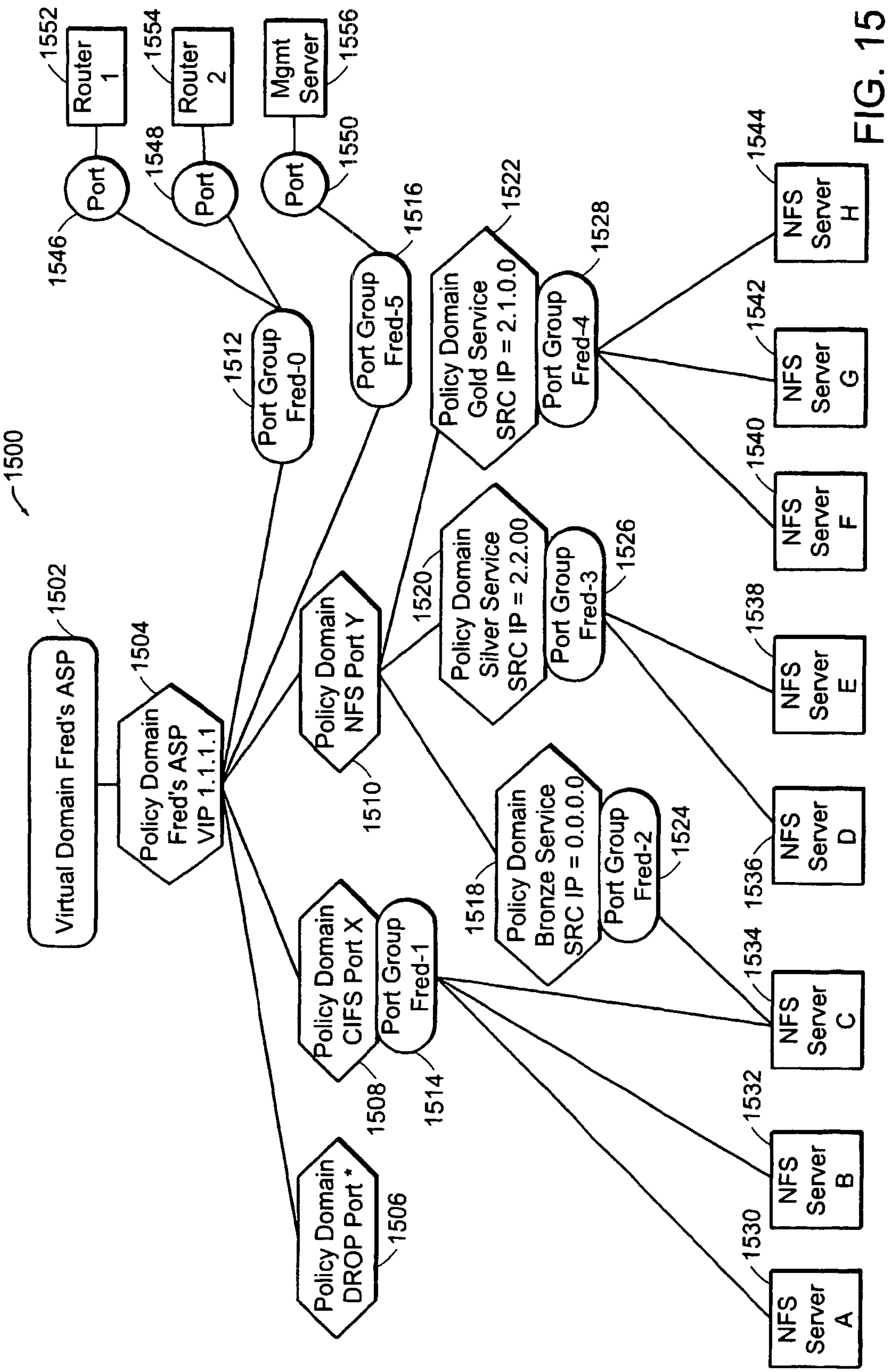
FIG. 15 depicts a further virtual storage domain example.

FIG. 15 provides another VSD example. The switch system of the invention is designed to support, in one embodiment, multiple NFS and CIFS servers in a single device that are exported to the user as a single NFS server (only NFS is supported on the first release). These servers are masked under a single IP address, known as a Virtual Storage Domain (VSD). Each VSD will have one to many connections to the network via a Network Processor (NP) and may also have a pool of Servers (will be referred to as "Server" throughout this document) connected to the VSD via the fabric on the SRC card.

Within a virtual domain there are policy domains. These sub-layers define the actions needed to categorize the frame and send it to the next hop in the tree. These polices can define a large range of attributes in a frame and then impose an action (implicit or otherwise). Common polices may include actions based on protocol type (NFS, CIFS, etc.) or source and destination IP or MAC address. Actions may include implicit actions like forwarding the frame on to the next policy for further processing, or explicit actions such as drop.

FIG. 15 diagrams a hypothetical virtual storage domain owned by Fred's ASP 1502. In this example Fred has the configured address of 1.1. 1.1 that is returned by the domain name service when queried for the domain's IP address. The next level of configuration is the policy domain. When a packet arrives into the Pirus box from a router port it is classified as a member of Fred's virtual domain because of its destination IP address. Once the virtual domain has been determined its configuration is loaded in and a policy decision is made based on the configured policy. In the example above lets assume an NFS packet arrived. The packet will be associated with the NFS policy domain and a NAT (network address translation-described below) takes place, with the destination address that of the NFS policy domain. The packet now gets associated with the NFS policy domain for Yahoo. The process continues with the configuration of the NFS policy being loaded in and a decision being made based on the configured policy. In the example above the next decision to be made is whether or not the packet contains the gold, silver, or bronze service. Once that determination is made (let's assume the client was identified as a gold customer), a NAT is performed again to make the destination the IP address of the Gold policy domain. The packet now gets associated with the Gold policy domain. The process continues with the configuration for the Gold policy being loaded in and a decision being made based on the configured policy. At this point a load balancing decision is made to pick the best server to handle the request. Once the server is picked, NAT is again performed and the destination IP address of the server is set in the packet. Once the destination IP address of the packet becomes a device configured for load balancing, a switching operation is made and the packet is sent out of the box.

The implementation of the algorithm above lends itself to recursion and may or may not incur as many NAT steps as described. It is left to the implementer to short cut the number of NAT's while maintaining the overall integrity of the algorithm.

FIG. 15 also presents the concept of port groups 1512, 1516. Port groups are entities that have identical functionality and are members of the same virtual domain. Port group members provide a service. By definition, any member of a particular port group, when presented with a request, must be able to satisfy that request. Port groups may have routers, administrative entities, servers, caches, or other Pirus boxes off of them.

Virtual Storage Domains can reside across slots but not boxes. More than one Virtual Storage Domain can share a Router Interface.

3.3.2 Network Address Translation (NAT)

NAT translates from one IP Address to another IP Address. The reasons for doing NAT is for Load Balancing, to secure the identity of each Server from the Internet, to reduce the number of IP Addresses purchased, to reduce the number of Router ports needed, and the like.

Each Virtual Domain will have an IP Address that is advertised thru the network NP ports. The IP Address is the address of the Virtual Domain and NOT the NFS/CIFS Server IP Address. The IP Address is translated at the Pirus device in the Virtual Storage Domain to the Server's IP Address.

Depending on the Server chosen, the IP Address is translated to the terminating Server IP Address.

For example, in FIG. 15, IP Address 100.100. 100. 100 would translate to 1.1. 1.1, 1.1. 1.2 or 1.1. 1.3 depending on the terminating Server.

3.3.3 Local Load Balance (LLB)

Local load balancing defines an operation of balancing between devices (i.e. servers) that are connected directly or indirectly off the ports of a Pirus box without another load balancer getting involved. A lower-complexity implementation would, for example, support only the balancing of storage access protocols that reside in the Pirus box.

3.3.3.1 Load Balancing Order of Operations:

In the process of load balancing configuration it may be possible to define multiple load balancing algorithms for the same set of servers. The need then arises to apply an order of operations to the load balancing methods. They are as follows in the order they are applied: 1) Server loading info, Percentage of loading on the servers Ethernet, Percentage of loading on the servers FC port, SLA support, Ratio Weight rating 2) Round Trip Time, Response time, Packet Rate, Completion Rate 3) Round Robin, Least Connections, Random Load balancing methods in the same group are treated with the same weight in determining a servers loading. As the load balancing algorithms are applied, servers that have identical load characteristics (within a certain configured percentage) are moved to the next level in order to get a better determination of what server is best prepared to receive the request. The last load balancing methods that will be applied across the servers that have the identical load characteristics (again within a configured percentage) are round robin, least connection and random.

3.3.3.2 File System Server Load Balance (FSLB):

The system of the invention is intended to provide load balancing across at least two types of file system servers, NFS and CIFS. NFS is stateless and CIFS is stateful so there are differences to each method. The goal of file system load balancing is not only to pick the best identical server to handle the request, but to make a single virtual storage domain transparently hidden behind multiple servers.

3.3.3.3 NFS Server Load Balancing (NLB):

NFS is mostly stateless and idempotent (every operation returns the same result if it is repeated). This is qualified because operations such as READ are idempotent but operations such as REMOVE are not. Since there is little NFS server state as well as little NFS client state transferred from one server to the other, it is easy for one server to assume the other server's functions. The protocol will allow for a client to switch NFS requests from one server to another transparently. This means that the load balancer can more easily maintain an NFS session if a server fails. For example if in the middle of a request a server dies, the client will retry, the load balancer will pick another server and the request gets fulfilled (with possibly a file handle NAT), after only a retry. If the server dies between requests, then there isn't even a retry, the load balancer just picks a new server and fulfills the request (with possibly a file handle NAT).

When using NFS managers it will be possible to set up the load balancer to load across multiple NFS servers that have identical data, or managers can set up load balancing to segment the balancing across servers that have unique data. The latter requires virtual domain configuration based on file requested (location in the file system tree) and file type. The former requires a virtual domain and minimal other configuration (i.e., load balancing policy).

The function of Load Balance Data Flow is to distribute the processing of requests over multiple servers. Load Balance Data Flow is the same as the Traditional Data Flow but the NP statistically determines the load of each server that is part of the specified NFS request and forwards the request based on that server load. The load-balancing algorithm could be as simple as round robin or a more sophisticated administrator configured policy.

Server load balance decisions are made based upon IP destination address. For any server IP address, a routing NP may have a table of configured alternate server IP addresses that can process an HTTP transaction. Thus multiple redundant NFS servers are supported using this feature.

TCP based server load balance decisions are made within the NP on a per connection basis. Once a server is selected through the balancing algorithm all transactions on a persistent TCP connection will be made to the same originally targeted server. An incoming IP message's source IP address and IP source Port number are the only connection lookup keys used by a NP.

For example, suppose a URL request arrives for 192.32. 1.1. The Router NP processor's lookup determines that server 192.32. 1.1 is part of a Server Group (192.32. 1.1, 192.32. 1.2, etc.). The NP decides which Server Group to forward the request to via user-configured algorithm. Round-Robin, estimated actual load, and current connection count are all candidates for selection algorithms. If TCP is the transport protocol, the TCP session is then terminated at the specified SRC processor.

UDP protocols do not have an opening SYN exchange that must be absorbed and spoofed by the load balancing IXP. Instead each UDP packet can be viewed as a candidate for balancing. This is both good and bad. The lack of opening SYN simplifies part of the balance operation, but the effort of balancing each packet could add considerable latency to UDP transactions.

In some cases it will be best to make an initial balance decision and keep a flow mapped for a user configurable time period. Once the period has expired an updated balance decision can be made in the background and a new balanced NFS server target selected.

In many cases it will be most efficient to re-balance a flow during a relatively idle period. Many disk transactions result in forward looking actions on the server (people who read the 1st half of a file often want the 2nd half soon afterwards) and rebalancing during active disk transactions could actually hurt performance.

An amendment to the "time period" based flow balancing described above would be to arm the timer for an inactivity period and re-arm it whenever NFS client requests are received. A longer inactivity timer period could be used to determine when a flow should be deleted entirely rather than re-balanced.

3.3.3.4 TCP and UDP-Methods of balancing:

NFS can run over both TCP and UDP (UDP being more prevalent). When processing UDP NFS requests the method used for psuedo-proxy of TCP sessions does not need to be employed. During a UDP session, the information to make a rational load balancing decision can be made with the first packet.

Several methods of load balancing are possible. The first and simples to implement is load balancing based on source address-all requests are sent to the same server for a set period of time after a load balancing decision is made to pick the best server at the UDP request or the TCP SYN.

Another method is to load balance every request with no regard for the previous server the client was directed to. This will possibly require obtaining a new file handle from the new server and NATing so as to hide the file handle change from the client. This method also carries with it more overhead in processing (every request is load balanced) and more implementation effort, but does give a more balanced approach.

Yet another method for balancing NFS requests is to cache a "next balance" target based on previous experience. This avoids the overhead of extensive balance decision making in real time, and has the benefit of more even client load distribution. In order to reduce the processing of file handle differences between identical internal NFS servers, all disk modify operations will be strictly ordered. This will insure that the inode numbering is consistent across all identical disks.

Among the load balancing methods that can be used (others are possible) are: o Round Robin o Least Connections o Random (lower IP-bits, hashing) o Packet Rate (minimum throughput) o Ratio Weight rating o Server loading info and health as well as application health o Round Trip Time (TCP echo) o Response time 3.3. 3.5 Write Replication: NFS client read and status transactions can be freely balanced across a VLAN family of peer NFS servers. Any requests that result in disk content modification (file create, delete, set-attributes, data write, etc.) must be replicated to all NFS servers in a VLAN server peer group.

The Pirus Networks switch fabric interface (SFI) will be used to multicast NFS modifications to all NFS servers in a VLAN balancing peer group. All NFS client requests generate server replies and have a unique transaction ID. This innate characteristic of NFS can be used to verify and confirm the success of multicast requests.

At least two mechanisms can be used for replicated transaction confirmation. They are"first answer" and quorum. Using the "first answer" algorithm an IXP would keep minimal state for an outstanding NFS request, and return the first response it receives back to the client. The quorum system would require the IXP to wait for some percentage of the NFS peer servers to respond with identical messages before returning one to the client.

Using either method, unresponsive NFS servers are removed from the VLAN peer balancing group. When a server is removed from the group the Pirus NFS mirroring service must be notified so that recovery procedures can be initiated.

Figure 16:
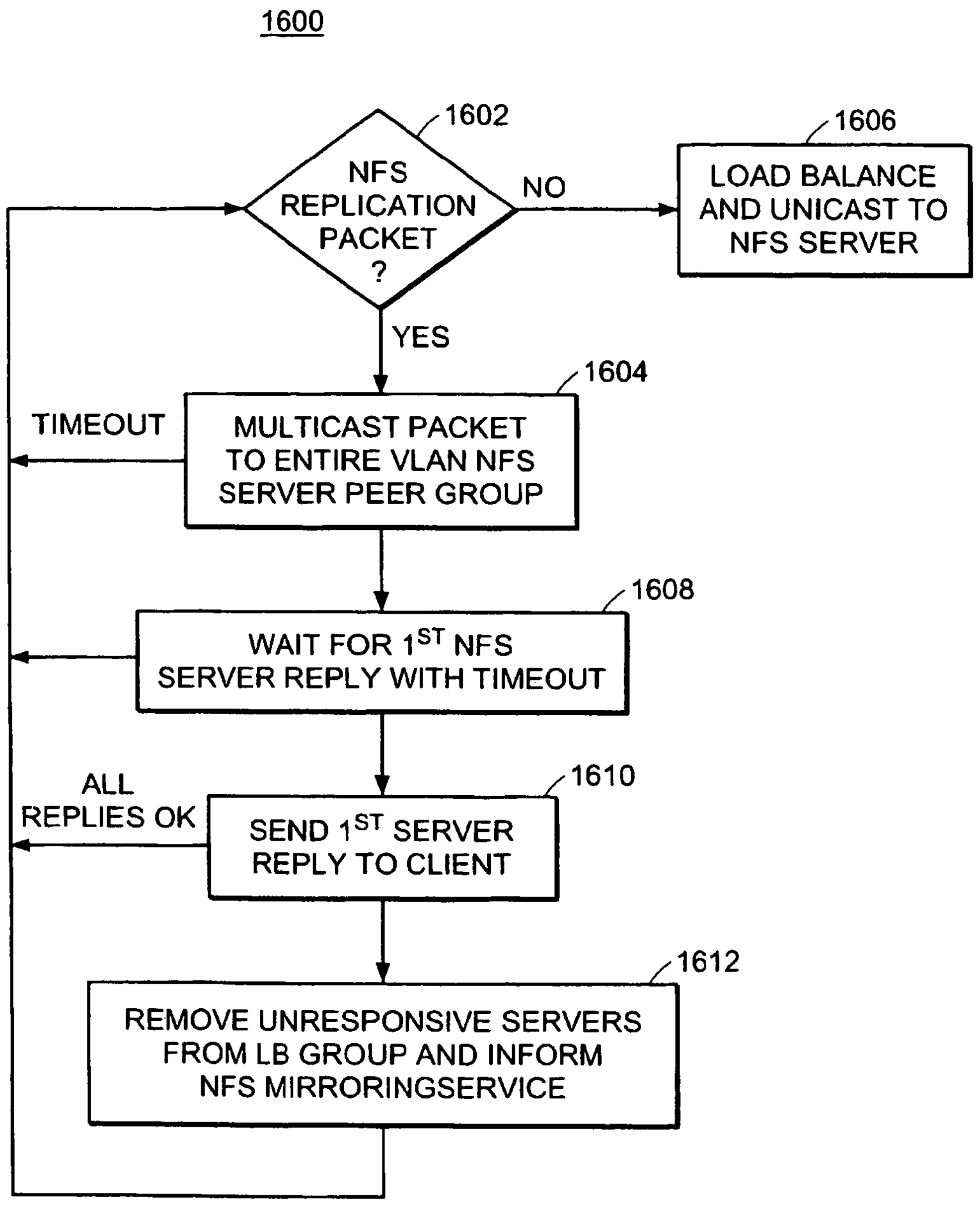
FIG. 16 is a flow chart of NFS mirroring and related functions.

A method for coordinating NFS write replication is set forth in FIG. 16, including the following steps: check for NFS replication packet 1602; if yes, multicast packet to entire VLAN NFS server peer group 1604; wait for 15t NFS server reply with timeout 1608; send 1st server reply to client 1610; remove unresponsive servers from LB group and inform NFS mirroring service 1610. If not an NFS replication packet, load balance and unicast to NFS server 1606.

3.3.4 Load Balancer Failure Indication:

When a load balancer declares that a peer NFS server is being dropped from the group the NFS mirroring service is notified. A determination must be made as to whether the disk failure was soft or hard.

In the case of a soft failure a hot synchronization should be attempted to bring the failing NFS server back online. All NFS modify transactions must be recorded for playback to the failing NFS server when it returns to service.

When a hard failure has occurred an administrator must be notified and fresh disk will be brought online, formatted, and synchronized.

3.3.4.1 CIFS Server Load Balancing:

CIFS is stateful and as such there are fewer options available for load balancing. CIFS is a session-oriented protocol; a client is required to log on to a server using simple password authentication or a more secure cryptographic challenge. CIFS supports no recovery guarantees if the session is terminated through server or network outage. Therefore load balancing of CIFS requests must be done once at TCP SYN and persistence must be maintained throughout the session. If a disk fails and not the CIFS server, then a recovery mechanism can be employed to transfer state from one server to another and maintain the session. However if the server fails (hardware or software) and there is no way to transfer state from the failed server to the new server, then the TCP session must be brought down and the client must reestablish a new connection with a new server. This means relogging and recreating state in the new server.

Since CIFS is TCP based the balancing decision will be made at the TCP SYN. Since the TCP session will be terminated at the destination server, that server must be able to handle all requests that the client believes exists under that domain. Therefore all CIFS servers that are masked by a single virtual domain must have identical content on them. Secondly data that spans an NFS server file system must be represented as a separate virtual domain and accessed by the client as another CIFS server (i.e. another mount point).

Load balancing will support source address based persistence and send all requests to the same server based on a timeout since inactivity. Load balancing methods used will be: o Round Robin o Least Connections o Random (lower IP-bits, hashing) o Packet Rate (minimum throughput) o Ratio Weight rating o Server loading info and health as well as application health o Round Trip Time (TCP echo) o Response time 3.3.4.2 Content Load Balance:

Content load balancing is achieved by delving deeper into packet contents than simple destination IP address.

Through configuration and policy it will be possible to re-target NFS transactions to specific servers based upon NFS header information. For example a configuration policy may state that all files under a certain directory load balanced between the two specified NFS servers.

A hierarchy of load balancing rules may be established when Server Load Balancing is configured subordinate to Content Load Balancing.

3.4 LIC-SCSI/IP Software 3.5 Network Processor Functionality

Figure 17:
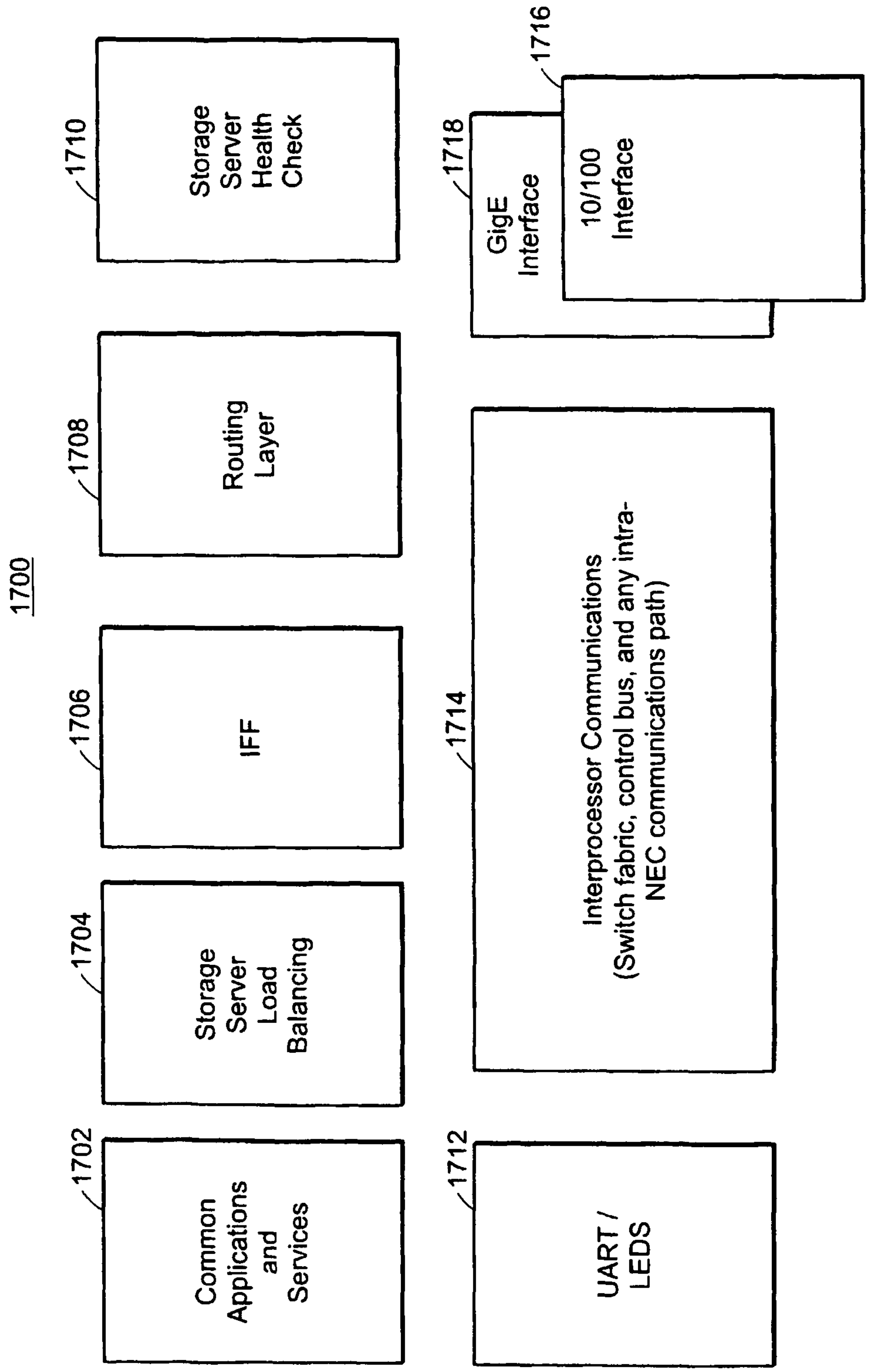
FIG. 17 depicts interface module software.

FIG. 17 is a top-level block diagram of the software on an NP. Note that the implementation of a block may be split across the policy processor and the micro-engines. Note also that not all blocks may be present on all NPs. The white blocks are common (in concept and to some level of implementation) between all NPs, the lightly shaded blocks are present on NP that have load balancing and storage server health checking enabled on them.

3.5. 1 Flow Control 3.5.1.1 Flow Definition:

Flows are defined as source port, destination port, and source and destination IP address. Packets are tagged coming into the box and classified by protocol, destination port and destination IP address. Then based on policy and/or TOS bit a priority is assigned within the class. Classes are associated with a priority when compared to other classes.

Within the same class priorities are assigned to packets based on the TOS bit setting and/or policy.

3.5.1.2 Flow Control Model:

Flow control will be provided within the SANStream product to the extent described in this section. Each of the egress Network Processors will perform flow control. There will be a queue High Watermark that when approached will cause flow control indications from egress Network Processor to offending Network Processors based on QoS policy. The offending Network Processor will narrow TCP windows (when present) to reduce traffic flow volumes. If the egress Network Processors exceeds a Hard Limit (something higher than the High Watermark), the egress Network Processor will perform intelligent dropping of packets based on class priority and policy. As the situation improves and the Low Watermark is approached, egress control messages back the offending network processors allow for resumption of normal TCP window sizes.

Figure 18:
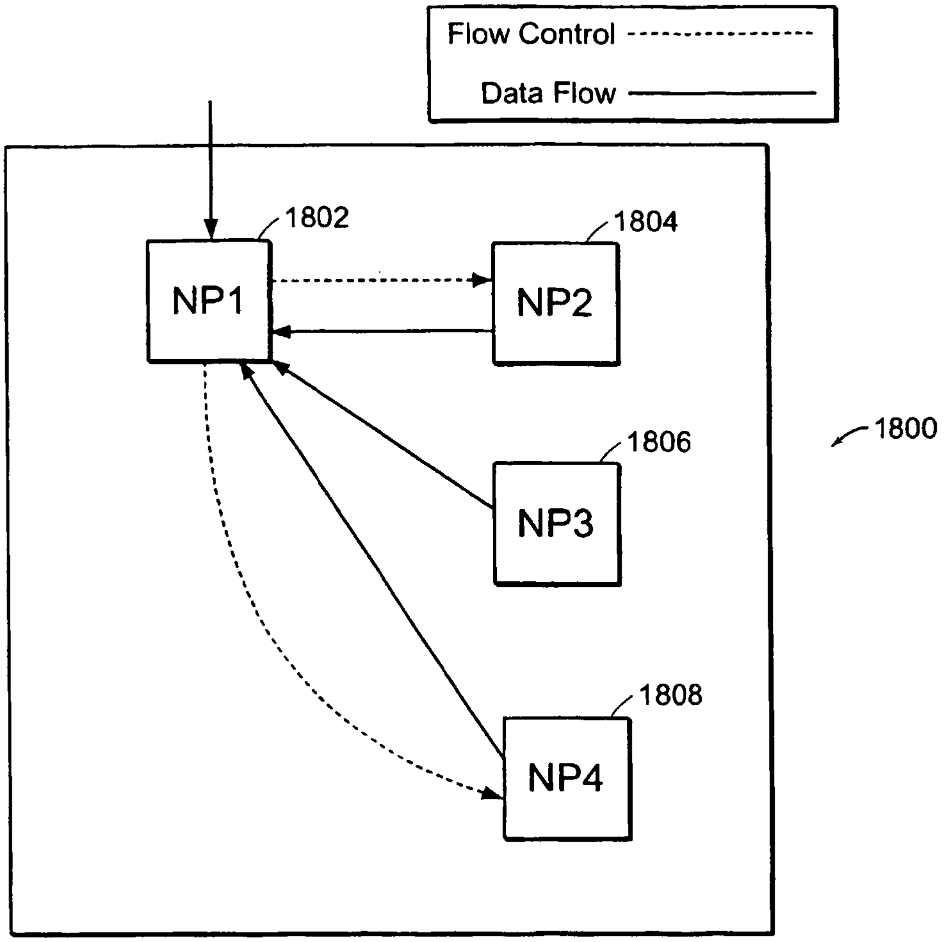
FIG. 18 depicts an flow control example.

For example, in FIG. 18, the egress Network Processor is NP1 1802 and the offending Network Processors are NP2 1804 and NP4 1808. NP2 and NP4 were determined to be offending NPs based the High Watermark and each of their policies. NP1, detecting the offending NPs, sends flow control messages to each of the processors. These offending processors should perform flow control as described previously. If the Hard Limit is reached in NP1, then packets received by NP2 or NP4 can be dropped intelligently (in a manner that can be determined by the implementer).

3.5. 2 Flow Thru Vs. Buffering

There will be a distinct differentiation in performance between the flow-thru and the other slower paths of processing.

3.5.2.1 Flow Thru:

Fast path processing will be defined as flow-thru. This path will not include buffering. Packets in this path must be designated as flow-thru within the first N bytes (Current thinking is M ports for the IXP-1200). These types of packets will be forwarded directly to the destination processor to then be forwarded out of the box. Packets that are eligible for flow-thru include flows that have a IFF table entry, Layer 2 switchable packets, packets from the servers to clients, and FC switchable frames.

3.5.2.2 Buffering:

Packets that require further processing will need to be buffered and will take one of 2 paths.

Buffered Fast Path First buffered path is taken on packets that require further looking into the frame. These frames will need to be buffered in order that more of the packet can be loaded into a micro-engine for processing. These include deep processing of layer 4-7 headers, load balancing and QoS processing.

Slow Path

The second buffered path occurs when, during processing in a micro-engine, a determination is made that more processing needs to occur that can't be done in a micro-engine. These packets require buffering and will be passed to the NP co-processor in that form. When this condition has been detected the goal will be to process as much as possible in the micro-engine before handing it up to the co-processor. This will take advantage of the performance that is inherent in a micro-engine design.

4. SRC NAS

Figure 19:
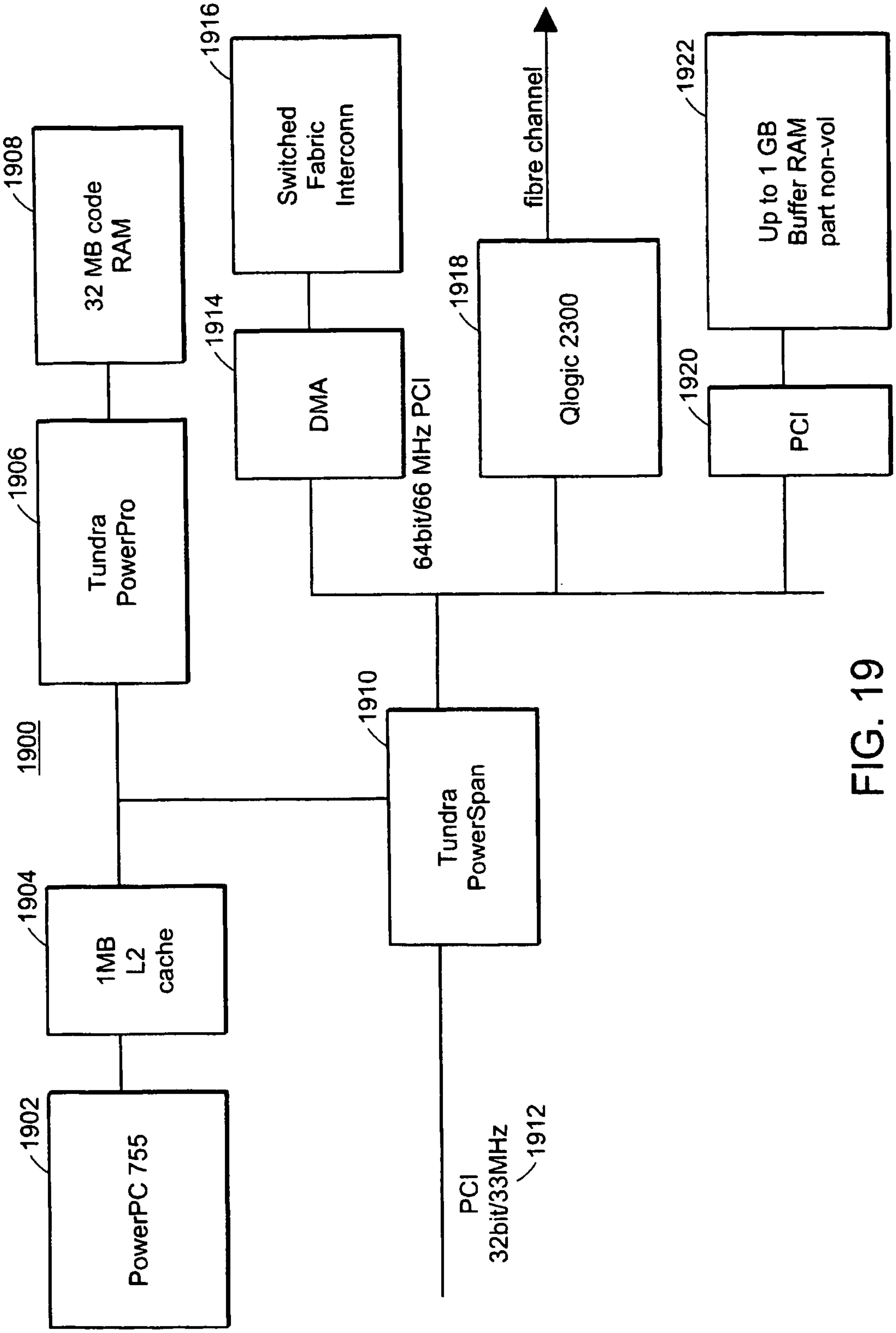
FIG. 19 depicts hardware in an SRC.
Figure 20:
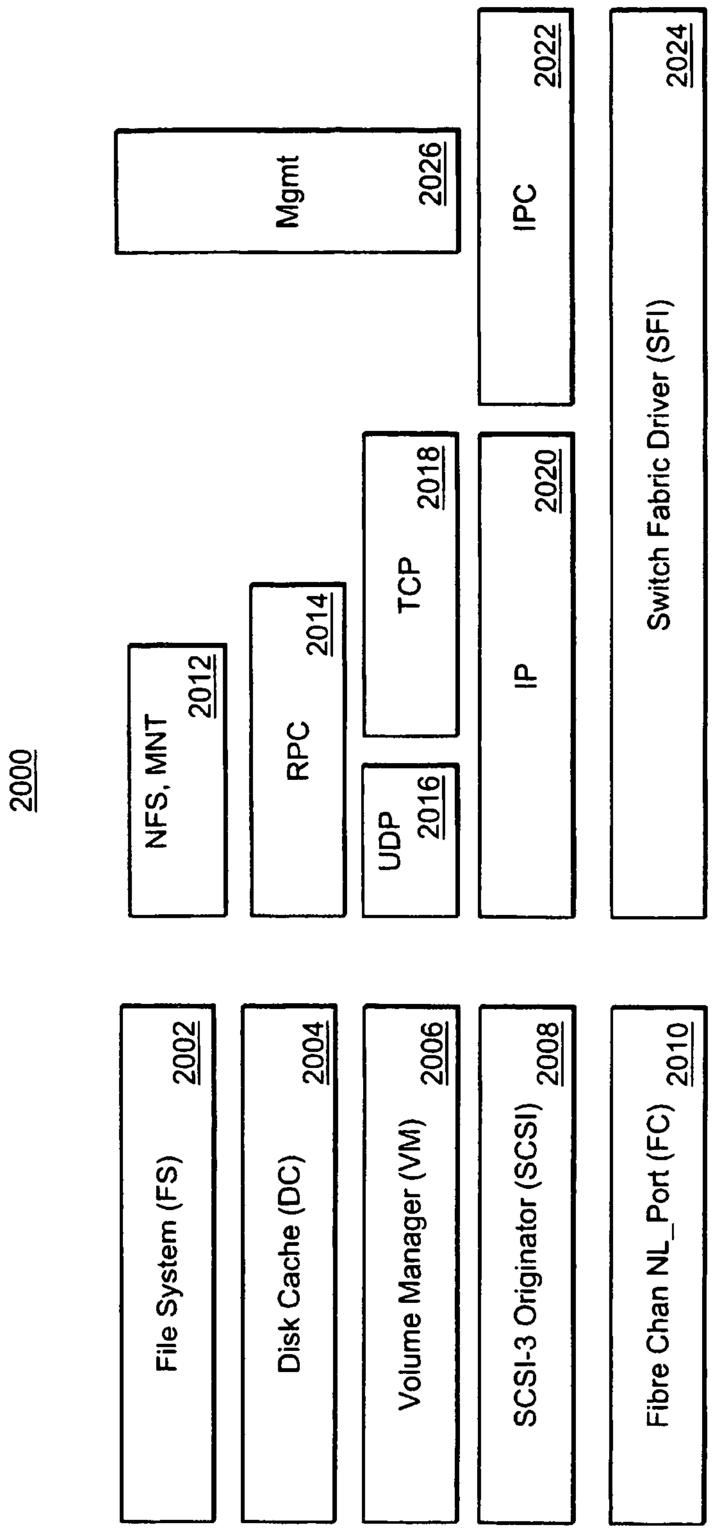
FIG. 20 depicts SRC NAS software modules.

The Pirus Networks 1st generation Storage Resource Card (SRC) is implemented with 4 occurrences of a high performance embedded computing kernel. A single instance of this kernel can contain the components shown in FIG. 19.

Software Features: The SRC Phase 1 NAS software load will provide NFS server capability.

Key requirements include:

High performance-no software copies on read data, caching El High availability-balancing, mirroring 4.1 SRC NAS Storage Features 4.1.1 Volume Manager A preferred practice of the Pirus Volume Manager provides support for crash recovery and resynchronization after failure. This module will interact with the NFS mirroring service during resynchronization periods. Disk Mirroring (RAID-1), hot sparing, and striping (RAID-0) are also supported.

4.1.2 Disk Cache

Tightly coupled with the Volume Manager 2002, a Disk Cache module 2004 will utilize the large pool of buffer RAM to eliminate redundant disk accesses. Object based caching (rather than page-based) can be utilized.

Disk Cache replacement algorithms can be dynamically tuned based upon perceived role. Database operations (frequent writes) will benefit from a different cache model than html serving (frequent reads).

4.1.3 SCSI

Initiator mode support required in phase 1. This layer will be tightly coupled with the Fibre Channel controller device. Implementers will wish to verify the interoperability of this protocol with several current generation drives (IBM, Seagate), JBODs, and disk arrays.

4.1.4 Fibre Channel

The disclosed system will provide support for fabric node (N_PORT) and arbitrated loop (NL_PORT). The Fibre Channel interface device will provide support for SCSI initiator operations, with interoperability of this interface with current generation FC Fabric switches (such as those from Brocade, Ancor).

Point-to-Point mode can also be supported; and it is understood that the device will perform master mode DMA to minimize processor intervention. It is also to be understood that the invention will interface and provide support to systems using NFS, RPC (Remote Procedure Call), MNT, PCNFSD, NLM, MAP and other protocols.

4.1. 5 Switch Fabric Interface

A suitable switch fabric interface device driver is left to the implementer. Chained DMA can be used to minimize CPU overhead.

4.2 NAS Pirus System Features 4.2.1 Configuration/Statistics

The expected complement of parameters and information will be available through management interaction with the Pirus chassis MIC controller.

4.2. 2 NFS Load Balancing

The load balancing services of the LIC are also used to balance requests across multiple identical NFS servers within the Pirus chassis. NFS data read balancing is a straightforward extension to planned services when Pirus NFS servers are hidden behind a NAT barrier.

With regard to NFS data write balancing, when a LIC receives NFS create, write, or remove commands they must be multicast to all participating NFS SRC servers that are members of the load balancing group.

4.2.3 NFS Mirroring Service The NFS mirroring service is responsible for maintaining the integrity of replicated NFS servers within the Pirus chassis. It coordinates the initial mirrored status of peer NFS servers upon user configuration. This service also takes action when a load-balancer notifies it that a peer NFS server has fallen out of the group or when a new disk "checks in" to the chassis.

This service interacts with individual SRC Volume Manager modules to synchronize file system contents. It could run on a #9 processor associated with any SRC module or on the MIC.

5. SRC Mediation Storage

Mediation is the technology of bridging between storage mediums of different types. We will mediate between Fibre Channel target and initiators and IP based target and initiators. The disclosed embodiment will support numerous mediation techniques.

5.1 Supported Mediation Protocols

Mediation protocols that can be supported by the disclosed architecture will include Cisco's SCSI/TCP, Adaptec's SEP protocol, and the standard canonical SCSI/UDP encapsulation.

5.1.1 SCSIIUDP

Figure 21:
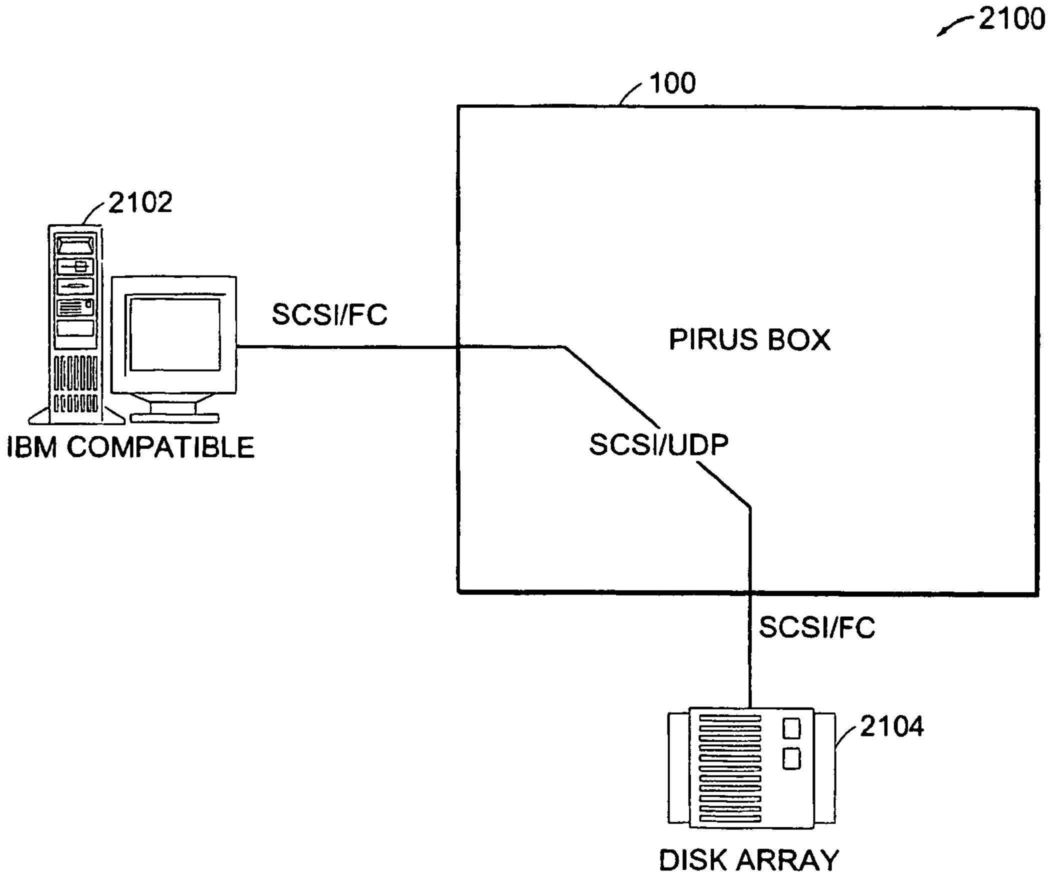
FIG. 21 depicts SCSI/UDP operation.

SCSI/UDP has not been documented as a supported encapsulated technique by any hardware manufacturer. However UDP has some advantages in speed when comparing it to TCP. UDP however is not a reliable transport. Therefore it is proposed that we use SCSI/UDP to extend the Fibre Channel fabric through our own internal fabric (see FIG. 21 demonstrating SCSI/UDP operation with elements 100, IBM 2102 and Disk Array 2104). The benefit to UDP is lower processing and latency. Reliable UDP (Cisco protocol) may also be used in the future if we want to extend the protocol to the LAN or the WAN.

5.2 Storage Components

Figure 22:
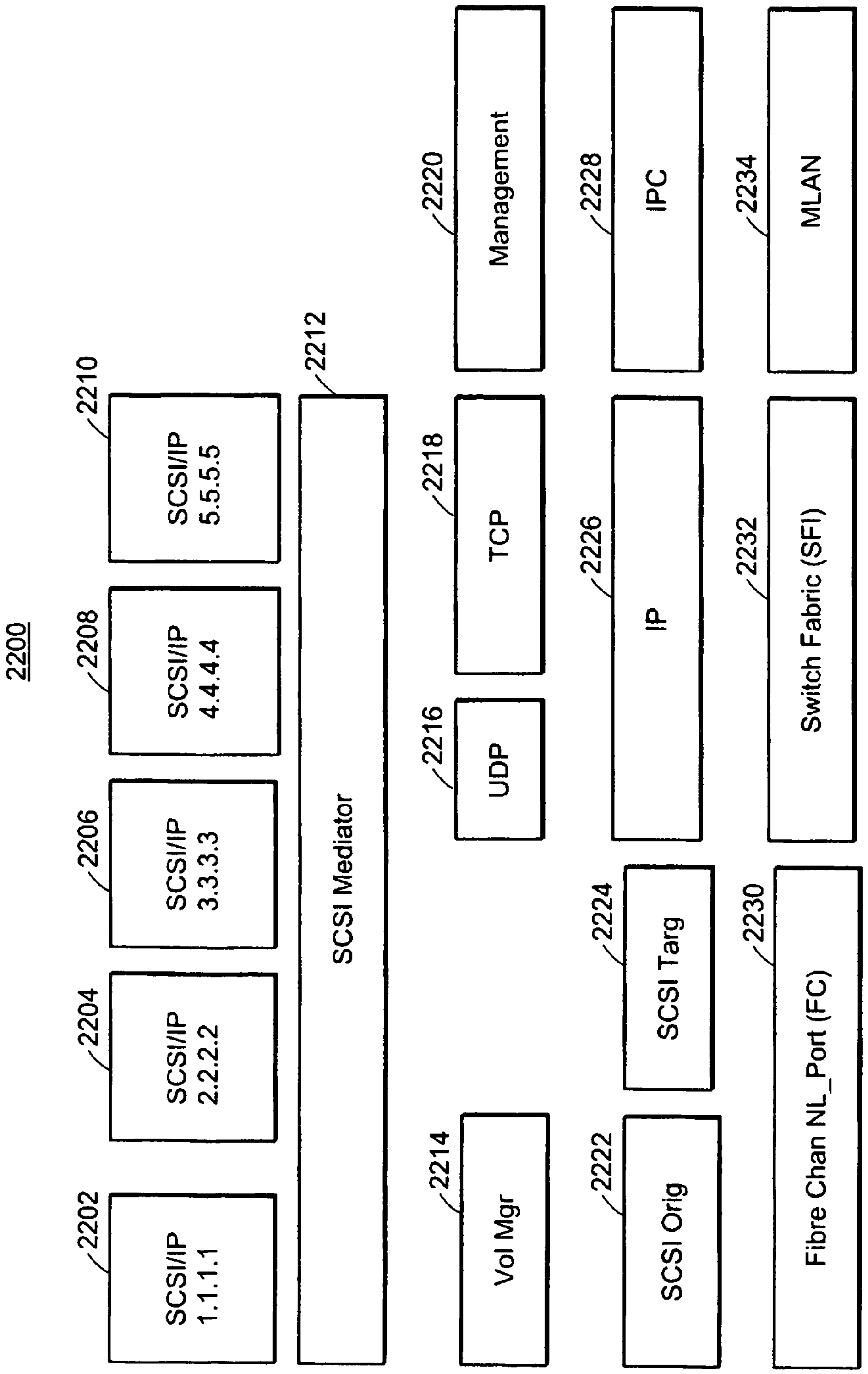
FIG. 22 depicts SRC software storage components.

The following discussion refers to FIG. 22, which depicts software components for storage (2202 et seq.).

5.2.1 SCSI/IP Layer:

The SCSI/IP layer is a full TCP/IP stack and application software dedicated to the mediation protocols. This is the layer that will initiate and terminate SCSI/IP requests for initiators and targets respectively.

5.2 2 SCSI Mediator:

The SCSI mediator acts as a SCSI server to incoming IP payload. This thin module maps between IP addresses and SCSI devices and LUNs.

5.2.3 Volume Manager

The Pirus Volume Manager will provide support for disk formatting, mirroring (RAID-1) and hot spare synchronization. Striping (RAID-0) may also be available in the first release. The VM must be bulletproof in the HA environment. NVRAM can be utilized to increase performance by committing writes before they are actually delivered to disk.

When the Volume manager is enabled a logical volume view is presented to the SCSI mediator as a set of targetable LUNs. These logical volumes do not necessarily correspond to physical SCSI devices and LUNs.

5.2.4 SCSI Originator

In the disclosed architecture this layer will be tightly coupled with the Fibre Channel controller device, with interoperability of this protocol with several current generation drives (IBM, Seagate), JBODs, and disk arrays.

This module can be identical to its counterpart in the SRC NAS image.

5.2. 5 SCSI

Target SCSI target mode support will be required if external FC hosts are permitted to indirectly access remote SCSI disks via mediation (e.g. SCSI/FC->SCSI/FC via SCSI/TCP).

5.2. 6 Fibre Channel

In the disclosed embodiments, support will be provided for fabric node (N_PORT) and arbitrated loop (NL_PORT). The Fibre Channel interface device will provide support for SCSI initiator or target operations.

Interoperability of this interface with current generation FC Fabric switches (Brocade, Ancor) must be assured. Point-to-Point mode must also be supported. This module should be identical to its counterpart in the SRC NAS image.

5.3 Mediation Example

Figure 23:
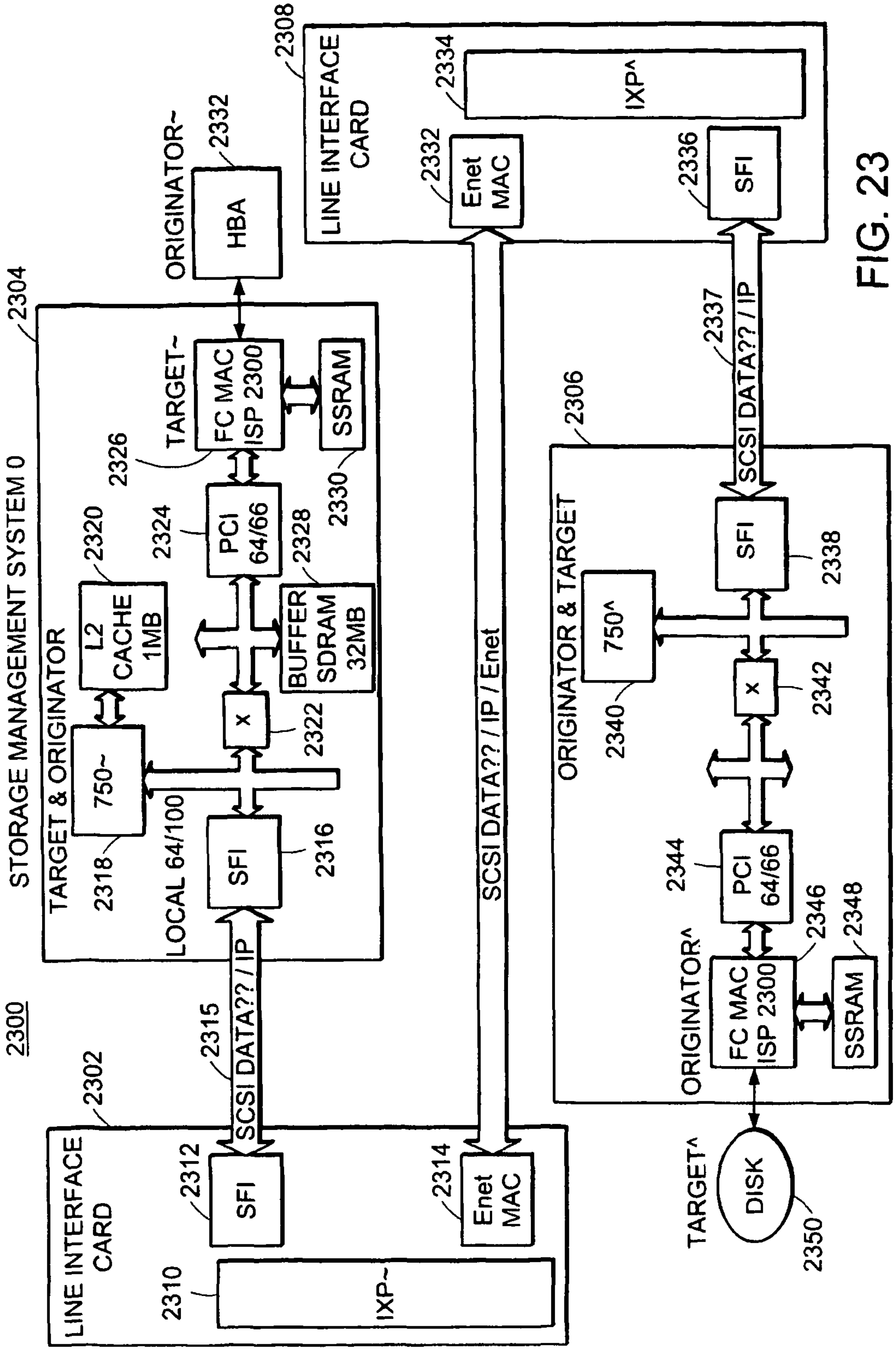
FIG. 23 depicts FC originator/FC target operation.

FIG. 23 depicts an FC originator communicating with an FC Target (elements 2302 et seq), as follows:

ORIGINATOR~sends a SCSI Read Command to TARGET

1. Each Originator/Target pair complete their LIP Sequence. Each 750 is notified of the existence of the Originator~/Target^.

2. 750~generates an IP command that tells IXP~to make a connection to IXP^.

3. 750^ generates an IP command to tell IXPA to make Target^ 'visible' over IP.

4. Originator~issues a SCSI READ CDB to Target-. Target-sends CDB to 750~.

5. 750~builds SCSI/IP request with CDB and issues it to IXP~.

6. IXP~sends packet to IXP^.

7. IXP^ sends IP packet to 750^.

8. 750^ removes SCSI CDB from IP packet and issues SCSI CDB request to OriginatorA (memory for READ COMMAND has been allocated).

9. Originator^ issue FCP_CMND to Target^.

10. When command is complete Target^ sends FCP_RSP to Originator^. Originator^ notifies 750^ with good status.

11. 750^ packages data and status into IP packets sends to IXP^.

12. IXP~sends data and status to IXP~.

13. IXP~sends IP packets with data and status 750~.

14. 750~allocates buffer spaces, dumps data in to buffers and requests Target^ to send data and response to Originator-.

III. NFS Load Balancing

An object of load balancing is that several individual servers are made to appear as a single, virtual, server to a client (s). An overview is provided in FIG. 24, including elements 2402 et seq. In particular, the client makes file system requests to a virtual server. These requests are then directed to one of the servers that make up the virtual server. The file system requests can be broken into two categories; 1) reads, or those requests that do not modify the file system; and 2) writes or those requests that do change the file system.

Read requests do not change the file system and thus can be sent to any of the individual servers that make up the virtual server. Which server a request is sent to is determined by one of several possible load balancing algorithms.

This spreads the requests across several servers resulting in an improvement in performance over a single server. In addition, it allows the performance of a virtual server to be scaled simply by adding more physical servers.

Some of the possible load balancing algorithms are:

1. Round Robin where each request is sent to sequentially to the next server.

2. Weighted access where requests are sent to servers based on a percentage formula, e.g. 15% of the requests go to server A, 35% to server B, and 50% to server C. These Weighting factors can be fixed, or be dynamic based on such factors as server response time.

3. File handle where requests for files that have been acccessed previously are directed back to the server that originally satisfied the request. This increases performance by increasing the likelihood that the file will be found in the server's cache.

Write requests are different from read requests in that they must be broadcast to each of the individual servers so that the file systems on each server stay in sync. Thus, each write request generates several responses, one from each of the individual servers. However, only one response is sent back to the client.

An important way to improve performance is to return to the client the first positive response from any of the servers instead of waiting for all the server responses to be received. This means the client sees the fastest server response instead of the slowest. A problem can arise if all the servers do not send the same response, for example one of the servers fails to do the write while all the others are successful. This results in the server's file systems becoming un-sychronized. In order to catch and fix un-synchronized file systems, each outstanding write request must be remembered and the responses from each of the servers kept track of.

The file handle load balancing algorithm works well for directing requests for a particular file to a particular server. This increases the likelihood that the file will be found in the server's cache, resulting in a corresponding increase in performance over the case where the server has to go out to a disk. It also has the benefit of preventing a single file from being cached on two different servers, which uses the servers' caches more efficiently and allows more files to be cached. The algorithm can be extended to cover the case where a file is being read by many clients and the rate at which it is served to these clients could be improved by having more than one server serve this file. Initially a file's access will be directed to a single server. If the rate at which the file is being accessed exceeds a certain threshold another server can be added to the list of servers that handle this file. Successive requests for this file can be handled in a round robin fashion between the servers setup to handle the file.

Presumably the file will end up in the caches of both servers. This algorithm can handle an arbitrary number of servers handling a single file.

The following discussion describes methods and apparatus for providing NFS server load balancing in a system utilizing the Pirus box, and focuses on the process of how to balance file reads across several servers.

Figure 24:
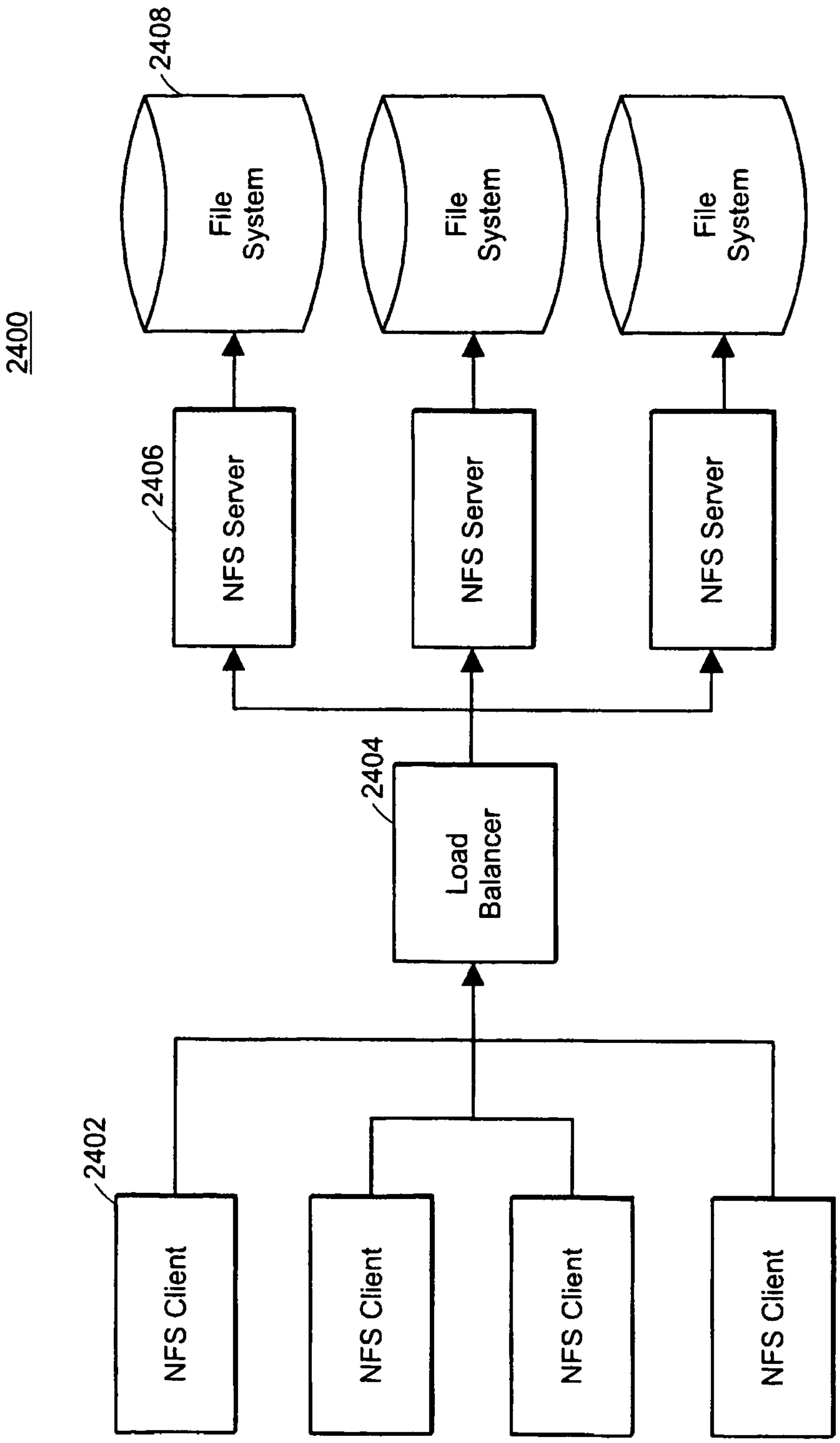
FIG. 24 depicts load balancing NFS client requests between NFS servers.

As illustrated in FIG. 24, NFS load balancing is done so that multiple NFS servers can be viewed as a single server. An NFS client issuing an NFS request does so to a single NFS IP address. These requests are captured by the NFS load balancing functionality and directed toward specific NFS servers.

The determination of which server to send the request to is based on two criteria, the load on the server and whether the server already has the file in cache.

The terms "SA" (the general purpose StrongArm processor that resides inside an IXP) and" Micro-engine" (the Micro-coded processor in the IXP are used herein. In one embodiment of the invention, there are 6 in each IXP.) As shown in the accompanying diagrams and specification, the invention utilizes "workload distribution" methods in conjunction with a multiplicity of NFS (or other protocol) servers. Among these methods (generically referred to herein as"load balancing") are methods of "server load balancing" and"content aware switching".

A preferred practice of the invention combines both"Load Balancing" and"Content Aware Switching" methods to distribute workload within a file server system. A primary goal of this invention is to provide salable performance by adding processing units, while"hiding" this increased system complexity from outside users.

The two methods used to distribute workload have different but complimentary characteristics. Both rely on the common method of examining or interpreting the contents of incoming requests, and then making a workload distribution decision based on the results of that examination.

Content Aware Switching presumes that the multiplicity of servers handle different contents; for example, different subdirectory trees of a common file system. In this mode of operation, the workload distribution method would be to pass requests for (e.g.) "subdirectory A" to one server, and "subdirectory B" to another. This method provides a fair distribution of workload among servers, given a statistically large population of independent requests, but can not provide enhanced response to a large number of simultaneous requests for a small set of files residing on a single server.

Server Load Balancing presumes that the multiplicity of servers handle similar content; for example, different RAID 1 replications of the same file system. In this mode of operation, the workload distribution method would be to select one of the set of available servers, based on criteria such as the load on the server, its availability, and whether it has the requested file in cache.

This method provides a fair distribution of workload among servers, when there are many simultaneous requests for a relatively small set of files.

These two methods may be combined, with content aware switching selecting among sets of servers, within which load balancing is performed to direct traffic to individual servers. As a separate invention, the content of the servers may be dynamically changed, for example by creating additional copies of commonly requested files, to provide additional server capacity transparently to the user.

As shown in the accompanying diagrams and specification, one element of the invention is the use of multiple computational elements, e.g. Network Processors and/or Storage CPUs, interconnected with a high speed connection network, such as a packet switch, crossbar switch, or shared memory system.

The resultant tight, low latency coupling facilitates the passing of necessary state information between the traffic distribution method and the file server method.

1. Operation 1.1

Figures 25, 25A:
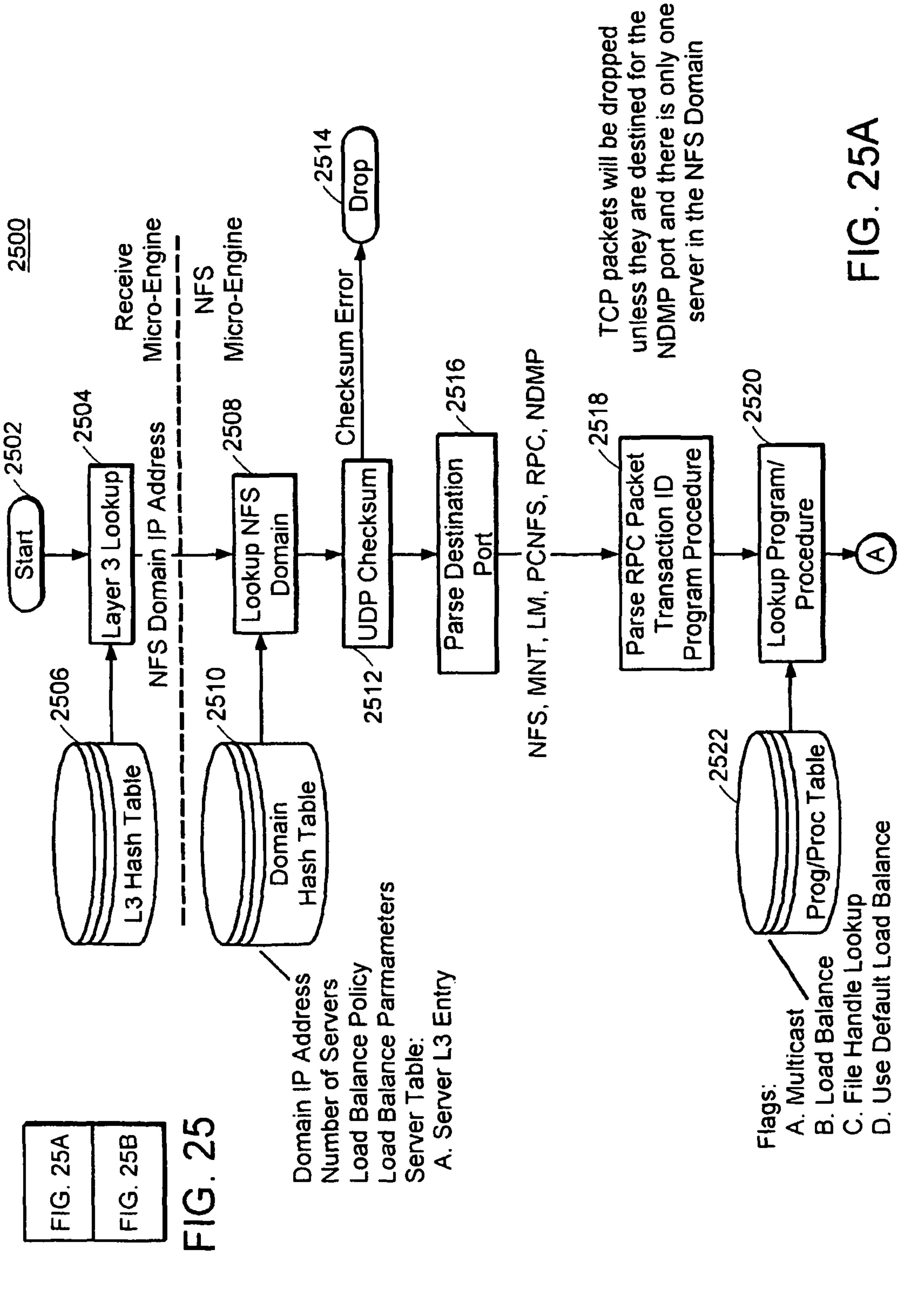
FIG. 25 depicts NFS receive micro-code flow.
FIG. 25A depicts one portion of the NFS receive micro-code flow of FIG. 25.
Figure 25B:
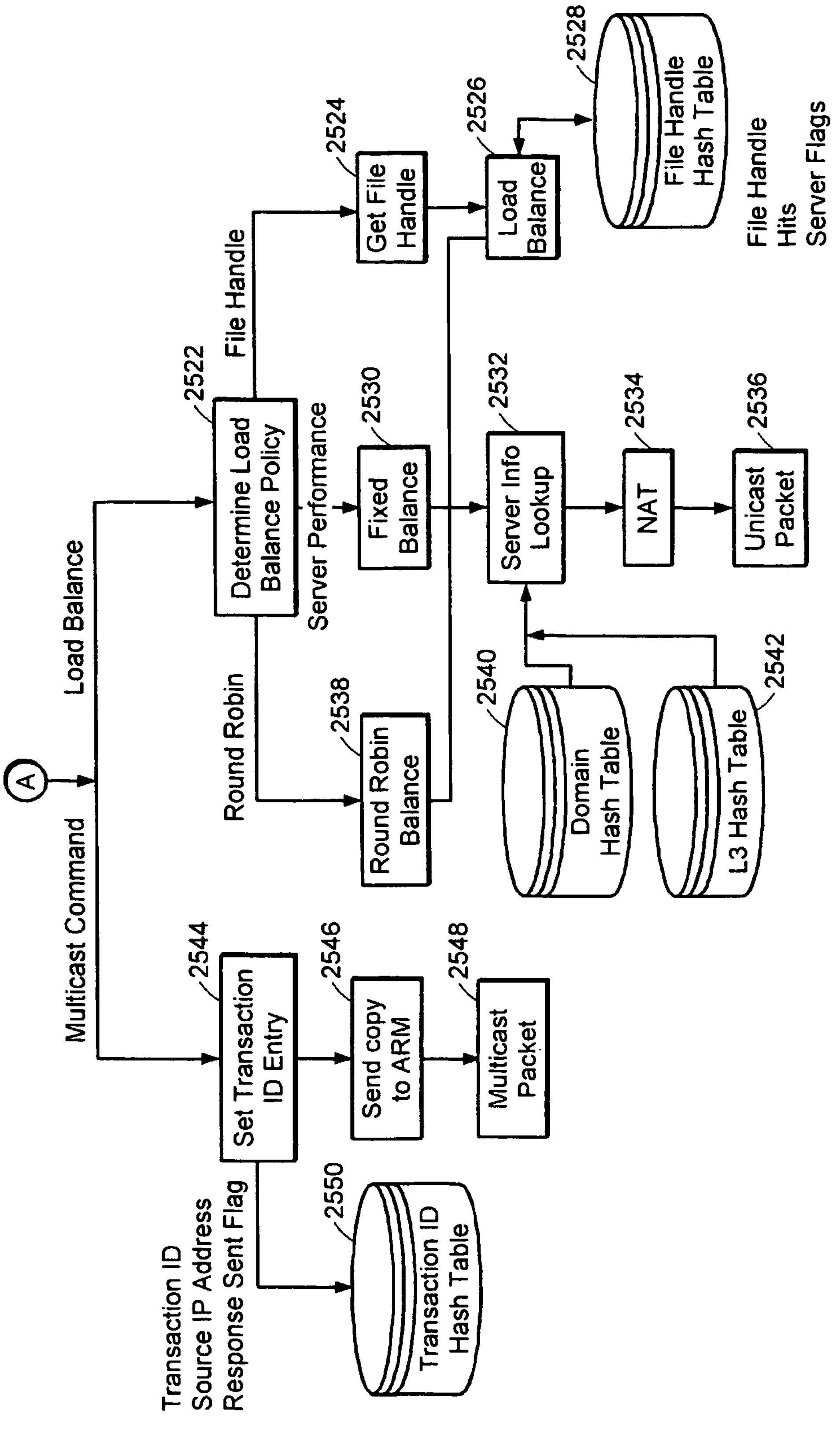
FIG. 25B depicts another portion of the NFS receive micro-code flow of FIG. 25.
Figure 26:
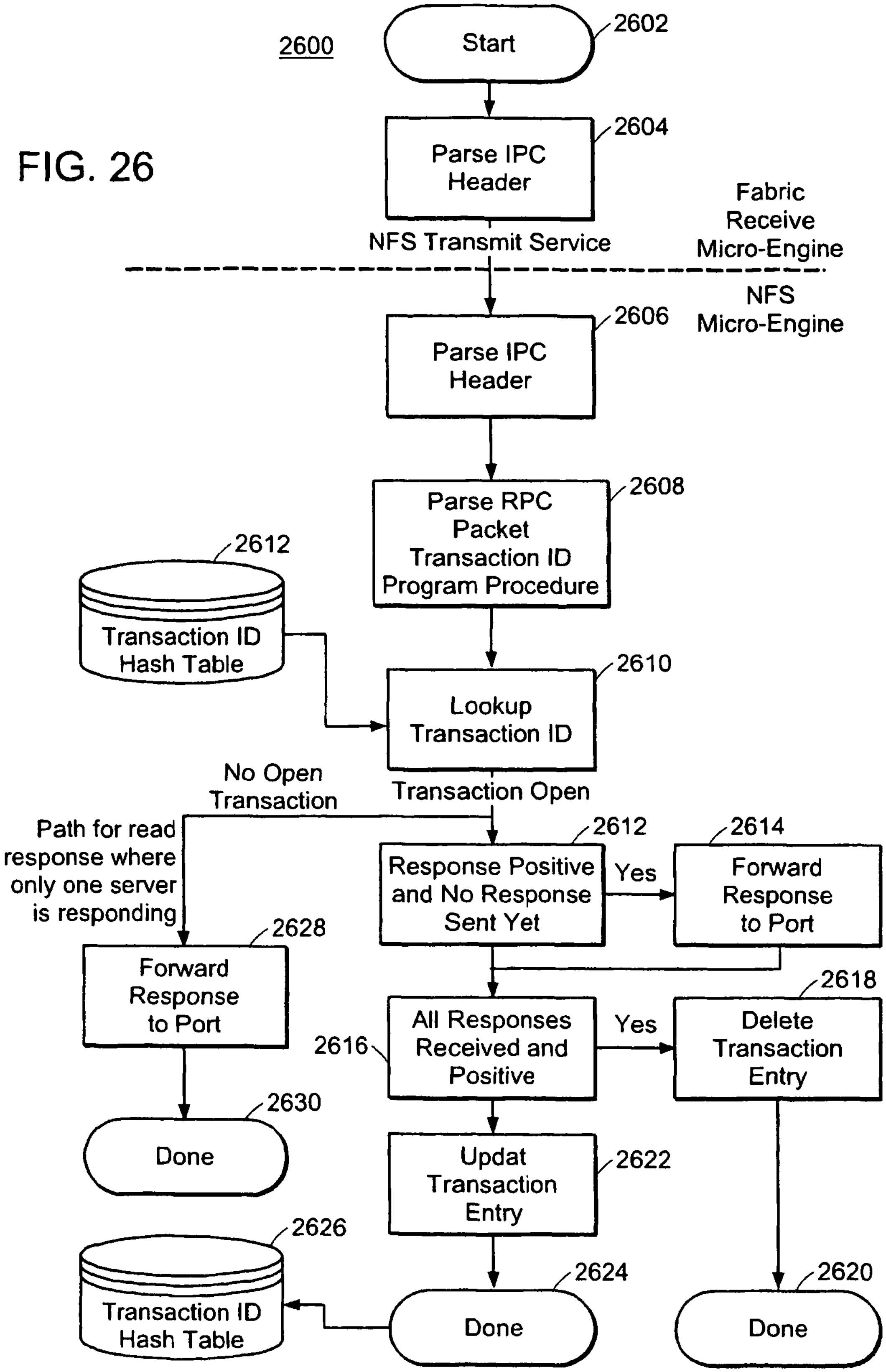
FIG. 26 depicts NFS transmit micro-code flow.

Read Requests Referring now to FIGS. 25 and 26, the following is the sequence of events that occurs in one embodiment of the invention, when an NFS READ (could also include other requests like LOOKUP) request is received.

1. A Micro-engine receives a packet on one of its ports from an NFS client that contains a READ request to the NFS domain.

2. The Micro-engine uses the file handle contained in the request to perform a lookup in a file handle hash table.

3. The hash lookup results in a pointer to a file handle entry (we'll assume a hit for now).

4. In the hash table is the IP address for the specific NFS server the request should be directed to. Presumably this NFS server should have the file in its cache and thus be able to serve it up more quickly than one that does not.

5. The destination IP address of the packet with the READ request is updated with the server IP address and then forwarded to the server.

A hash table entry can have more than one NFS server IP address. This allows a file that is under heavy access to exist in more than one NFS server cache and thus to be served up by more than one server. The selection of which specific server to direct a specific READ request to can be determined, but could be as simple as a round robin.

1.2 Determining the Number of Servers for a File

The desired behavior is that:

1. Files that are lightly accessed, i.e. have a low number of accesses per second, only need to be served by a single server.

2. Files that are heavily accessed are served by more than one server.

3. Accesses to a file are directed to the same server, or set of servers if it is being heavily accessed, to keep accesses directed to those servers that have that file in its cache.

1.3 Server Lists

Figure 27:
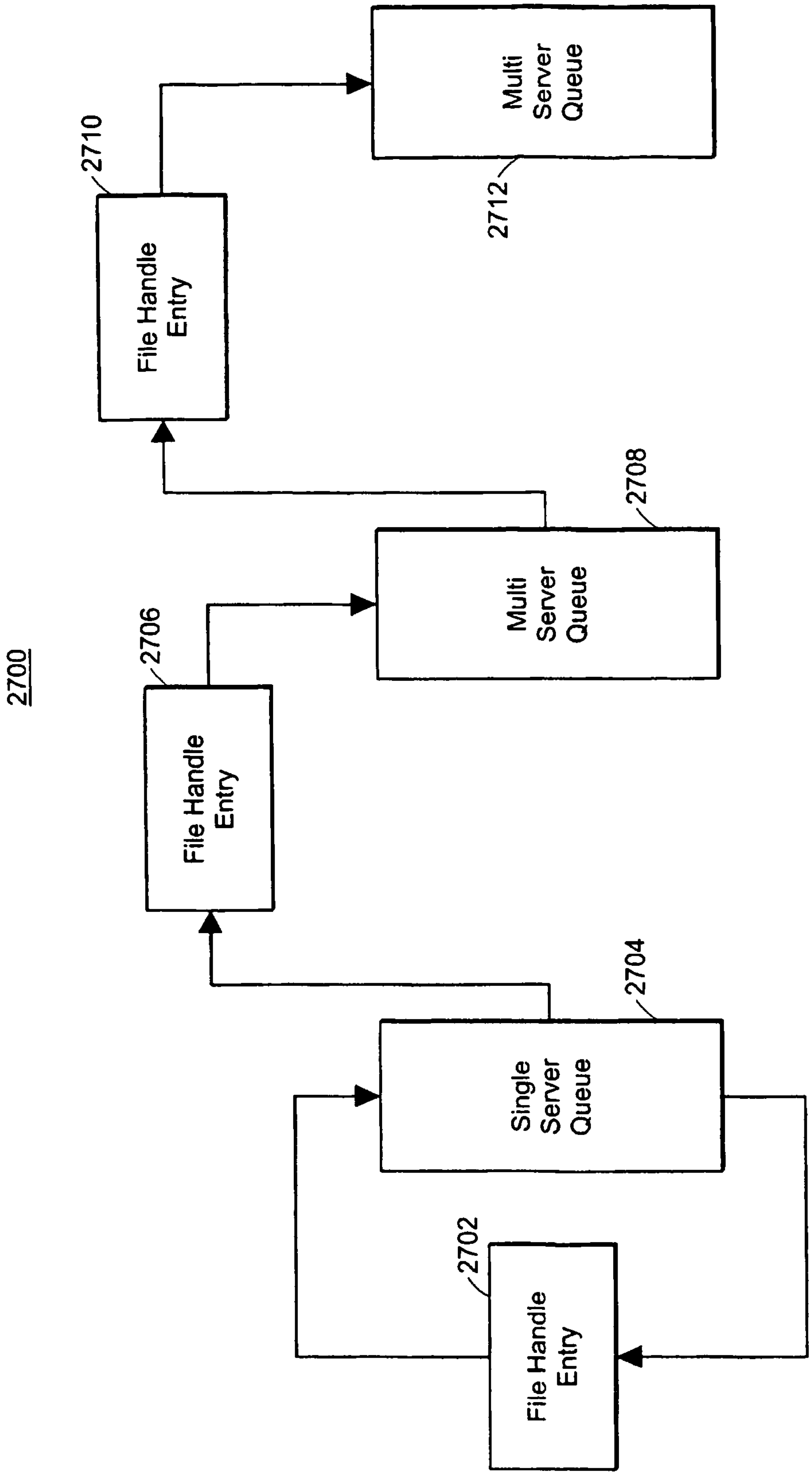
FIG. 27 depicts file handle entry into multiple server lists.

In addition to being able to be looked up using the file handle hash table, file handle entries can be placed on doubly linked lists. There can be a number of such linked lists. Each list has the file handle entries on it that have a specific number of servers serving them. There is a list for file handle entries that have only one server serving them. Thus, as shown in FIG. 27, for example, there might a total of three lists; a single server list, a two-server list and a four-server list. The single server list has entries in it that are being served by one server, the two-server list is a list of the entries being served by two servers, etc. File handle entries are moved from list to list as the frequency of access increases or decreases.

1. 3.1 Single Server List

All the file handle entries begin on the single server list. When a READ request is received the file handle in the READ is used to access the hash table. If there is no entry for that file handle a free entry is taken from the entry free list and a single server is selected to serve the file, by some criteria such as least loaded, fastest responding or round robin. If no entries are free then a server is selected and the request is sent directly to it without an entry being filled out. Once a new entry is filled out it is added to the hash table and placed at the top of the single server list queue.

Periodically, a process check the free list and if it is close to empty it will take some number of entries off the bottom of the single server list, remove them from hash table and then place them back on the free list. This keeps the free list replenished.

Since entries are placed on the top of the list and taken off from the bottom, each entry spends a certain amount of time on the list, which varies according to rate at which new file handle READ requests occur. During the period of time that an entry exists on the list it has the opportunity to be hit by another READ access. Each time a hit occurs a counter is bumped in the entry. If an entry receives enough hits while it is on the list to exceed a pre-defined threshold it is deemed to have enough activity to it to deserve to have more servers serving it. Such an entry is then taken off the single server list, additional servers selected to serve the file, and then placed on one of the multiple server lists.

In the illustrated embodiment of the invention, it is expected that the micro-engines will handle the lookup and forwarding of requests to the servers, and that the SA will handle all the entry movements between lists and adding and removing them from the hash table. However, other distributions of labor can be utilized.

1.3.2 Multiple Server Lists

In addition to the single server list, there are multiple server lists. Each multiple server list contains the entries that are being served by the same number of servers. Just like with entries on the single server list, entries on the multiple server lists get promoted to the top of the next list when their frequency of access exceeds a certain threshold. Thus a file that is being heavily accessed might move from the single server list, to the dual server list and finally to the quad server list.

When an entry moves to a new list it is added to the top of that list.

Periodically, a process will re-sort the list by frequency of access. As a file becomes less frequently accessed it will move toward the bottom of its list.

Eventually the frequency of access will fall below a certain threshold and the entry will be placed on the top of the previous list, e.g. an entry might fall off the quad server list and be put on the dual server list. During this demotion process the number of servers serving this file will be reduced.

1.4 Synchronizing Lists Across Multiple IXP's

The above scheme works well when one entity, i.e., an IXP, sees all the file READ requests. However, this will not be the case in most systems. In order to have the same set of servers serving a file information must be passed between IXP's that have the same file entry. This information needs to be passed when an entry is promoted or demoted between lists, as this is when servers are added or taken away.

When an entry is going to be promoted by an IXP it first broadcasts to all the other IXP's asking for their file handle entries for the file handle of the entry it wants to promote. When it receives the entries from the other IXP's it looks to see whether one of the other IXP's has already promoted this entry. If it has, it adds the new servers from that entry. If not, it selects new servers based on some TBD criteria.

Demotion of an entry from one list to the other works much the same way, except that when the demoting IXP looks at the entries from the other IXP's it looks for entries that have less servers than its entry currently does. If there are any then it selects those servers. This keeps the same set of servers serving a file even as fewer of them are serving it. If there are no entries with fewer servers, then the IXP can use one or more criteria to remove the needed number of servers from the entry.

There are advantages to making load balancing decisions based upon filehandle information. When the inode portion of the filehandle is used to select a unique target NAS server for information reads, a maximally distributed cache is achieved. When an entire NAS working set of files fits in any one cache then a lowest latency response system is created by allowing all working set files to be simultaneously inside every NAS server's cache. Load balancing is then best performed using a round-robin policy.

Pirus NAS servers will provide cache utilization feedback to an IXP load balancer. The LB can use this feedback to dynamically shift between maximally distributed caching and round-robin balancing for smaller working sets. These processes are depicted in FIGS. 25 and 26 (NFS Receive Micro-Code Flowchart and NFS Transmit Micro-Code Flowchart).

IV. Intelligent Forwarding and Filtering

The following discussion describes certain Pirus box functions referred to as intelligent forwarding and filtering (IFF). IFF is optimized to support the load balancing function described elsewhere herein. Hence, the following discussion contains various load balancing definitions that will facilitate an understanding of IFF.

Figure 28:
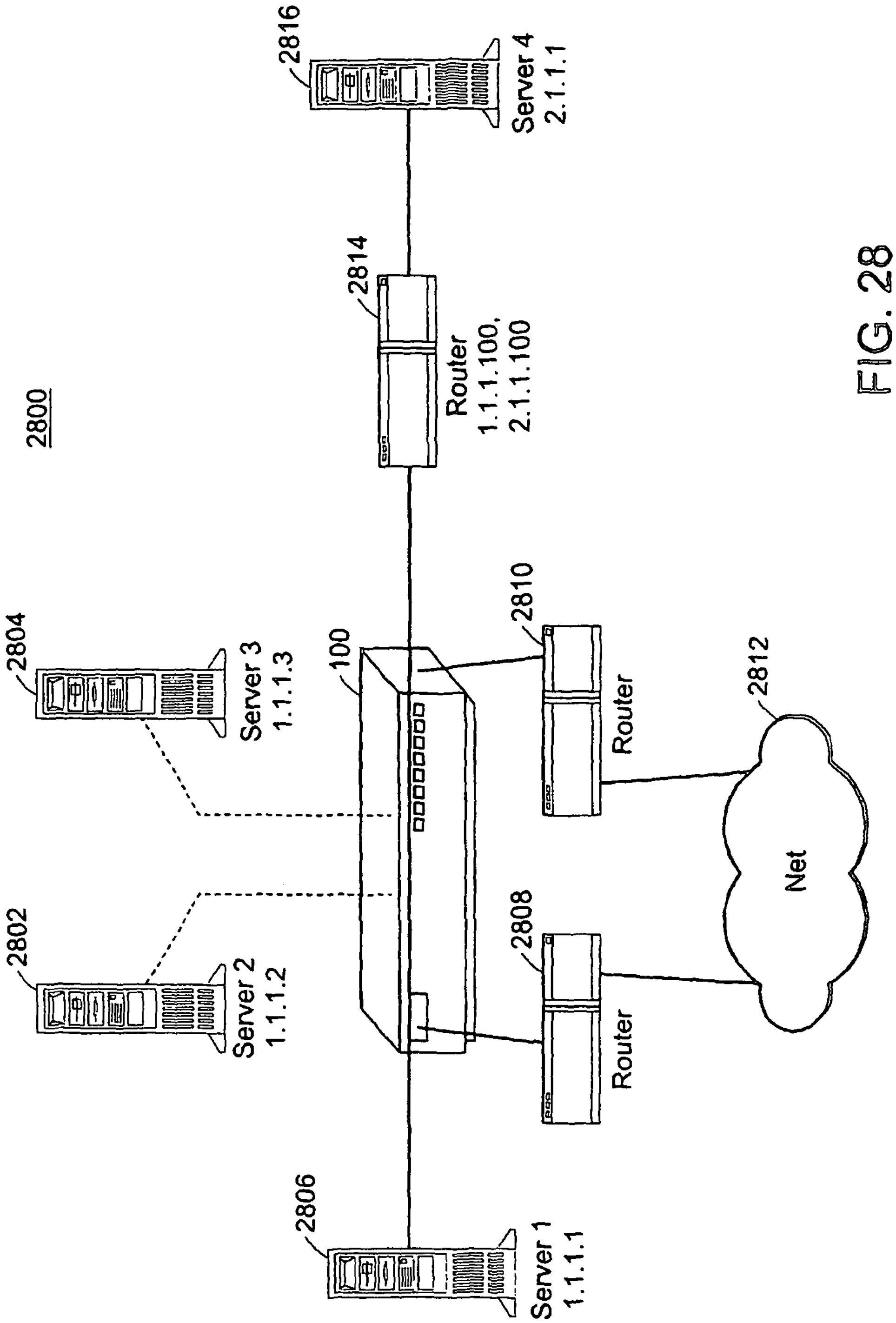
FIG. 28 depicts a sample network configuration in another embodiment of the invention.

As noted elsewhere herein, the Pirus box provides load-balancing functions, in a manner that is transparent to the client and server. Therefore, the packets that traverse the box do not incur a hop count as they would, for example, when traversing a router. FIG. 28 is illustrative. In FIG. 28, Servers 1,2 , and 3 are directly connected to the Pirus box (denoted by the pear icon), and packets forwarded to them are sent to their respective MAC addresses. Server 4 sits behind a router and packets forwarded to it are sent to the MAC address of the router interface that connects to the Pirus box. Two upstream routers forward packets from the Internet to the Pirus box.

1. Definitions The following definitions are used in this discussion:

A Server Network Processor (SNP) provides the functionality for ports connected to servers. Packets received from a server are processed an SNP.

A Router Network Processor (RNP) provides the functionality for ports connected to routers or similar devices. Packets received from a router are processed an RNP.

In accordance with the invention, an NP may support the role of RNP and SNP simultaneously. This is likely to be true, for example, on 10/100 Ethernet modules, as the NP will server many ports, connected to both routers and servers.

An upstream router is the router that connects the Internet to the Pirus box.

2. Virtual Domains

As used herein, the term "virtual domain" denotes a portion of a domain that is served by the Pirus box. It is "virtual" because the entire domain may be distributed throughout the Internet and a global load-balancing scheme can be used to"tie it all together" into a single domain.

In one practice of the invention, defining a virtual domain, on a Pirus box requires specifying one or more URLs, such as www.fred.com, and one or more virtual IP addresses that are used by clients to address the domain. In addition, a list of the IP addresses of the physical servers that provide the content for the domain must be specified; the Pirus box will load-balance across these servers. Each physical server definition will include, among other things, the IP address of the server and, optionally, a protocol and port number (used for TCP/UDP port multiplexing-see below).

For servers that are not directly connected to the Pirus box, a route, most likely static, will need to be present; this route will contain either the IP address or IP subnet of the server that is NOT directly connected, with a gateway that is the IP address of the router interface that connects to the Pirus box to be used as the next-hop to the server.

The IP subnet/mask pairs of the devices that make up the virtual domain should be configured. These subnet/mask pairs indirectly create a route table for the virtual domain. This allows the Pirus box to forward packets within a virtual domain, such as from content servers to application or database servers. A mask of 255.255.255.255 can be used to add a static host route to a particular device.

Figure 29:
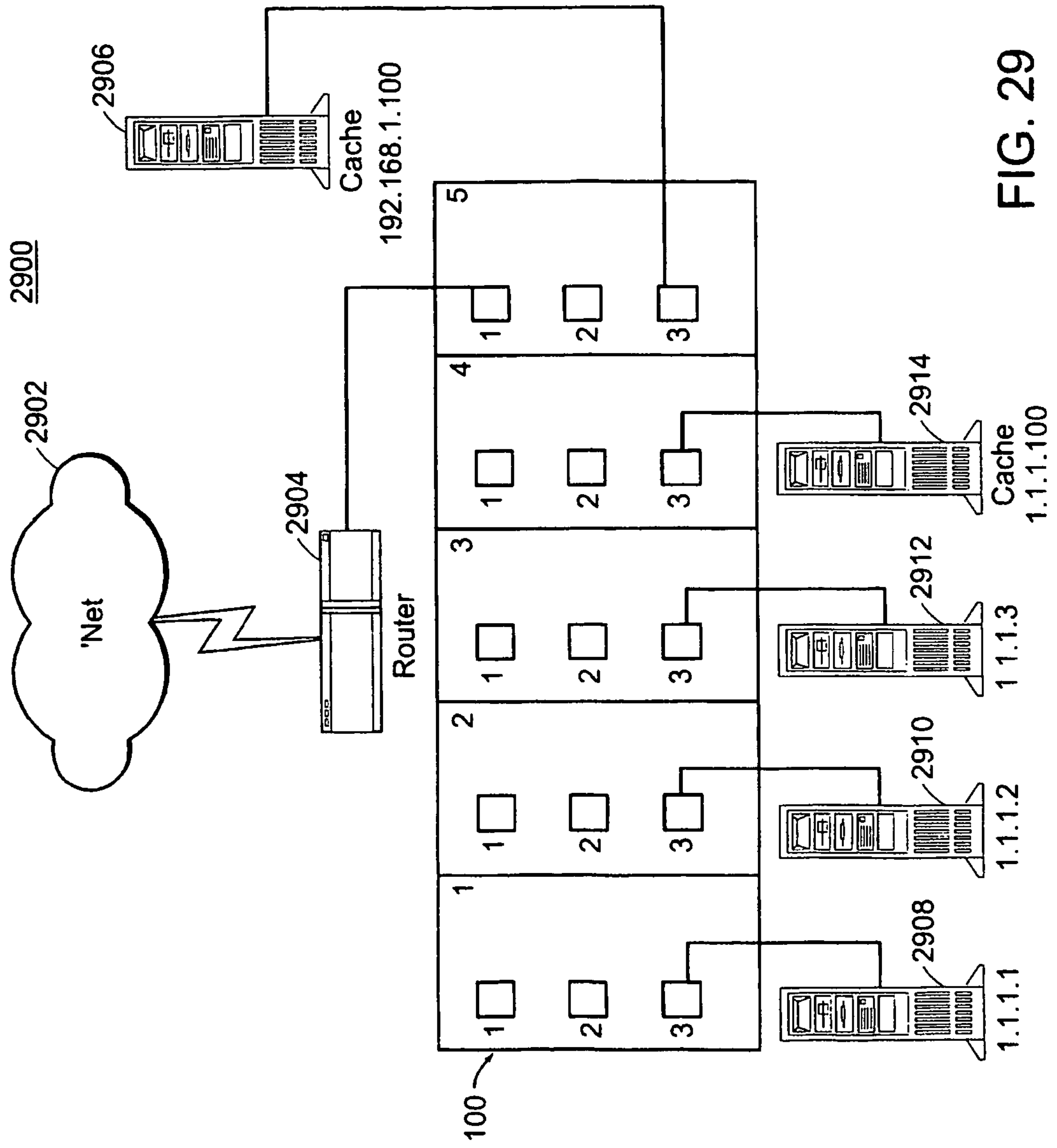
FIG. 29 depicts an example of a virtual domain configuration.

The Pirus box may be assigned an IP address from this subnet/mask pair. This IP address will be used in all IP and ARP packets authored by the Pirus box and sent to devices in the virtual domain. If an IP address is not assigned, all IP and ARP packets will contain a source IP address equal to one of the virtual IP addresses of the domain. FIG. 29 is illustrative. In FIG. 29, the Pirus box is designated by numeral 100. Also in FIG. 29, the syntax for a port is <slot number>. <port number>) ports 1.3, 2.3, 3.3, 4.3, 5.1 and 5.3 are part of the same virtual domain. Server 1.1. 1.1 may need to send packets to Cache 1.1. 1.100. Even though the Cache may not be explicitly configured as part of the virtual domain, configuring the virtual domain with an IP subnet/mask of 1.1. 1.0/255. 255.255. 0 will allow the servers to communicate with the cache. Server 1.1. 1.1 may also need to send packets to Cache 192.168. 1.100. Since this IP subnet is outside the scope of the virtual domain (i.e., the cache, and therefore the IP address, may be owned by the ISP), a static host route can be added to this one particular device.

2.1 Network Address Translation In one practice of the invention, Network Address Translation, or NAT, is performed on packets sent to or from a virtual IP address. In FIG. 29 above, a client connected to the Internet will send a packet to a virtual IP address representing a virtual domain. The load-balancing function will select a physical server to send the packet to. NAT results in the destination IP address (and possibly the destination TCP/UDP port, if port multiplexing is being used) being changed to that of the physical server. The response packet from the server also has NAT performed on it to change the source IP address (and possibly the source TCP/UDP port) to that of the virtual domain.

NAT is also performed when a load-balanceable server sends a request that also passes through the load-balancing function, such as an NFS request. In this case, the server assumes the role of a client.

3. VLAN Definition

It is contemplated that since the Pirus box will have many physical ports, the Virtual LAN (VLAN) concept will be supported. Ports that connect to servers and upstream routers will be grouped into their own VLAN, and the VLAN will be added to the configuration of a virtual domain.

In one practice of the invention, a virtual domain will be configured with exactly one VLAN. Although the server farms comprising the virtual domain may belong to multiple subnets, the Pirus box will not be routing (in a traditional sense) between the subnets, but will be performing a form of L3 switching.

Unlike today's L3 switch/routers that switch frames within a VLAN at Layer 2 and route packets between VLANs at Layer 3, the Pirus box will switch packets using a combination of Layer 2 and Layer 3 information. It is expected that the complexity of routing between multiple VLANs will be avoided.

By default, packets received on all ports in the VLAN of a virtual domain are candidates for load balancing. On Router ports (see 4.4. 1, Router Port), these packets are usually HTTP or FTP requests. On Server ports (see 4.4. 2, Server Port), these packets are usually back-end server requests, such as NFS.

All packets received by the Pirus box are classified to a VLAN and are, hence, associated with a virtual domain. In some cases, this classification may be ambiguous because, with certain constraints, a physical port may belong to more than one VLAN. These constraints are discussed below.

3.1 Default VLAN

In one practice of the invention, by default, every port will be assigned to the Default VLAN. All non-IP packets received by the Pirus box are classified to the Default VLAN. If a port is removed from the Default VLAN, non-IP packets received on that port are discarded, and non-IP packets received on other ports will not be sent on that port.

In accordance with this practice of the invention, all non-IP packets will be handled in the slow path. This CPU will need to build and maintain MAC address tables to avoid flooding all received packets on the Default VLAN.

The packets will be forwarded to a single CPU determined by an election process. This avoids having to copy (potentially large) forwarding tables between slots but may result in each packet traversing the switch fabric twice.

3.2 Server Administration

VLAN Devices connected to ports on the Server Administration VLAN can manage the physical servers in any virtual domain. By providing only this form of inter-VLAN routing, the system can avoid having to add Server Administration ports (see below) to the VLANs of every virtual domain that the server administration stations will manage.

3.3 Server Access VLAN

A Server Access VLAN is used internally between Pirus boxes. A Pirus box can make a load-balancing decision to send a packet to a physical server that is connected to another Pirus box. The packet will be sent on a Server Access VLAN that, unlike packets received on Router ports, may directly address physical servers. See the discussion of Load Balancing elsewhere herein for additional information on how this is used.

3.4 Port Types 3.4.1 Router Port

In one embodiment of the invention, one or more Router ports will be added to the VLAN configuration of a virtual domain. Note that a Router port is likely to be carrying traffic for many virtual domains.

Classifying a packet received on a Router port to a VLAN of a virtual domain is done by matching the destination IP address to one of the virtual IP addresses of the configured virtual domains.

ARP requests sent by the Pirus box to determine the MAC address and physical port of the servers that are configured as part of a virtual domain are not sent out Router ports. If a server is connected to the same port as an upstream router, the port must be configured as a Combo port (see below).

3.4.2 Server Port

Server ports connect to the servers that provide the content for a virtual domain. A Server port will most likely be connected to a single server, although it may be connected to multiple servers.

Classifying a packet received on a Server port to a VLAN of a virtual domain may require a number of steps.

1. using the VLAN of the port if the port is part of a single VLAN 2. matching the destination IP address and TCP/UDP port number to the source of a flow (i.e., an HTTP response)

3. matching the destination IP address to one of the virtual IP addresses of the configured virtual domains (i.e., an NFS request) The default and preferred configuration is for a Server port to be a member of a single VLAN. However, multiple servers, physical or logical, may be connected to the same port and be in different VLANs only if the packets received on that port can unambiguously be associated with one of the VLANs on that port.

One way for this is to use different IP subnets for all devices on the VLANs that the port connects to. TCP/UDP port multiplexing is often configured with a single IP address on a server and multiple TCP/UDP ports, one per virtual domain. It is preferable to also use a different IP address with each TCP/UDP port, but this is necessary only if the single server needs to send packets with TCP/UDP ports other than the ones configured on the Pirus box.

Figure 30:
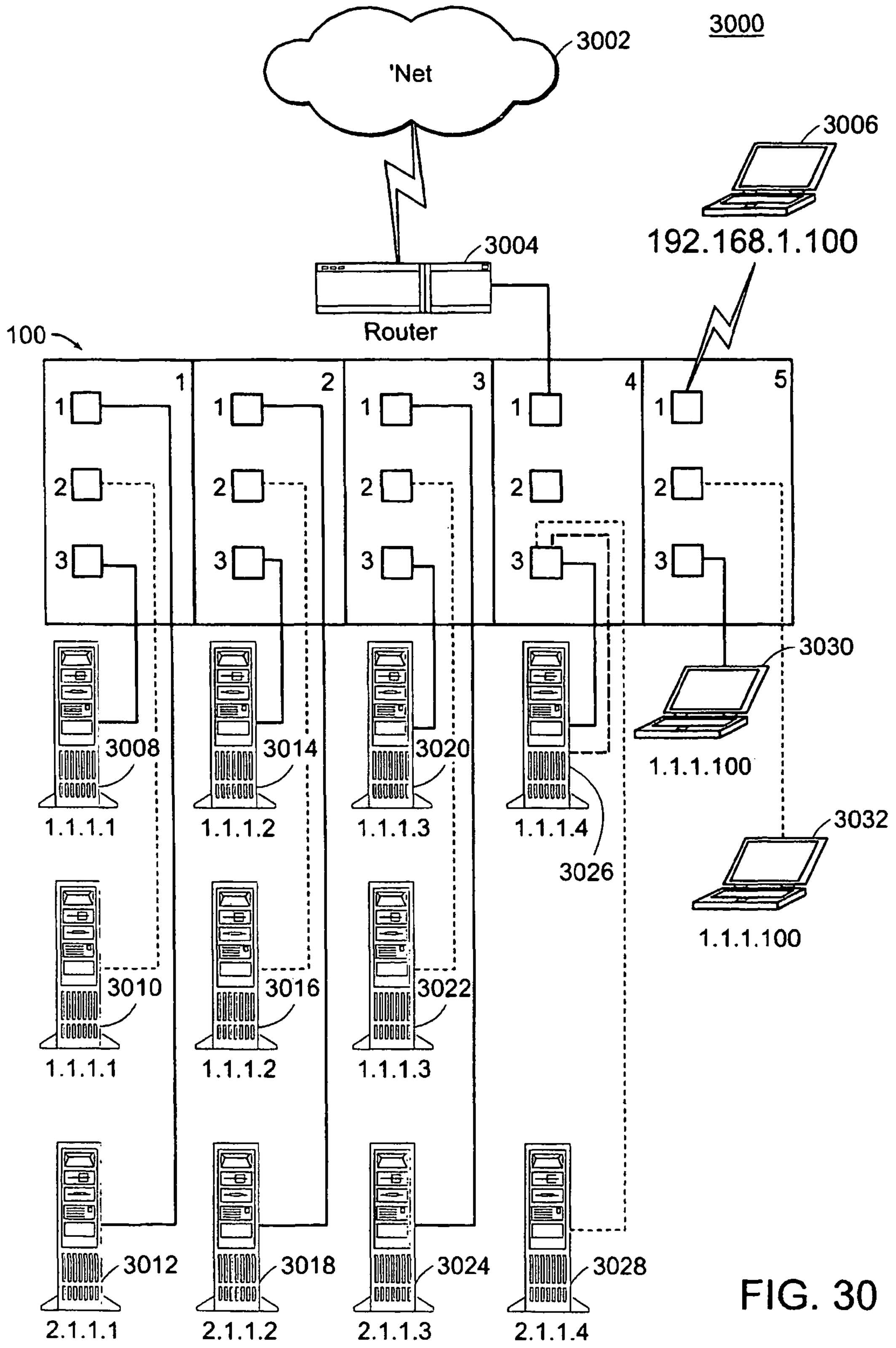
FIG. 30 depicts an example of a VLAN configuration.

In FIG. 30, the physical server with IP address 1.1.1.4 provides HTTP content for two virtual domains, www.larry.com and www.curly.com. TCP/UDP port multiplexing is used to allow the same server to provide content for both virtual domains. When the Pirus box load balances packets to this server, it will use NAT to translate the destination IP address to 1.1.1.4 and the TCP port to 8001 for packets sent to www. larry.com and 8002 for packets sent to www. curly. com.

Packets sent from this server with a source TCP port of 8001 or 8002 can be classified to the appropriate domain. But if the server needs to send packets with other source ports (i.e., if it needs to perform an NFS request), it is ambiguous as to which domain the packet should be mapped.

The list of physical servers that make up a domain may require significant configuration. The IP addresses of each must be entered as part of the domain. To minimize the amount of information that the administrator must provide, the Pirus box determines the physical port that connects to a server, as well as its MAC address, by issuing ARP requests to the IP addresses of the servers. The initial ARP requests are only sent out Server and Combo ports. The management software may allow the administrator to specify the physical port to which a server is attached. This restricts the ARP request used to obtain the MAC address to that port only.

A Server port may be connected to a router that sits between the Pirus box and a server farm. In this configuration, the VLAN of the virtual domain must be configured with a static route of the subnet of the server farm that points to the IP address of the router port connected to the Pirus box. This intermediate router needs a route back to the Pirus box as well (either a default route or a route to the virtual IP address (es) of the virtual domain (s) served by the server farm.

3.4.3 Combo Port

A Combo port, as defined herein, is connected to both upstream routers and servers. Packet VLAN classification first follows the rules for Router ports then Server ports.

3.4.4 Server Administration Port

A Server Administration port is connected to nodes that administer servers. Unlike packets received on a Router port, packets received on a Server Administration port can be sent directly to servers. Packets can also be sent to virtual IP addresses in order to test the load-balancing function.

A Server Administration port may be assigned to a VLAN that is associated with a virtual domain, or it may be assigned to the Server Administration VLAN. The former is straightforward-the packets are forwarded only to servers that are part of the virtual domain. The latter case is more complicated, as the packets received on the Server Administration port can only be sent to a particular server if that server's IP address is unique among all server IP addresses known to the Pirus box. This uniqueness requirement also applies if the same server is in two different virtual domains with TCP/UDP port multiplexing.

3.4.5 Server Access Port A Server Access port is similar to a trunk port on a conventional Layer 2 switch. It is used to connect to another Pirus box and carry"tagged" traffic for multiple VLANs. This allows one Pirus box to forward a packet to a server connected to another Pirus box.

The Pirus box will use the IEEE 802. 1Q VLAN trunking format. A VLAN ID will be assigned to the VLAN that is associated with the virtual domain. This VLAN ID will be carried in the VLAN tag field of the 802. 1Q header.

3.4.6 Example of VLAN FIG. 30 is illustrative of a VLAN. Referring now to FIG. 30, the Pirus box, designated by the pear icon, is shown with 5 slots, each of which has 3 ports. The VLAN configuration is as follows (the syntax for a port is slot number>. <port number>):

VLAN 1

Server ports 1.1, 2.1, 3.1 and 4.3 (denoted in picture by a dotted line)

Router port 4.1 (denoted in picture by a heavy solid line)

VLAN 2

Server ports 1.2, 2.2, 3.2 and 4.3 (denoted in picture by a dashed line)

Server Administration port 5.2

Router port 4.1 (denoted in picture by a heavy solid line)

VLAN 3

Server ports 1.3, 2.3, 3.3 and 4.3 (denoted in picture by a solid line) o Server Administration port 5.3

Router port 4.1 (denoted in picture by a heavy solid line) Server Administration VLAN Server Administration port 5.1 (denoted in picture by wide area link)

An exemplary virtual domain configuration is as follows:

Virtual domain www.moe.com

Virtual IP address 100.1.1.1

VLAN 1§Server 2.1.1.1 §Server 2.1.1.2 §Server 2.1.1.3 §Server 2.1.1.4 Virtual domain www.larry.com Virtual IP address 200.1.1.1

VLAN 2

Server 1.1.1.1

Server 1.1.1.2

Server 1.1.1.3

Server 1.1.1.4 Port 8001 Virtual domain www.curly.com

Virtual IP address 300.1. 1.1

VLAN 3

Server 1.1.1.1

Server 1.1.1.2

Server 1.1.1.3

Server 1.1.1.4 Port 8002

Domain www.larry.com and www.curly.com each have a VLAN containing 3 servers with the same IP addresses: 1.1.1.1, 1.1.1.2 and 1.1.1.3. This functionality allows different customers to have virtual domains with servers using their own private address space that doesn't need to be unique among all the servers known to the Pirus box. They also contain the same server with IP address 1.1. 1.4. Note the Port number in the configuration. This is an example of TCP/UDP port multiplexing, where different domains can use the same server, each using a unique port number. Domain www.moe.com has servers in their own address space, although server 2.1.1.4 is connected to the same port (4.3) as server 1.1.1.4 shared by the other two domains.

The administration station connected to port 5.2 is used to administer the servers in the www.larry.com virtual domain, and the station connected to 5.3 is used to administer the servers in the www.curly.com domain. The administration station connected to port 5.1 can administer the servers in www.moe.com.

4. Filtering Function The filtering function of an RNP performs filtering on packets received from an upstream router. This ensures that the physical servers downstream from the Pirus box are not accessed directly from clients connected to the Internet 5. Forwarding Function The Pirus box will track flows between IP devices. A flow is a bi-directional conversation between two connected IP devices; it is identified by a source IP address, source UDP/TCP port, destination IP address, and destination TCP/UDP port.

A single flow table will contain flow entries for each flow through the Pirus box. The forwarding entry content, creation, removal and use are discussed below.

5.1 Flow Entry Description

A flow entry describes a flow and the information necessary to reach the endpoints of the flow. A flow entry contains the following information:

| Attribute | # of Bytes | Description |
|---|---|---|
| Source IP address | 4 | Source IP address |
| Destination IP address | 4 | Destination IP address |
| Source TCP/UDP port | 2 | Source higher layer port |
| Destination TCP/UDP port | 2 | Destination higher layer port |
| Source physical port | 2 | Physical port of the source |
| Source next-hop MAC address | 6 | The MAC address of next-hop to source |
| Destination physical port | 2 | Physical port of destination |
| Destination next-hop MAC | 6 | MC address of next-hop to address destination |
| NAT IP address | 4 | Translation IP address |
| NAT TCP/UDP port | 2 | Translation higher layer port |
| Flags | 2 | Various flags |
| Received packets | 2 | No. packets received from source IP address |
| Transmitted packets | 2 | No. packets sent to source IP address |
| Received bytes | 4 | No. bytes received from source IP address |
| Transmitted bytes | 4 | No. bytes sent to source IP address |
| Next pointer (receive path) | 4 | Pointer to next forwarding entry in hash table used in the receive path |
| Next pointer (transmit path) | 4 | Pointer to next forwarding entry in the hash table used in the transmit path |
| Transmit path key | 4 | Smaller key unique |

Total 60 among all flow entries

In accordance with the invention, the IP addresses and TCP/UDP ports in a flow entry are relative to the direction of the flow. Therefore, a flow entry for a flow will be different in the flow tables that handle each direction. This means a flow will have 2 different flow entries, one on the NP that connects to the source of the flow and one on the NP that connects to the destination of the flow. If the same NP connects to both the source and destination, then that NP will contain 2 flow entries for the flow.

In one practice of the invention, on an RNP, the first four attributes uniquely identify a flow entry. The source and destination IP addresses are globally unique in this context since they both represent reachable Internet addresses.

Figure 31:
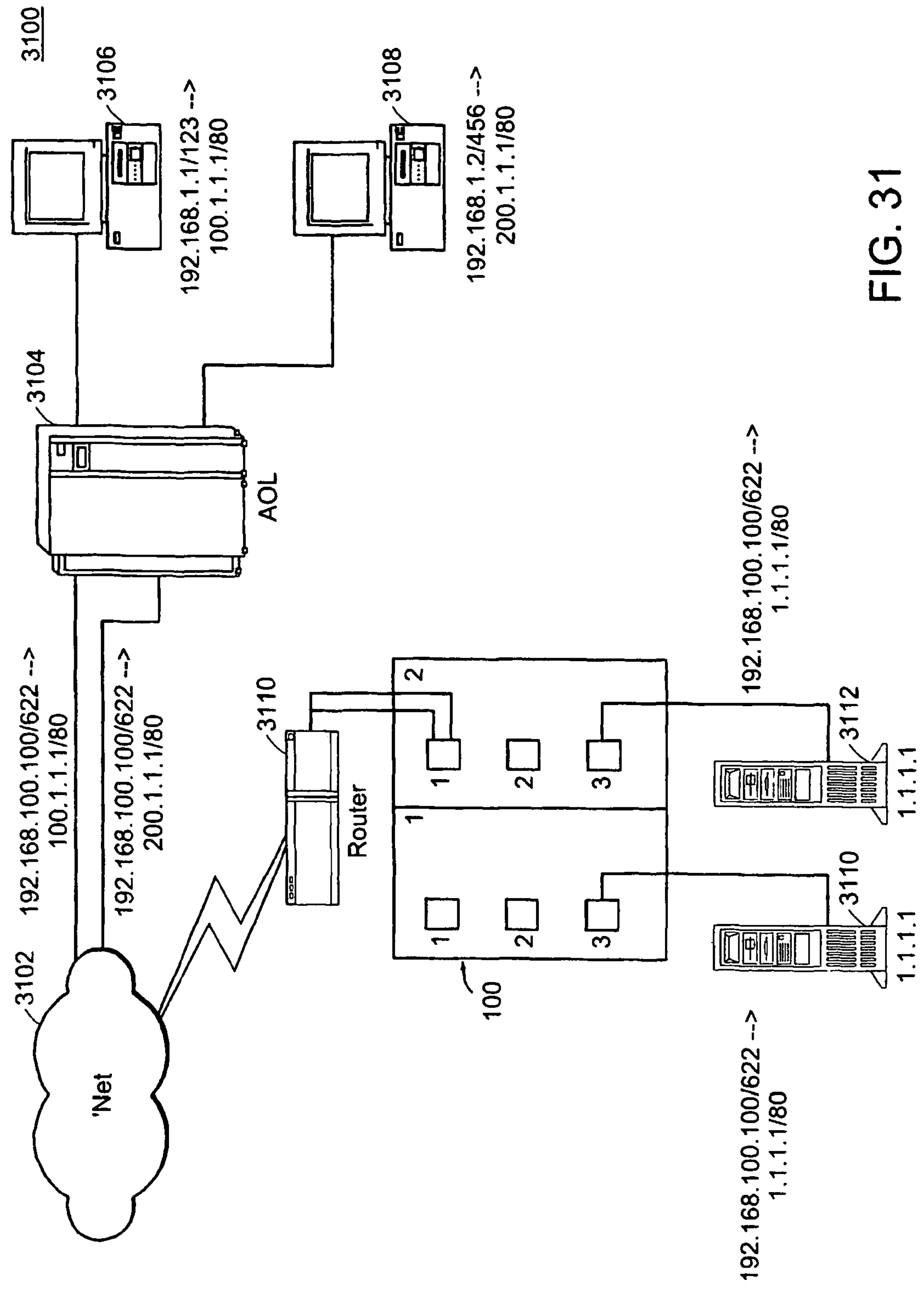
FIG. 31 depicts a mega-proxy example.

On an SNP, the fifth attribute is also required to uniquely identify a flow entry. This is best described in connection with the example shown in FIG. 31. As shown therein, a mega-proxy, such as AOL, performs NAT on the source IP address and TCP/UDP port combinations from the clients that connect them. Since a flow is defined by source and destination IP address and TCP/UDP port, the proxy can theoretically reuse the same source IP address and TCP/UDP port when communicating with different destinations.

But when the Pirus box performs load balancing and NAT from the virtual IP address to a particular server, the destination IP addresses and TCP/UDP port of the packets may no longer be unique to a particular flow. Therefore, the virtual domain must be included in the comparison to find the flow entry.

Requiring that the IP addresses reachable on a Server port be unique across all virtual domains on that port solves the problem. The flow entry lookup can also compare the source physical port of the flow entry with the physical port on which the packet was received.

A description of the attributes is as follows:

5.1.1 Source IP address: The source IP address of the packet. Source TCP/UDP port: The source TCP/UDP port number of the packet.

5.1.2 Destination IP address: The destination IP address of the packet.

5.1.3 Destination TCP/UDP port: The destination TCP/UDP port number of the packet.

5.1.4 Source physical port: The physical port on the Pirus box used to reach the source IP address.

5.1.5 Source next-hop MAC address: The MAC address of the next-hop to the source IP address. This MAC address is reachable out the source physical port and may be the host that owns the IP address.

5.1.6 Destination physical port: The physical port on the Pirus box used to reach the destination IP address.

5.1.7 Destination next-hop MAC address: The MAC address of the next-hop to the destination IP address. This MAC address is reachable out the destination physical port and may be the host that owns the IP address.

5.1.8 NAT IP address: The IP address that either the source or destination IP addresses must be translated to. If the source IP address in the flow entry represents the source of the flow, then this address replaces the destination IP address in the packet. If the source IP address in the flow entry represents the destination of the flow, then this address replaces the source IP address in the packet.

5.1.9 NAT TCP/UDP port: The TCP/UDP port that either the source or destination TCP/UDP port must be translated to. If the source TCP/UDP port in the flow entry represents the source of the flow, then this port replaces the destination TCP/UDP port in the packet. If the source TCP/UDP port in the flow entry represents the destination of the flow, then this port replaces the source TCP/UDP port in the packet.

5.1.10 Flags: Various flags can be used to denote whether the flow entry is relative to the source or destination of the flow, etc.

5.1.11 Received packets: The number of packets received with a source IP address and TCP/UDP port equal to that in the flow entry.

5.1.12 Transmitted packets: The number of packets transmitted with a destination IP address and TCP/UDP port equal to that in the flow entry.

5.1.13 Received bytes: The number of bytes received with a source IP address and TCP/UDP port equal to that in the flow entry.

5.1.14 Transmitted bytes: The number of bytes transmitted with a destination IP address and TCP/UDP port equal to that in the flow entry.

5.1.15 Next pointer (receive path): A pointer to the next flow entry in the linked list. It is assumed that a hash table will be used to store the flow entries. This pointer will be used to traverse the list of hash collisions in the hash done by the receive path (see below).

5.1.16 Next pointer (transmit path): A pointer to the next flow entry in the linked list. It is assumed that a hash table will be used to store the flow entries. This pointer will be used to traverse the list of hash collisions in the hash done by the transmit path (see below).

5.2 Adding Forwarding Entries 5.2.1 Client IP Addresses:

A client IP address is identified as a source IP address in a packet that has a destination IP address that is part of a virtual domain. A flow entry is created for client IP addresses by the load-balancing function. A packet received on a Router or Server port is matched against the configured policies of a virtual domain. If a physical server is chosen to receive the packet, a flow entry is created with the following values: Attribute Value Source IP address the source IP address from the packet Destination IP address the destination IP address from the packet Source TCP/UDP port the source TCP/UDP port from the packet Destination TCP/UDP port the destination TCP/UDP port from the packet Source physical port the physical port on which the packet was received Source next-hop MAC address source MAC address of the packet Destination physical port the physical port connected to the server Destination next-hop MAC the MAC address of the server address NAT IP address IP address of the server chosen by the load-balancing function NAT TCP/UDP port TCP/UDP port number of the chosen server.

This may be different from the destination TCP/UDP port if port multiplexing is used Flags Can be determined In one practice of the invention, the flow entry will be added to two hash tables. One hash table is used to lookup a flow entry given values in a packet received via a network interface. The other hash table is used to lookup a flow entry given values in a packet received via the switch fabric. Both hash table index values will most likely be based on the source and destination IP addresses and TCP/UDP port numbers.

In accordance with the invention, if the packet of the new flow is received on a Router port, then the newly created forwarding entry needs to be sent to the NPs of all other Router ports. The NP connected to the flow destination (most likely a Server port; could it be a Router port?) will rewrite the flow entry from the perspective of packets received on that port that will be sent to the source of the flow: Attribute Value Source IP address original NAT IP address Destination IP address original source IP address Source TCP/UDP port original NAT TCP/UDP port Destination TCP/UDP port original source TCP/UDP port Source physical port original destination physical port Source next-hop MAC address original destination MAC address Destination physical port original source physical port Destination next-hop MAC address original source MAC address NAT IP address original destination IP address NAT TCP/UDP port original destination TCP/UDP port Flags Can be determined 5.2. 2 Virtual Domain IP Addresses: Virtual domain IP addresses are those that identify the domain (such as www. fred. com) and are visible to the Internet. The"next hop" of these IP addresses is the load balancing function. In one practice of the invention, addition of these IP addresses is performed by the management software when the configuration is read.

Attribute Value IP address the virtual IP address TCP/UDP port zero if the servers in the virtual domain accept all TCP/UDP port numbers; otherwise, a separate forwarding entry will exist with each TCP/UDP port number that is supported Destination IP address zero Destination TCP/UDP port zero Physical port n/a Next-hop MAC address n/a Server IP address n/a Server TCP/UDP port n/a Server physical port n/a Flags an indicator that packets destined to this IP address and TCP/UDP port are to be load-balanced 5.2. 3 Server IP Addresses: Server IP addresses are added to the forwarding table by the management software when the configuration is read.

The forwarding function will periodically issue ARP requests for the IP address of each physical server. It is beyond the scope of the IFF function as to exactly how the physical servers are known, be it manual configuration or dynamic learning. In any case, since the administrator shouldn't have to specify the port that connects to the physical servers, this will require that the Pirus box determine it. ARP requests will need to be sent out every port connected to an SNP until an ARP response is received from a server on a port. Once a server's IP address has been resolved, periodic ARP requests to ensure the server is still alive can be sent out the learned port. A forwarding entry will be created once an ARP response is received. A forwarding entry will be removed (or marked invalid) once an entry times out.

If the ARP information for the server times out, subsequent ARP requests will again need to be sent out all SNP ports. An exponential backoff time can be used so that servers that are turned off will not result in significant bandwidth usage.

For servers connected to the Pirus box via a router, ARP requests will be issued for the IP address of the router interface.

Attribute Value IP address the server's IP address TCP/UDP port TBD Destination IP address zero Destination TCP/UDP port zero Physical port n/a Server IP address n/a Server TCP/UDP port n/a Server physical port n/a Flags TBD 5.3 Distributing the Forwarding Table: In one practice of the invention, as physical servers are located, their IP address/port combinations will be distributed to all RNPs. Likewise, as upstream routers are located, their IP address/MAC address/port combinations will be distributed to all SNPs.

5.4 Ingress Function:

It is assumed that the Ethernet frame passes the CRC check before the packet reaches the forwarding function and that frames that don't pass the CRC check are discarded. As it is anticipated that the RNP will be heavily loaded, the IP and TCP/UDP checksum validation can be performed by the SNP. Although it is probably not useful to perform the forwarding function if the packet is corrupted because the data used by those functions may be invalid, the process should still work.

After the load balancing function has determined a physical server that should receive the packet, the forwarding function performs a lookup on the IP address of the server. If an entry is found, this forwarding table entry contains the port number that is connected to the server, and the packet is forwarded to that port. If no entry is found, the packet is discarded. The load balancing function should never choose a physical server whose location is unknown to the Pirus box.

On packets received a packet from a server, the forwarding function performs a lookup on the IP address of the upstream router. If an entry is found, the packet is forwarded to the port contained in the forwarding entry.

The ingress function in the RNP calls the load balancing function and is returned the following (any value of zero implies that the old value should be used) 1. new destination IP address 2. new destination port The RNP will optionally perform Network Address Translation, or NAT, on the packets that arrive from the upstream router. This is because the packets from the client have a destination IP address of the domain (i.e., www. fred. com). The new destination IP address of the packet is that of the actual server that was chosen by the load balancing function. In addition, a new destination port may be chosen if TCP/UDP port multiplexing is in use.

Port multiplexing may be used on the physical servers in order to conserve IP addresses. A single server may serve multiple domains, each with a different TCP/UDP port number.

The SNP will optionally perform NAT on the packets that arrive from a server. This is because there may be a desire to hide the details of the physical servers that provide the load balancing function and have it appear as if the domain IP address is the"server". The new source of the packet is that of the domain. As the domain may have multiple IP addresses, the Pirus box needs a client table that maps the client's IP address and TCP/UDP port to the domain IP address and port to which the client sent the original packet.

6. Egress Function:

Packets received from an upstream router will be forwarded to a server.

The forwarding function sends the packet to the SNP providing support for the server. This SNP performs the egress function to do the following: 1. verify the IP checksum 2. verify the TCP or UDP checksum 3: change the destination port to that of the server (as determined by the load balancing function call in the ingress function) 4. change the destination IP address to that of the server (as determined by the load balancing function call in the ingress function) 5. recalculate the TCP or UDP checksum if the destination port or destination IP address was changed 6. recalculate the IP header checksum if the destination IP address was changed 7. sets the destination MAC address to that of the server or next-hop to the server (as determined by the forwarding function) 8. recalculate the Ethernet packet CRC if the destination port or destination IP address was changed Packets received from a server will be forwarded to an upstream router.

The SNP performs the egress function to do the following:

1. verify the IP checksum
2. verify the TCP or UDP checksum
3. change the source port to the one that the client sent the request to (as determined by the ingress function client table lookup) 4. change the source IP address to the one that the client sent the request to (as determined by the ingress function client table lookup) 5. recalculate the TCP or UDP checksum if the source port or source IP address was changed 6. recalculate the IP header checksum if the destination IP address was changed 7. sets the destination MAC address to that of the upstream router 8. recalculate the Ethernet packet CRC if the source port or source IP address was changed V. IP-Based Storage Management-Device Discovery & Monitoring In data networks based on IP/Ethernet technology a set of standards has developed that permit users to manage/operate their networks using a heterogeneous collection of hardware and software. These standards include Ethernet, Internet Protocol (IP), Internet Control Message Protocol (ICMP), Management Information Block (MIB) and Simple Network Management Protocol (SNMP). Network Management Systems (NMS) such as HP Open View utilize these standards to discover and monitor network devices. Storage Area Networks (SANs) use a completely different set of technology based on Fibre Channel (FC) to build and manage "Storage Networks". This has led to a "re-inventing of the wheel" in many cases. Also, SAN devices do not integrate well with existing IP-based management systems.

Lastly, the storage devices (Disks, Raid Arrays, etc), which are Fibre Channel attached to the SAN devices, do not support IP (and the SAN devices have limited IP support) and the storage devices cannot be discovered/managed by IP-based management systems. There are essentially two sets of management products-one for the IP devices and one for the storage devices.

A trend is developing where storage networks and IP networks are converging to a single network based on IP. However, conventional IP-based management systems can not discover FC attached storage devices.

The following discussion explains a solution to this problem, in two parts. The first aspect is device discovery, the second is device monitoring.

Figure 32:
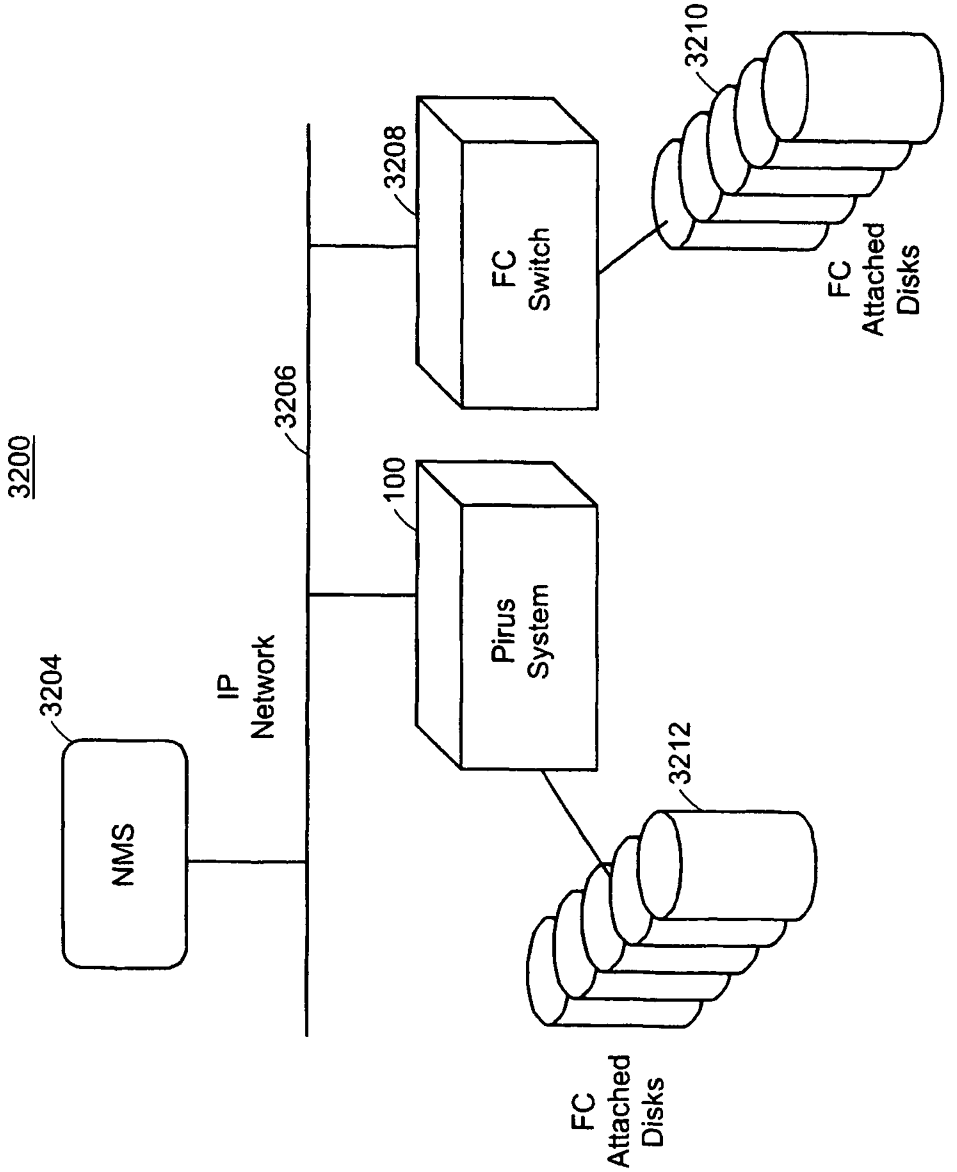
FIG. 32 depicts device discovery in accordance with another aspect of the invention.

Device Discovery FIG. 32 illustrates device discovery in accordance with the invention.

In the illustrated configuration the NMS cannot discover ("see") the disks attached to the FC Switch but it can discovery ("see") the disks attached to the Pirus System. This is because the Pirus System does the following: Assigns an IP address to each disk attached to it.

Creates an Address Resolution Protocol (ARP) table entry for each disk.

This is a simple table that contains a mapping between IP and physical addresses.

When the NMS uses SNMP to query the Pirus System, the Pirus System will return an ARP entry for each disk attached to it.

'The NMS will then"ping" (send ICMP echo request) for each ARP entry it receives from the Pirus System.

'The Pirus System will intercept the ICMP echo requests destined for the disks and translate the ICMP echo into a SCSI Read Block 0 request and send it to the disk.

If the SCSI Read Block 0 request successfully completes then the Pirus System acknowledges the"ping" by sending back an ICMP echo reply to the NMS.

If the SCSI Read Block 0 request fails then the Pirus System will not respond to the "ping" request.

The end result of these actions is that the NMS will learn about the existence of each disk attached to the Pirus System and verify that it can reach it. The NMS has now discovered the device.

Figure 33:
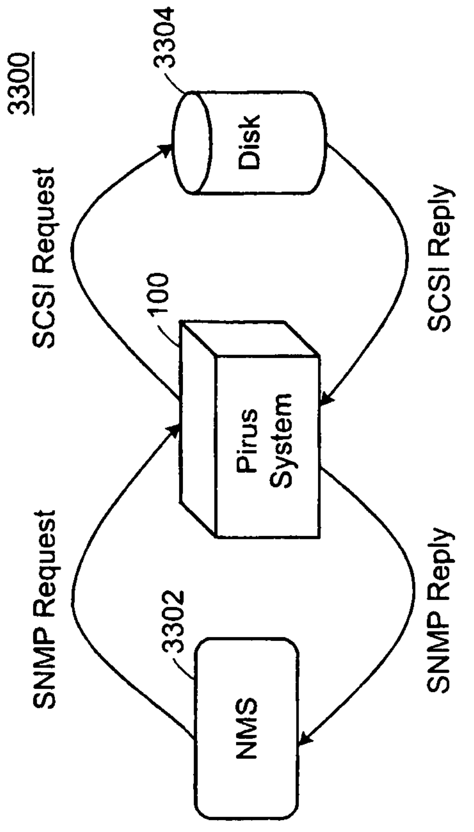
FIG. 33 depicts SNMP/SCSI mapping.

Device Monitoring Once the device (disk) has been discovered by the NMS it will start sending it SNMP requests to learn what the device can do (i.e., determine its level of functionality.) The Pirus System will intercept these SNMP requests and generate a SCSI request to the device. The response to the SCSI request will be converted back into an SNMP reply and returned to the NMS. FIG. 33 illustrates this.

The configuration illustrated in FIG. 33 is essentially an SNMP <->SCSI converter/translator.

Lastly, NMS can receive asynchronous events (traps) from devices.

Figure 34:
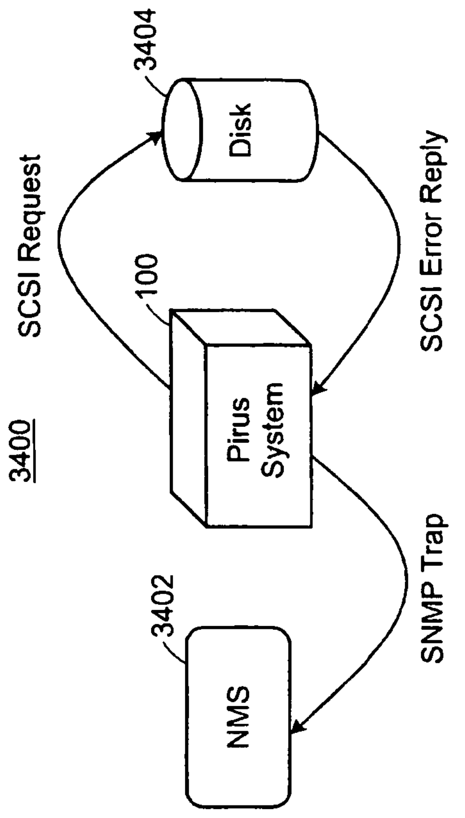
FIG. 34 SCSI response/SNMP trap mapping.

These are notifications of events that may or may not need attention. The Pirus System will also translate SCSI exceptions into SNMP traps, which are then propagated to the NMS. FIG. 34 illustrates this.

VI. Data Structure Layout

Figure 35:
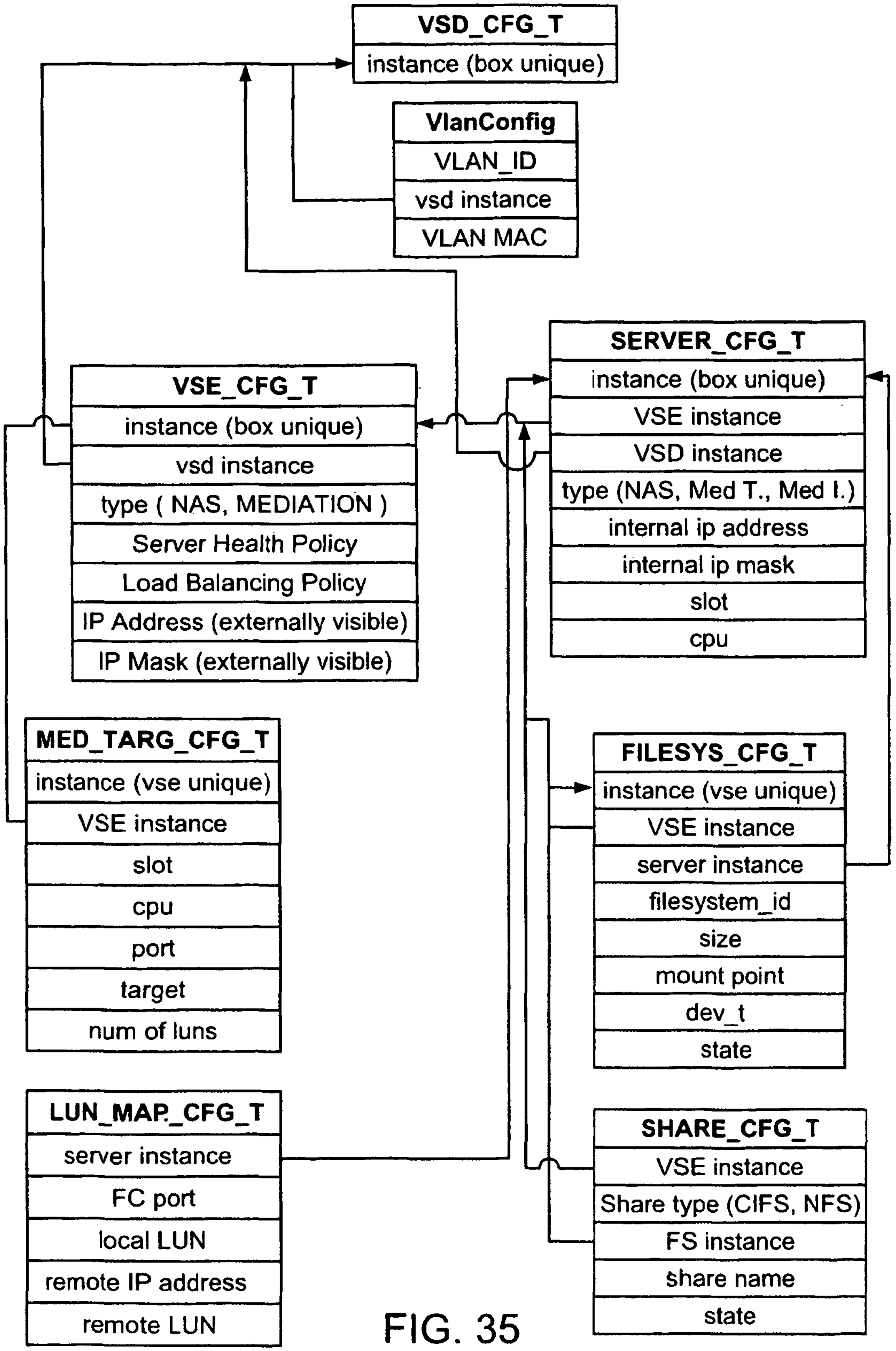
FIG. 35 depicts data structures useful in another aspect of the invention.

Data Structure Layout:

FIG. 35 shows the relationships between the various configuration data structures. Each data structure is described in detail following the diagram. The data structures are not linked; however, the interconnecting lines in the diagram display references from one data structure to another. These references are via instance number.

Data Structure Descriptions:

1. VSD CFG T: This data structure describes a Virtual Storage Domain. Typically there is a single VSD for each end user customer of the box. A VSD has references to VLANS that provide information on ports allowed access to the VSD. VSE structures provide information for the storage available to a VSD and SERVER CFG T structures provide information on CPUs available to a VSD. A given VSD may have multiple VSE and SERVER structures.

2. VSE_CFG_T: This data structure describes a Virtual Storage Endpoint. VSEs can be used to represent Virtual Servers (NAS) or IP-accessible storage (ISCSI, SCSI over UDP, etc.). They are always associated with one, and only one, VSD.

3. VlanConfig: This data structure is used to associate a VLAN with a VSD. It is not used to create a VLAN.

4. SERVER_CFG_T: This data structure provides information regarding a single CPU. It is used to attach CPUs to VSEs and VSDs. For replicated NFS servers there can be more than one of these data structures associated with a given VSE.

5. MED_TARG_CFGT: This data structure represents the endpoint for Mediation Target configuration: a device on the FibreChannel connected to the Pirus box being accessed via some form of SCSI over IP.

6. LUN_MAP_CFG_T: This data structure is used for mapping Mediation Initiator access. It maps a LUN on the specified Pirus FC port to an IP/LUN pair on a remote ISCSI target.

7. FILESYS_CFG_T: This data structure is used to represent a file system on an individual server. There may be more than one of these associated witha given server. If this file system will be part of a replicated NFS file system, the filesystem_id and the mount point will be the same for each of the file systems in the replica set.

8. SHARE_CFG_T: This data structure is used to provide information regarding how a particular file system is being shared. The information in this data structure is used to populate the sharetab file on the individual server CPUs.

EXAMPLES

Server Health:

1) Listen forVSD_CFG_T. When get one, create local VSD structure

2) Listen for VSE_CFG_T. When get one, wire to local VSD.

3) Listen for SERVER_CFG_T. When get one, wire to local VSE.

4) Start Server Health for server.

5) Listen for FILESYS_CFG_T. When get one, wire to local SERVERNSE.

6) Start Server Health read/write to file system.

7) Listen for MED SE CFG T. When get one, wire to local VSE.

8) Start Server Healthpingson IP specified in VSE referenced by MED_SE_CFG_T.

Mediation Target:

1) Listen for VSE_CFG_T. When get one with type of MED, create local VSE structure.

2) Listen for MED_SE_CFG_T. When get one, wire to local VSE.

3) Setup mediation mapping based on information provided in VSE/MED_SE pair.

Mediation Initiator:

1) Listen for LUN_MAP_CFG_T. When get one, request associated SERVER_CFG_T from MIC.

2) Create local SERVER structure.

3) Add information from LUN_MAP_CFG_T to LUN map for that server.

NCM:

1) Listen for SHARE_CFG_T with a type of NFS.

2) Request associated FILESYS_CFG_T from MIC.

3) If existing filesystemJd, add to set. If new~create new replica set.

4) Bring new file system up to date. When finished, send FILESYS_CFG_T with state of "ONLINE".

The above features of the Pirus System allow storage devices attached to a Pirus System be discovered and managed by an IP-based NMS. This lets users apply standards based; widely deployed systems that manage IP data networks manage storage devices-something currently not possible.

Accordingly, the Pirus System permits for the integration of storage (non-IP devices) devices (e.g., disks) into IP-based management systems (e.g., NMS), and thus provides unique features and functionality.

VII. NAS Mirroring and Content Distribution

Figure 36:
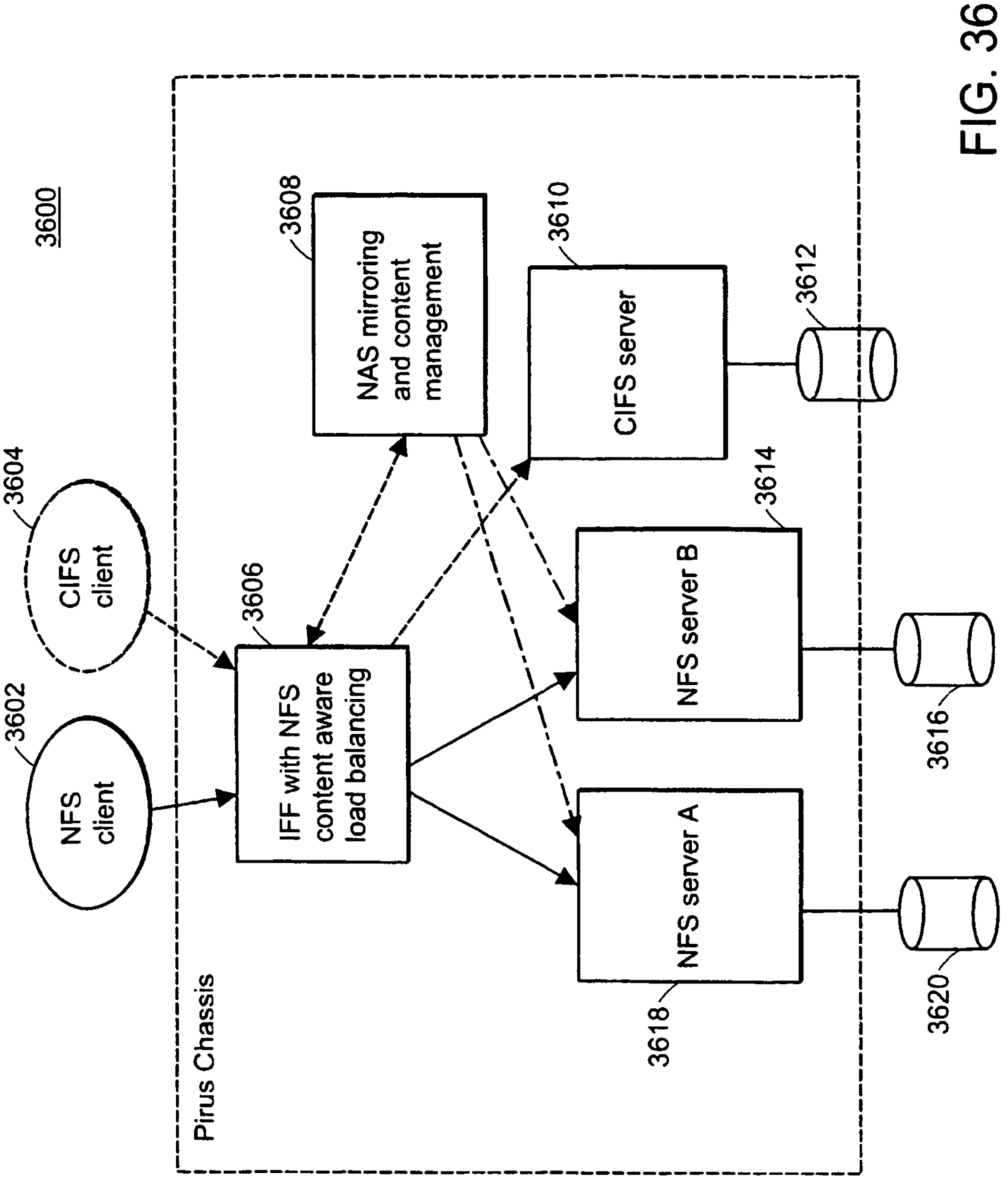
FIG. 36 depicts mirroring and load balancing operation.

The following section describes techniques and subsystems for providing mirrored storage content to external NAS clients in accordance with the invention. The Pirus SRC NAS subsystem described herein provides dynamically distributed, mirrored storage content to external NAS clients, as illustrated in FIG. 36. These features provide storage performance scalability and increased availability to users of the Pirus system. The following describes the design of the SRC NAS content distribution subsystem as it pertains to NAS servers and NAS management processes. Load Balancing operations are described elsewhere in this document.

1. Content Distribution and Mirroring 1.1 Mirror Initialization via NAS

After volume and filesystem initialization-a complete copy of a filesystem can be established using the normal NAS facilities (create and write) and the maintenance procedures described hereinafter. A current filesystem server set is in effect immediately after filesystem creation using this method.

1.2 Mirror Initialization via NDMP

A complete filesystem copy can also be initialized via NDMP. Since NDMP is a TCP based protocol and TCP based load balancing is not initially supported, the 2nd and subsequent members of a NAS peer set must be explicitly initialized. This can be done with additional NDMP operations. It can also be accomplished by the filesystem synchronization facilities described herein. Once initialization is complete a current filesystem server set is in effect.

1.3 Sparse Content Distribution

Partial filesystem content replication can also be supported. Sparse copies of a filesystem will be dynamically maintained in response to IFF and MIC requests. The details of MIC and DO interaction can be left to implementers, but the concept of sparse filesystems and their maintenance is discussed herein.

2. NCM

The NCM (NAS Coherency Manager) is used to maintain file handle synchronization, manage content distribution, and coordinate filesystem (re) construction. The NCM runs primarily on an SRC's 9th processor with agents executing on LIC IXPs and SRC 750's within the chassis. Inter-chassis NAS replication is beyond the scope of this document.

2.1 NCM Objectives

One of the primary goals of the NCM is to minimize the impact of mirrored content service delivery upon individual NAS servers. NAS servers within the Pirus chassis will operate as independent peers while the NCM manages synchronization issues“behind the scenes.” The NCM will be aware of all members in a Configured Filesystem Server Set. Individual NAS servers do not have this responsibility.

The NCM will resynchronize NAS servers that have fallen out of sync with the Configured Filesystem Server Set, whether due to transient failure, hard failure, or new extension of an existing group.

The NCM will be responsible for executing content re-distribution requests made by IFF load balancers when sparse filesystem copies are supported. The NCM will provide Allocated Inode and Content Inode lists to IFF load balancers.

The NCM will be responsible for executing content re-distribution requests made by the MIC when sparse filesystem copies are supported. Note that rules should exist for run-time contradictions between IXP and MIC balancing requests.

The NCM will declare NAS server“life” to interested parties in the chassis and accept“death notices” from server health related services.

2.2 NCM Architecture 2.3 NCM Processes and Locations

The NCM has components executing at several places in the Pirus chassis.

The primary NCM service executes on an SRC 9th processor.

An NCM agent runs on each SRC 750 CPU that is loaded for NAS. o An NCM agent runs on each IXP that is participating in a VSD.

A Backup NCM process will run on a 2nd SRC's 9th processor. If the primary NCM becomes unavailable for any reason the secondary NCM will assume its role.

2.4 NCM and IPC Services

The NCM will use the Pirus IPC subsystem to communicate with IFF and NAS server processors.

The NCM will receive any and all server health declarations, as well as any IFF initiated server death announcement. The NCM will announce server life to all interested parties via IPC.

Multiast IPC messages should be used by NCM agents when communicating with the NCM service. This allows the secondary NCM to remain synchronized and results in less disruptive failover transitions.

After chassis initialization the MIC configuration system will inform the NCM of all Configured Filesystem Server Sets via IPC. Any user configured changes to Filesystem Server Sets will be relayed to the NCM via IPC.

NCM will make requests of NCM agents via IPC and accept their requests as well.

2.5 NCM and node Management

All file handles (inodes) in a Current Filesystem Server Set should have identical interpretation.

The NC will query each member of a Configured Filesystem Server Set for InodeList-Allocated and InodeList-Content after initialization and after synchronization. The NCM may periodically repeat this request for verification purposes.

Each NAS server is responsible for maintaining these 2 file handle usage maps on a per filesystem basis. One map represents all allocated inodes on a server-IN-Alloc. The 2nd usage map represents all inodes with actual content present on the server-IN-Content. On servers where full n-way mirroring is enabled the 2 maps will be identical. On servers using content sensitive mirroring the 2nd“content” map will be a subset of the first. Usage maps will have a global filesystem checkpoint value associated with them.

2.6 Inode Allocation Synchronization

All peer NAS servers must maintain identical file system and file handle allocations.

All inode creation and destruction operations must be multicast from IXP/IFF source to an entire active filesystem server set. These multicast packets must also contain a sequence number that uniquely identifies the transaction on a per IXP basis.

Inode creation and destruction will be serialized within individual NAS servers.

2.7 Inode Inconsistency Identification

When an inode is allocated, deallocated or modified, the multicasting IXP must track the outstanding request, report inconsistency or timeout as a NAS server failure to the NCM.

When all members of a current filesystem server set timeout on a single request the IXP must consider that the failure is one of the following events: D) XP switch fabric multicast transmission error Bogus client request 0 Simultaneous current filesystem server set fatality The 3rd item is least likely and should only be assumed when the first 2 bullets can be ruled out.

NAS servers must track the incoming multicast sequence number provided by the IXP in order to detect erroneous transactions as soon as possible. If a NAS server detects a missing our out of order multicast sequence number it must negotiate its own death with NCM. If all members of a current filesystem server set detect the same missing sequence number then the negotiation fails and the current filesystem server set should remain active.

When an inconsistency is identified the offending NAS server will be reset and rebooted. The NCM is responsible for initiating this process. It may be possible to gather some “pre-mortem” information and possibly even undo final erroneous inode allocations prior to rebooting.

3. Filesystem Server Sets 3.1 Types

For a given filesystem, there are 3 filesystem server sets that pertain to it; configured, current and joining.

As described in the definition section, the configured filesystem server set is what the user specified as being the cpus that he wants to serve a copy of the particular filesystem. To make a filesystem ready for service a current filesystem server set must be created. As servers present themselves and their copy of the filesystem to the NCM and are determined to be part of the configured server set, the NCM must reconcile their checkpoint value for the filesystem with either the current set's checkpoint value or the checkpoint value of joining servers in the case where a current filesystem server set does not yet exist.

A current filesystem server set is a dynamic grouping of servers that is identified by a filesystem id and a checkpoint checkpoint value. The current filesystem server set for a filesystem is created and maintained by the NCM.

The joining server set is simply the set of NAS servers that are attempting to be part of the current server set.

3.2 States of the Current Server Set

A current filesystem server set can be active, inactive, or paused. When it is active, NFS requests associated with the filesystem id are being forwarded from the IXPs to the members of the set. When the set is inactive the IXPs are dropping NFS requests to the server set. When the set is paused, the IXPs are queuing NFS requests destined for the set.

When a current filesystem server set becomes active and is serving clients and a new server wishes to join the set, we must at least pause the set to prevent updates to the copies of the filesystem during the join operation.

The benefit of a successful pause and continue versus deactivate and activate is that NFS clients may not need to retransmit requests that were sent while the new server was joining. There clearly are limits to how many NFS client requests you can queue before you are forced to drop. Functionally both work.

A first pass could leave out the pause and continue operations until later.

4. Description of Operations on a Current Filesystem Server Set

During the lifetime of a current filesystem set, for recovery purposes several items of information must be kept somewhere where an NCM can find them after a fault 4.1 Create_Current_Filesystem_Server_Set (fsid, slots/cpus) Given a set of cpus that are up, configured to serve the filesystem, and wishing to join, the NCM must decide which server has the latest copy of the filesystem, and then synchronize the other joining members with that copy.

4.2 Add_Member_To_Current Filesystem_Server_Set (fsid, slot/CPU)

Given a cpu that wishes to join, the NCM must synchronize that cpu's copy of the filesystem with the copy being used by the current filesystem server set.

Chckpoint_Current_Filesystem_Server_Set (fsid) Since a filesystem's state is represented by its checkpoint value and modified node-Lists, the time to recover from a filesystem with the same checkpoint value is a function of the modifications represented by the modified InodeList, it is desirable to checkpoint the filesystem regularly. The NCM will coordinate this. A new checkpoint value will then be associated with the copies served by the current filesystem server set and the modified InodeList on each member of the set will be cleared.

Get Status Of Filesystem Server Set (fsid. &status struct) Return the current state of the filesystem server set.

Struct server set status {Long configured set; Long current set; Long current set checkpoint value; Long joining set; Int active_flag; }; 5. Description of Operations that Change the State of the Current Server Set 5.1 Activate Server Set (fsid)

Allow NFS client requests for this fsid to reach the NFS servers on the members of the current filesystem server set.

5.2 Pause Filesystem Server Set (fsid) Queue

NFS client requests for this fsid headed for the NFS servers on the members of the current filesystem server set. Note any queue space is finite so pausing for too long can result in dropped messages. This operation waits until all pending NFS modification ops to this fsid have completed.

5.3 Continue Filesystem Server Set (fsid) Queued

NFS client requests for this fsid are allow to proceed to the NFS servers on members of the current filesystem server set.

5.4 DeactivateServerSet (fsid)

Newly arriving NFS requests for this fsid are now dropped. This operation waits until all pending NFS modification ops to this fsid have completed.

6. Recovery Operations on a Filesystem Copy

There are two cases of Filesystem Copy:

6.1 Construction: refers to the Initialization of a “filesystem copy”, which will typically entail copying every block from the Source to the Target.

Construction occurs when the Filesystem Synchronization Number does not match between two filesystem copies.

6.2 Restoration: refers to the recovery of a “filesystem copy”.

Restoration occurs when the Filesystem Synchronization Number matches between two filesystem copies.

Conceptually, the two cases are very similar to one another. There are three phases of each Copy:

I. First-pass: copy-method everything that has changed since the last Synchronization. For the Construction case, this really is EVERY thing; for the Restoration case, this is only the inodes in the IN-Mod list.

II. Copy-method the IN-Copy list changes, i.e. modifications which occurred while the first phase was being done.

Repeat until the IN-Copy list is (mostly) empty; even if it is not empty, it is possible to proceed to synchronization at the cost of a longer synchronization time.

III. Synchronization by NCM: update of Synchronization Number, clearing of the IN-Mod list. Note that by pausing ongoing operations at each NAS (and IXP if a new NAS is being brought into the peer group), it is possible to achieve synchronization on-line (i.e. during active NFS modify operations).

The copy-method refers to the actual method of copying used in either the Construction or Restoration cases. It is proposed here that the copy-method will actually hide the differences between the two cases.

6.3 NAS-FS-Copy

An NAS-FS copy inherently utilizes the concept of "inodes" to perform the Copy. This is built-into both the IN-Mod and IN-Copy lists maintained on each NAS.

6.3.1 Construction of Complete Copy

Use basic volume block-level mirroring to make "first pass" copy of entire volume, from Source to Target NAS. This is an optimization to take advantage of sequential 1/0 performance; however, this will impact the copy-method. The copy-method will be an 'image' copy, i.e. it is a volume block-by-block copy; conceptually, the result of the Construction will be a mirror-volume copy. (Actually, the selection of volume block-level copying can be determined by the amount of "used" filesystem space; i.e. if the filesystem were mostly empty, it would be better to use an inode logical copy as in the Restoration case.)

For this to work correctly, since a physical-copy is being done, the completion of the Copy (i.e. utilizing the IN-Copy) must also be done at the physical-copy level; stated another way, the"inode" copy-method must be done at the physical-copy level to complete the Copy.

6.4 Copy-method

The inode copy-method must exactly preserve the inode: this is not just the inode itself, but also includes the block mappings. For example, copying the 128*b* of the inode will only capture the Direct, 2nd-level, and 3rd-level indirect blocks; it will not capture the data in the Direct, nor the levels of indirection embedded in both the 2nd/3rd indirect blocks. In effect, the indirect blocks of an inode (if they exist) must be traversed and copied exactly; another way to state this, the list of all block numbers allocated to an inode must be copied.

6.5 Special inodes:

Special inodes will be instantiated in both IN-Mod and IN-Copy which reflect changes to filesystem metadata: specifically block-allocation and inode-allocation bitmaps (or alternatively for each UFS' cylinder-group), and superblocks. This is because all physical changes (i.e. this is a physical-image copy) must be captured in this copy-method.

6.6 Locking:

Generally, any missed or overlapping updates will be caught by repeating IN-Copy changes; any racing allocations and/or de-allocations will be reflected in both the inode (being extended or truncated), and the corresponding block-allocation bitmap (s). Note these special inodes are not used for Sparse Filesystem Copies.

However, while the block map is being traversed (i.e. 2nd/3rd indirect blocks), changes during the traversal must be prevented to prevent inconsistencies. Since the copy-method can be repeated, it would be best to utilize the concept of a soft-lock which would allow an ongoing copy-method to be aborted by the owning/Source-NAS if there was a racing extension/truncation of the file.

6.7 Restoration of Complete Copy

This step assumes that two NAS' differ only in the IN-Mod list; to complete re-Synchronization, it requires that all changed inodes be propagated from the Source NAS to the Target NAS (since the last synchronization-point).

6.8 Copy-method

The node copy-method occurs at the logical level: specifically the copying is performed by performing logical reads of the inode, and no information is needed of the actual block mappings (other than to maintain sparse-inodes). Recall the Construction case required a physical-block copy of the inode block-maps (i.e. block-map tree traversal), creating a physical-block mirror-copy of the inode 6.9 Special lnodes No special inodes are needed; because per-filesystem metadata is not propagated for a logical copy.

6.10 Locking

Similarily (to the construction case), a soft-lock around an inode is all that is needed.

6.11 Data structures

There are two primary Lists: the IN-Mod and the IN-Copy list. The IN-Copy is logically nested within the IN-Copy.

6.11. 1 Modified-lnodes-list (IN-Mod)

The IN-Mod is the list of all modified inodes since the last Filesystem Checkpoint: Worst-case, if an empty filesystem was restored from backup, the list would encompass every allocated inode.

D Best-case, an unmodified filesystem will have an empty-list; or a filesystem with a small working-set of inodes being modified will have a (very) small list.

The IN-Mod is used as a recovery tool, which allows the owning NAS to be used as the 'source' for a NAS-FS-Copy. It allows the NCM to determine which inodes have been modified since the last Filesystem Checkpoint.

The IN-Mod is implemented non-volatile, primarily for the case of chassis crashes (i.e. all NAS'crash), as one IN-Mod must exist to recover. Conceptually, the IN-Mod can be implemented as a Bitmap, or, as a List.

The IN-Mod tracks any modifications to any inode by a given NAS. This could track any change to the inode 'object' (i.e. both inode attributes, and, inode data), or, differentiate between the inode attributes and the data contents.

The IN-Mod must be updated (for a given inode) before it is committed to non-volatile storage (i.e. disk, or NVRAM); otherwise, there is a window where the system could crash and the change not be reflected in the IN-Mod. In a BSD implementation, the call to add a modified inode to the IN-Mod could be done in VOPUPDATE.

Finally, the Initialization case requires 'special' inodes to reflect non-inode disk changes, specifically filesystem metadata; e.g. cylinder-groups, superblocks. Since Initialization is proposing to use a block-level copy, all block-level changes need to be accounted for by the IN-Mod.

6.11.2 Copy-lnodes-list (IN-Copy)

The IN-Copy tracks any modifications to an inode by a given NAS, once a Copy is in-progress: it allows a Source-NAS to determine which inodes still need to be copied because it has changed during the Copy. In other words, it is an interim modified-list, which exists during a Copy. Once the Copying begins, all changes made to the IN-Mod are mirrored in the IN-Copy; this effectively captures all changes "since the Copy is in-progress".

6.11.3 Copy progress:

The Source NAS needs to know which inodes to copy to the Target NAS. Conceptually, this is a snapshot 'image' of the IN-Mod before the IN-Copy is enabled, as this lists all the inodes which need to be copied at the beginning of the Copy (and, where the IN-Copy captures all changes rolling forward). In practice, the IN-Mod itself can be used, at the minor cost of repeating some of the Copy when the IN-Copy is processed.

Note the IN-Copy need not be implemented in NVRAM, since any NAS crashes (either Source or Target) can be restarted from the beginning. If an IN-Copy is instantiated, the calls to update IN-Copy can be hidden in the IN-Mod layer.

6.11.4 Copying Inodes:

An on-disk inode is 128 bytes (i.e. this is effectively the inode's attributes); the inode's data is variable length, and can vary between 0 and 4 GB, in filesystem fragment-size increments. On-disk inodes tend to be allocated in physically contiguous disk blocks, hence an optimization is copy a large number of inodes all at once. CrosStor-Note: all inodes are stored in a reserved-inode (file) itself.

6.11. 5 Construction case

In this case, locking is necessary to prevent racing changes to the inode (and or data contents), as the physical image of the inode (and data) needs to be preserved.

Specifically, the block mapping (direct and indirect blocks) need to be preserved exactly in the inode; so both the block-mapping and every corresponding block in the file have to be written to the same physical block together.

As an example, assume the race is where a given file is being first truncated, and then extended. Since each allocated-block needs to be copied exactly (i.e. same physical block number on the volume), care has to be taken that the copy does not involve a block in transition. Otherwise, locking on block allocations would have to occur on the source-NAS. Instead, locking on an inode would seem the better alternative here. An optimization would be to allow a source-NAS to 'break' a Copy-Lock, with the realization that an inode being Copied should defer to a waiting modification.

6.11. 6 Restoration case

In this case, no locking is implied during an inode-copy, since any "racing" modifications will be captured by the IN-Copy. A simple optimization might be to abort an in-progress Copy if such a 'race' is detected; e.g. imagine a very large file Copy which is being modified.

Specifically, the inode is copied, but not the block-mapping; the file data (represented by the block-mapping) is logically copied to the target NAS.

Examples-Set 1 1. Walkthroughs of Operations on a Current Filesystem Server Set Create Current Server Set (fsid, slots/cpus) Assumptions Assume that no NAS server is serving the filesystem; the current filesystem server set is empty.

El Steps 0 NAS A boots and tells the NCM it is up.

The NCM determines the new servers role in serving and that the filesystem is not being served by any NAS servers.

The NCM asks server A for the checkpoint value for the filesystem and also its modified InodeList.

The NCM insures that this is the most up to date copy of the filesystem.

(Reconciles static configuration info on filesystem with which servers are actually running, looks in NVRAM if needed . . . ) NCM activates the server set.

The filesystem is now being served.

Add_Member_to_Current_Filesystem_Server_Set (fsid) Assumptions Assume a complete copy of the filesystem is already being served.

The current filesystem server set contains NAS B.

The current filesystem server set is active.

NAS A is down.

NAS A boots and tells the NCM it is up. a Steps a The NCM determines the new servers role in serving the filesystem and determines the current server set for this filesystem contains only NAS B.

The NCM asks server A for the checkpoint value for the filesystem and also its modified InodeList.

NCM initiates recovery and asks NAS A to do it.

D NAS A finishes recovery and tells the NCM.

The NCM pauses the current filesystem server set.

NCM asks NAS A to do recovery to catch anything that might have changed since the last recovery request. This should only include NFS requests received since the last recovery.

NAS A completes the recovery.

The NCM asks all members of the set to update their filesystem checkpoint value. They all respond.

The NCM resumes the current filesystem server set.

A new filesystem checkpoint has been reached.

Checkpointing an Active Filesystem Server Set Assumptions a Steps NCM determines it is time to bring all the members of the current server set to a checkpoint.

NCM asks the NCM agent on one member of the server set to forward a multicast filesystem sync message to all members of the current server set. This message contains a new checkpoint value for the filesystem.

Upon receipt of this message the NAS server must finish processing any NFS requests received prior to the sync message that apply to the filesystem. New requests must be deferred.

The NAS server then writes the new checkpoint value to stable storage and clears any modified InodeLists for the filesystem and updates the NFS modification sequence number.

The NAS servers then sends a message to the NCM indicating that it has reach a new filesystem checkpoint.

The NCM waits for these messages from all NAS servers.

The NCM then sends multicast to the current server set telling them to start processing NFS requests.

The NCM then updates it's state to indicate a new filesystem checkpoint has been reached.

Examples-Set 2 2 UML Static Structure Diagram FIG. 37 is a representation of the NCM, IXP and NAS server classes. For each, the top box is the name, the second box contains attributes of an instance of this class and the bottom box describes the methods each class must implement.

Attributes Description Data local to an instance of the class that make it unique.

Methods Description Those preceded with a + are public and usually invoked by receiving a message. The method is preceded by the name of the sender of the message surrounded by << >>. Calling out the sender in the description should help you to correlate the messaging scenarios described in this document to implemented methods in the classes. Those preceded by a-are private methods that may be invoked during processing of public methods. They help to organize and reuse functions performed by the class.

VIII. System Mediation Manager

The following discussion sets forth the functional specification and design for the Mediation Manager subsystem of the Pirus box.

Mediation refers to storage protocol mediation, i.e., mediating between two transport protocols (e.g., FC and IP) that carry a storage protocol (SCSI).

Figure 38A:
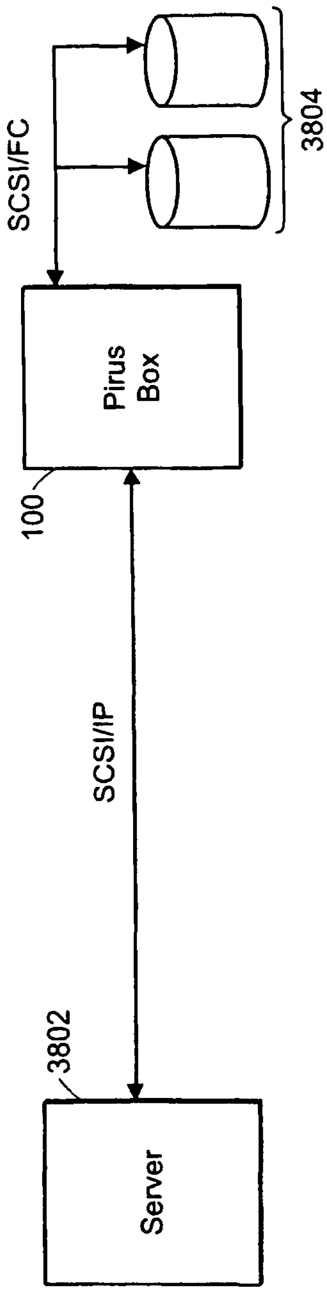
FIGS. 38A, 38B, 38C depict mediation configurations in accordance with another aspect of the invention.
Figure 38B:
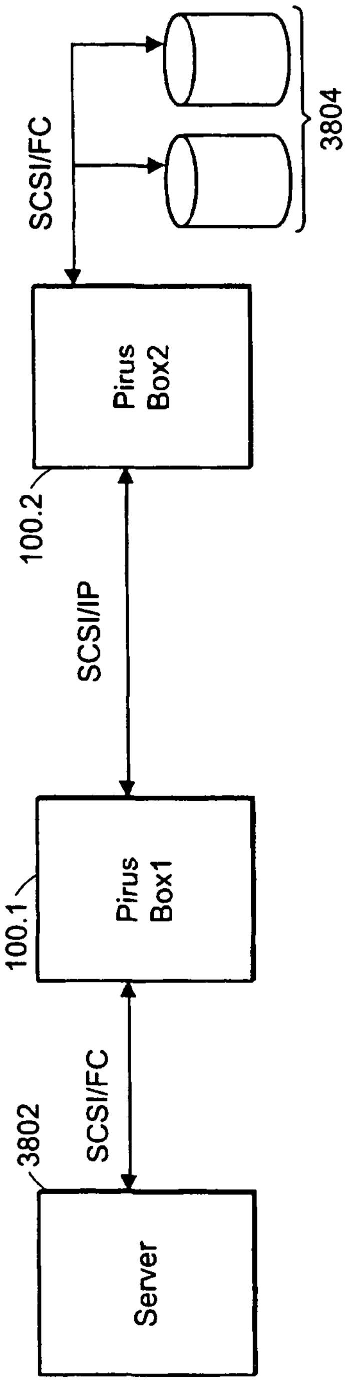
Figure 38C:
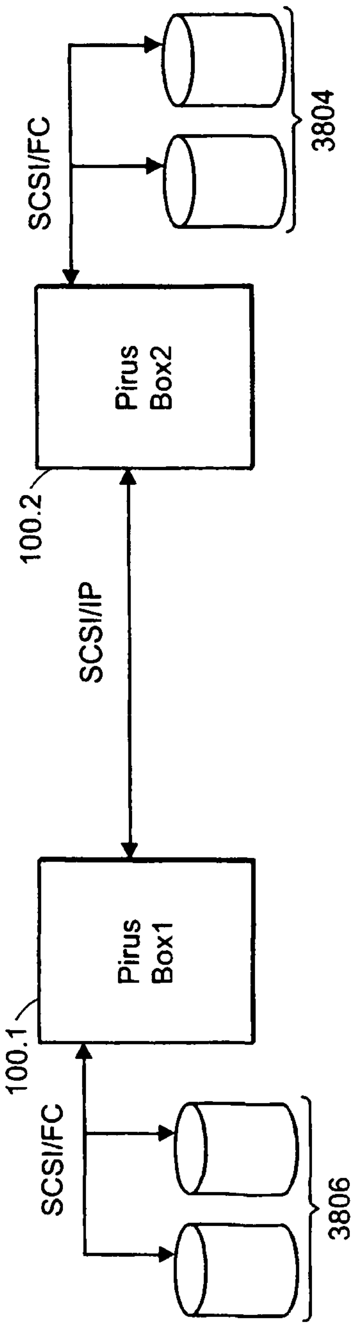

The system disclosed herein will use the mediation configurations shown in FIGS. 38A, B, C. Thus, for example, in FIG. 38A, the Pirus box terminates a mediation session. In FIGS. 38B and C, Pirus Boxl originates a mediation session and Pirus box 2 terminates it. In FIG. 38C, Pirus Boxl runs backup software to copy its disks to the other Pirus box.

Figure 39:
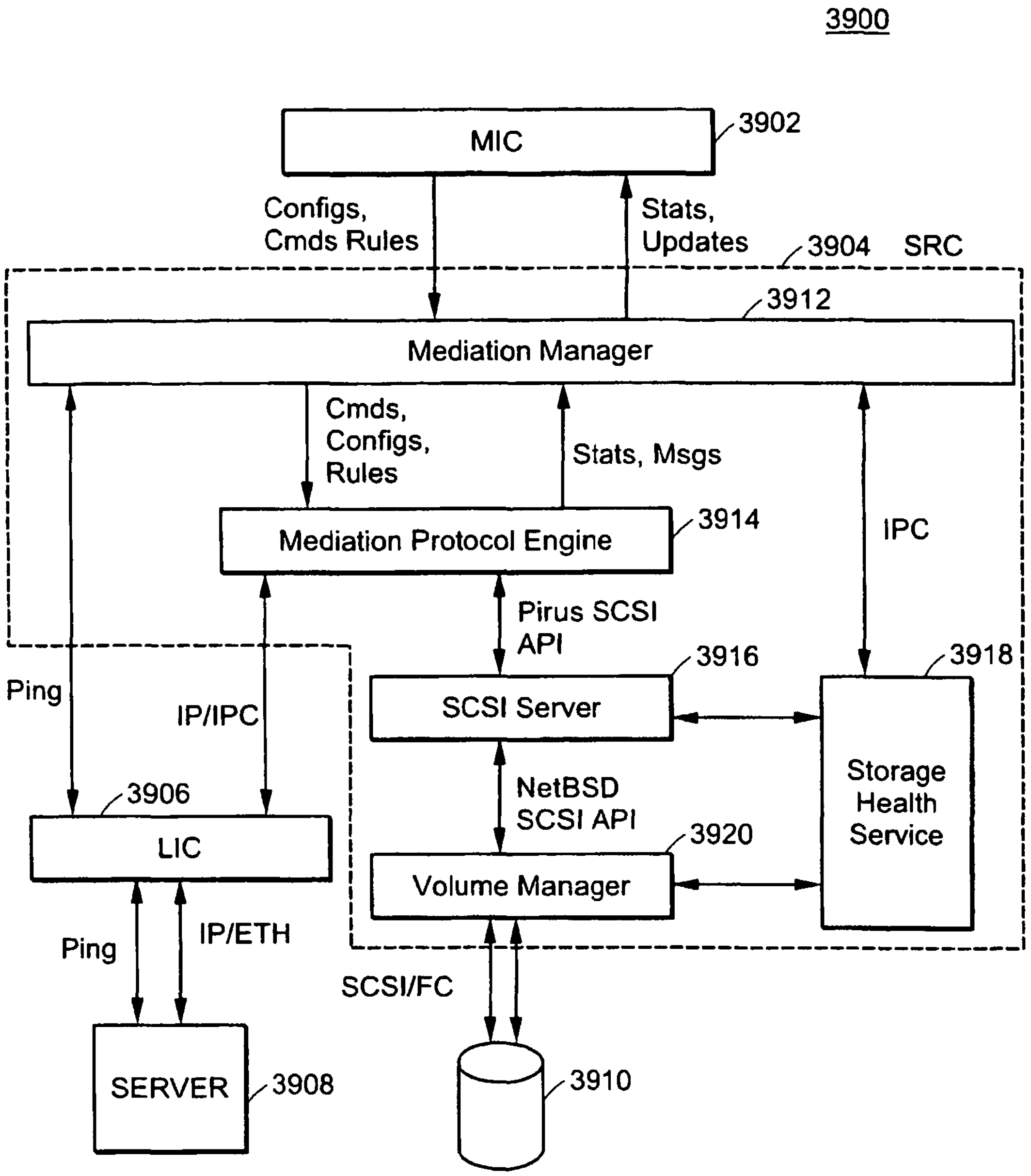
FIG. 39 depicts operation of mediation protocol engines.

1. Components In accordance with one embodiment of the invention, mediation is handled by a Mediation Manager and one or more Mediation Protocol Engines. Their interaction between each other and other parts of the Pirus box is shown in FIG. 39.

Figure 40:
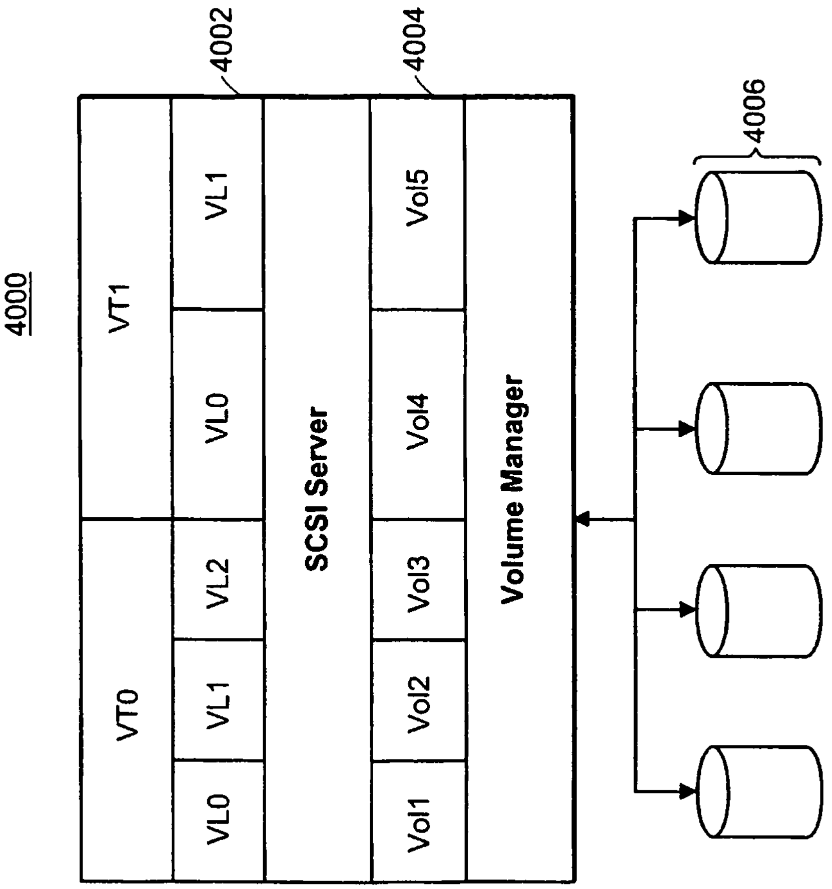
FIG. 40 depicts configuration of storage by the volume manager in accordance with another aspect of the invention.

2. Storage Hierarchy In accordance with known storage practice, at the lowest level of storage, there are physical disks, and each disk has one or more LUNs. In the system of the invention, as shown in the FIG. 40, the Volume manager configures the disks in a known manner (such as mirroring, RAID, or the like) and presents them to the SCSI server as volumes (e.g., Vol 1 thru Vol 5). The SCSI server assigns each volume to a Virtual LUN (VLO thru VL 2) in a Virtual Target (VTO through VT1).

The following behaviors are observed:

1. Each Volume corresponds to only one Virtual LUN.
2. Each Virtual Target can have one or more Virtual LUNs.
3. Each Virtual Target is assigned an IP address.
4. A virtual target number is unique in a Pirus box.

3. Functional Specification In one practice of the invention, the Mediation Manager will be responsible for configuration, monitoring, and management of the Mediation Protocol Engines; and only one instance of the Mediation Manager will run on each 755 on the SRC. Each Mediation Manager will communicate with the MIC and the Mediation Protocol Engines as shown in FIG. 4 above. The MIC provides the configurations and commands, and the Mediation Protocol Engines will actually implement the various mediation protocols, such as iSCSI, SEP, and the like. The Mediation Manager will not be involved in the actual mediation, hence, it will not be in the data path.

4. Functional Requirements

1. In one practice of the invention, the Mediation Manager always listens to receive configuration and command information from the MIC, and sends statistics back to the MIC.
2. The Mediation Manager accepts the following configuration information from the MIC, and configures the Mediation Protocol Engines appropriately: a. Add a virtual target i. Mediation Protocol
    1. TCP/UDP port number
    2. Max inactivity time ii. Virtual target number iii. IP address iv. Number of LUNs v. Max number of sessions b. Modify a virtual target c. Remove a virtual target
    3. Once configured by the MIC, the Mediation Manager spawns only one Mediation Protocol Engine for each configured mediation protocol. A Mediation Protocol Engine will handle all the sessions for that protocol to any/all the accessible disks on its Fiber Channel port.
    4. The Mediation Manager accepts the following commands from the MIC and sends a corresponding command to the appropriate Mediation Protocol Engine: a. Start/Stop a Mediation Protocol Engine b. Abort a session c. Get/Reset a stat for a mediation protocol and virtual target 5. The Mediation Manager will collect statistics from the Mediation Protocol Engines and report them to the MIC. The stats are: a. Number of currently established sessions per mediation protocol per virtual target; this stat is unaffected by a stat reset. b. A list of all the sessions for a mediation protocol and virtual target: virtual LUN, attached server, idle time; this stat is unaffected by a stat reset. c. Number of closed sessions due to"inactivity" per mediation protocol per virtual target. d. Number of denied sessions due to"max # of sessions reached" per mediation protocol per virtual target.

6. The Mediation Manager will communicate the rules passed down by the MIC to the appropriate Mediation Protocol Engine: a. Host Access Control per mediation protocol (in one practice of the invention, this will be executed on the LIC) i. Deny sessions from a list of hosts/networks ii. Accept sessions only from a list of hosts/networks b. Storage Access Control per virtual target i. Age out a virtual target, i.e., deny all new sessions to a virtual target. This can be used to take a virtual target offline once all current sessions die down.

7. The Mediation Manager (as ordered by the user through the MIC) will send the following commands to the Mediation Protocol Engines: a. Start (this may be equivalent to spawning a new engine) b. Stop c. Abort a session d. Get/Reset stats for a mediation protocol and virtual target.

8. The Mediation Manager will register to receive ping (ICMP Echo Request) packets destined for any of its virtual targets.

9. Once the Mediation Manager receives a ping (ICMP Echo Request) packet for a virtual target, it will send a request to the "Storage Health Service" for a status check on the specified virtual target. Once the reply comes back from the Storage Health Service, the Mediation Manager will send back an ICMP Echo Reply packet.

10. The Mediation Manager will register to send/receive messages through IPC with the Storage Health Service.

5. Design In the embodiment shown, only one Mediation Manager task runs on each 755 on the SRC. It listens for configuration and command information from the MIC to manage the Mediation Protocol Engines. It also reports back statistics to the MIC. The Mediation Manager spawns the Mediation Protocol Engines as tasks when necessary. In addition, it also handles ping (ICMP Echo Request) packets destined to any of its virtual targets.

6. Data Structures In this embodiment, the data structures for keeping track of virtual target devices and their corresponding sessions are set up as shown in FIG. 9-6.

Figure 41:
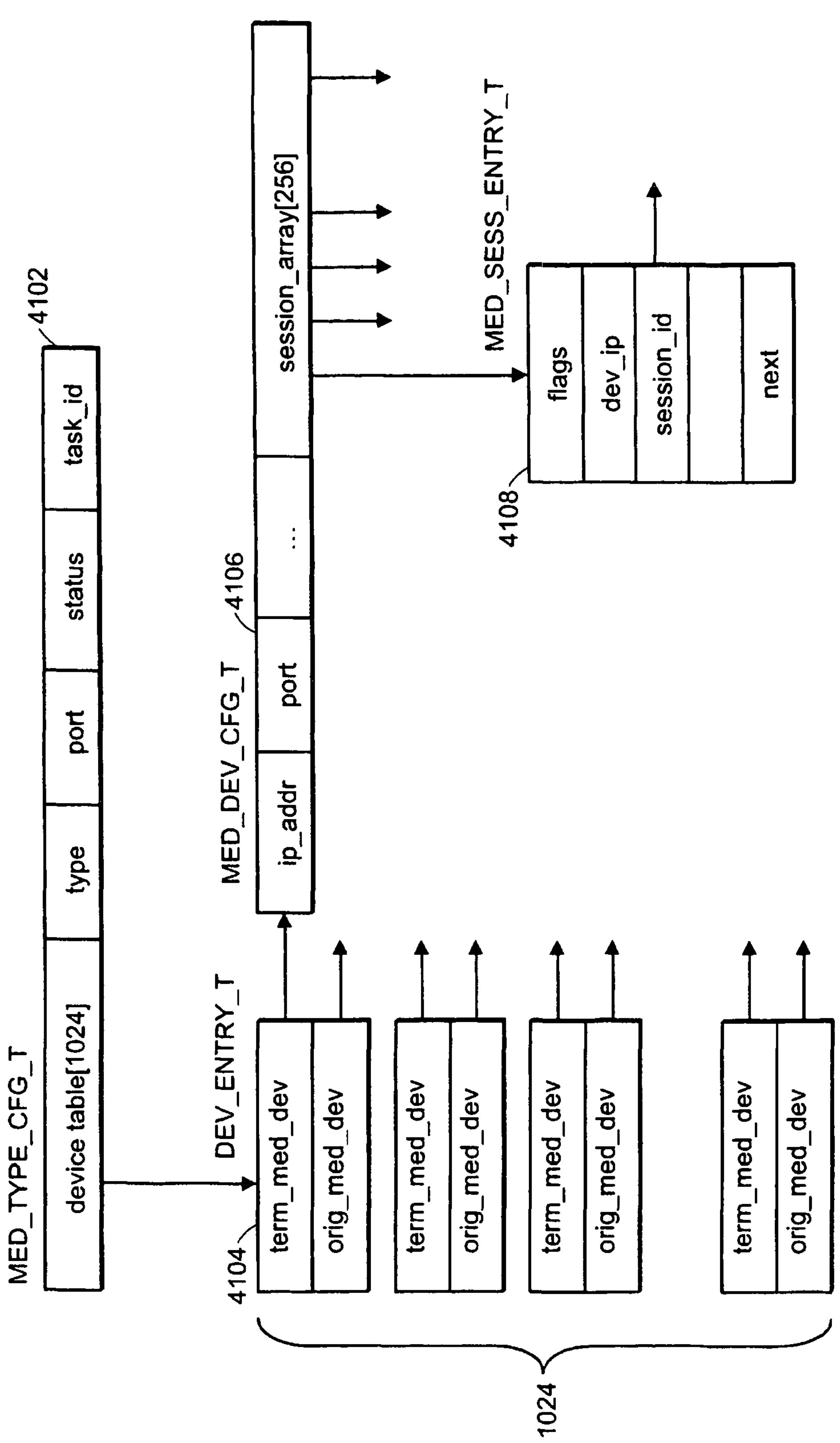
FIG. 41 depicts data structures for keeping track of virtual devices and sessions.

In the embodiment shown in FIG. 41, the number of supported virtual target devices on a Pirus box is 1024, with each having 256 sessions; and the virtual target devices are different for termination and origination.

At startup, the Mediation Manager sets up an array of MEDTYPECFGT, one for each mediation protocol type: iSCSI, SEP, SCSI over UDP, and FC over IP. It will then allocate an array of pointers for each virtual target device, DEVENTRYT. Once the MIC configures a new virtual target device (for termination or origination) the Mediation Manager allocates and links in a MEDDEVCFGT structure. Finally, when a new session is established, a MEDSESSENTRYT structure is allocated.

This structure will provide a reasonable compromise between memory consumption and the speed at which the structure could be searched for a device or session.

In this practice of the invention, a session id is a 32-bit entity defined as follows to allow for direct indexing into the above structure.

Mediation type is 4 bits which allows for 16 mediation protocol types.

The next single bit indicates whether it is for termination or origination.

The next 11 bits represent the device number, basically an index to the device array.

The 8 bits of session number is the index into the session array.

Finally, 8 bits of generation number is used to distinguish old sessions from current sessions.

Figure 42:
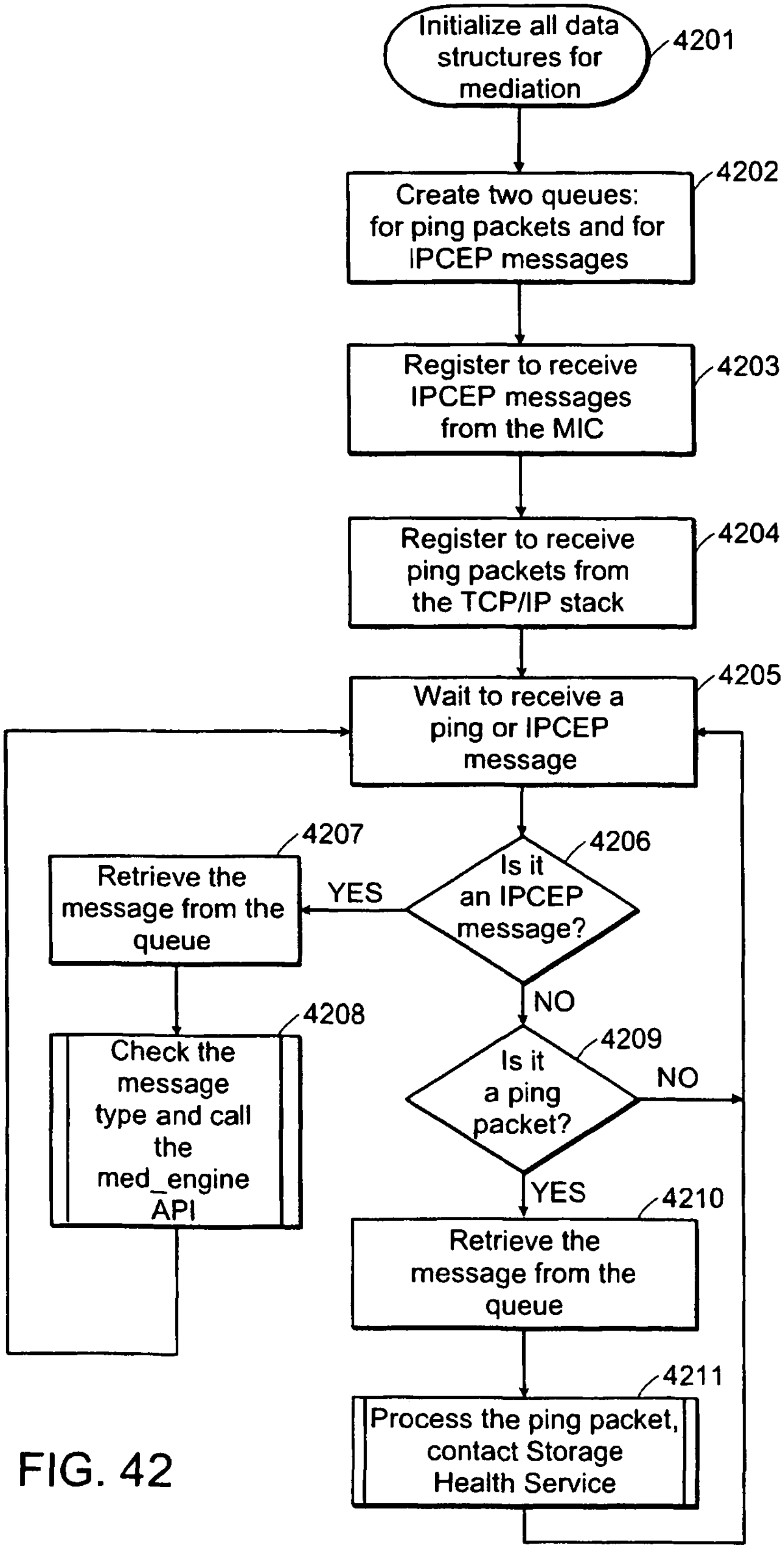
FIG. 42 depicts mediation manager operation in accordance with another aspect of the invention.

7. Flow Chart In this practice of the invention, there will be one semaphore that the Mediation Manager will wait upon. Two events will post the semaphore to awaken the Mediation Manager: 1. Arrival of a packet through IPCEP from the MIC 2. Arrival of a ping packet As indicated in FIG. 42, the Mediation includes the following steps: Initializing all data structures for mediation 4201; Creating two queues: for ping packets and for IPCEP messages 4202; Registering to receive IPCEP messages from the MIC 4203; Registering to receive ping packets from the TCP/IP stack 4204; Waiting to receive ping packets from the TCP/IP stack; Waiting to receive a ping or IPCEP message; Checking whether the received item is an IPCEP message, and if so, Retrieving the message form the queue and checking the message type and calling the med engine API (or similar process) and then returning to the “wait to receive” step; or, if not, Checking whether it is a ping packet, and if so, retrieving the message from the queue, processing the ping packet, contacting the storage health service, and returning to the“wait to receive” step; or if not a ping packet, returning to the“wait to receive” step.

IX. Mediation Caching

Figure 43:
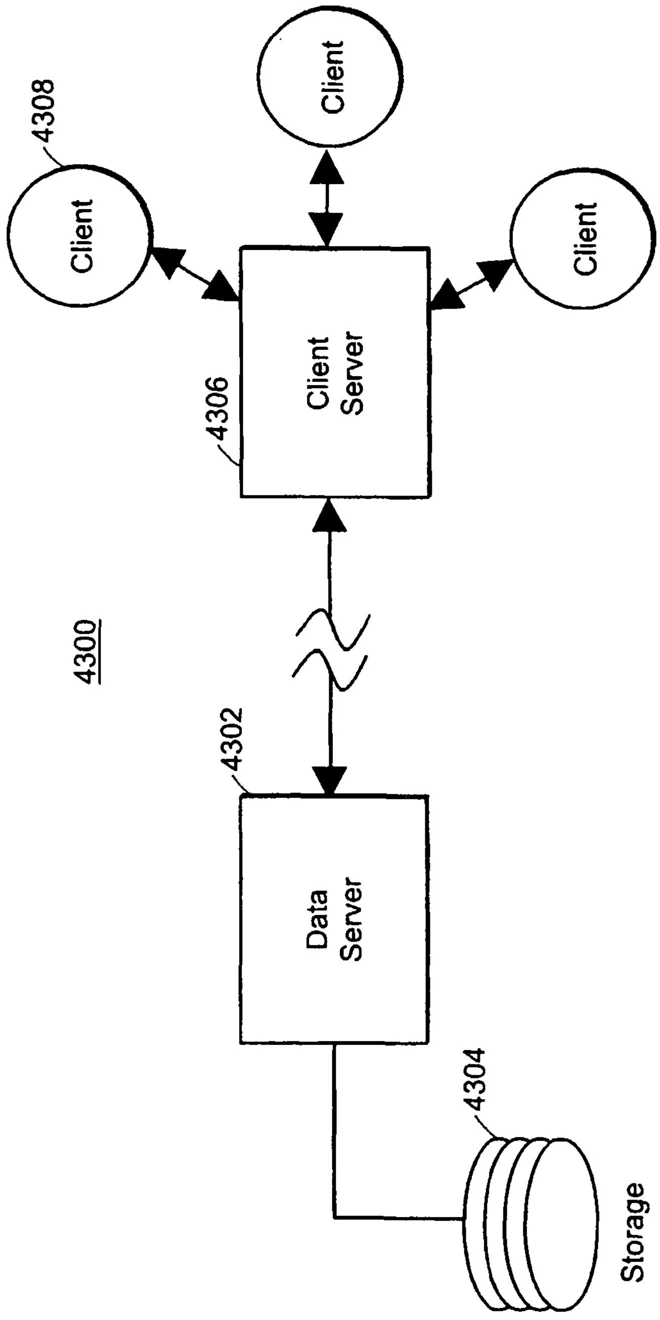
FIG. 43 depicts mediation in accordance with one practice of the invention.

The following section describes techniques for utilizing data caching to improve access times and decrease latency in a mediation system according to the present invention. By installing a data cache on the Client Server (as illustrated in FIG. 43), the local clients can achieve faster access times for the data being served by the Data Server. The cache will provide access to data that has already (recently) been read from the Data Server. In the case where a client attempts to access a segment of data that has been previously read, either by the same client or any other attached client, the data can be delivered from the local cache. If the requested data is not in the local cache, the read operation must be transmitted to the Data Server, and the server will access the storage system. Once the data is transferred back to the Client Server, the data will be stored in the local cache, and be available for other clients to access.

In a similar fashion, the write performance of the clients can be improved by employing a Non-Volatile Ram (NVRAM) on the client server.

Using the NVRAM, the system can reply to the local clients that the write operation is complete as soon as the data is committed to the NVRAM cache.

This is possible since the data will be preserved in the NVRAM, and will eventually be written back to the Data Server for commitment to the storage device by the system. The performance can be further improved by altering the way in which the NVRAM data cache is manipulated before the data is sent to the Data Server. The write data from the NVRAM can be accumulated such that a large semi-contiguous write access can be performed to the data server rather than small piecewise accesses. This improves both the data transmit characteristics between the servers as well as improving the storage characteristics of the Data Server since a large transfer involves less processor intervention than small transfers.

This system improves latency on data writes when there is space available in the write cache because the client writer does not have to wait for the write data to be transmitted to the Data Server and be committed to the storage device before the acknowledgement is generated. The implied guarantees of commitment to the storage device is managed by the system through the utilization of NVRAM and a system to deliver the data to the Data Server after a system fault.

The system improves latency on data reads when the read data segment is available in the local read cache because the client does not have to wait for the data transmission from the data server, or the storage access times before the data is delivered. In the case where the data is not in the local cache the system performance is no worse that a standard system.

The system requires that the data in the write cache be available to the client readers so that data integrity can be maintained. The order of operation for read access is 1) check the local write cache for data segment match 2) (if not found in 1) check the local read cache for data segment match 3) (if not found in 2) issue the read command to the Data Server 4) Once the data is transmitted from the Data Server save it in the local data cache.

The order of operation for write access is 1) check the local read cache for a matching data segment and invalidate the matching read segments 2) check the local write cache for matching write segments and invalidate (or re-use) 3) generate a new write cache entry representing the write data segments.

FIG. 43 shows the simple system with one Client Server per Data server. Note that the client server can have any number of clients, and a Client Server can target any number of Data Servers.

Figure 44:
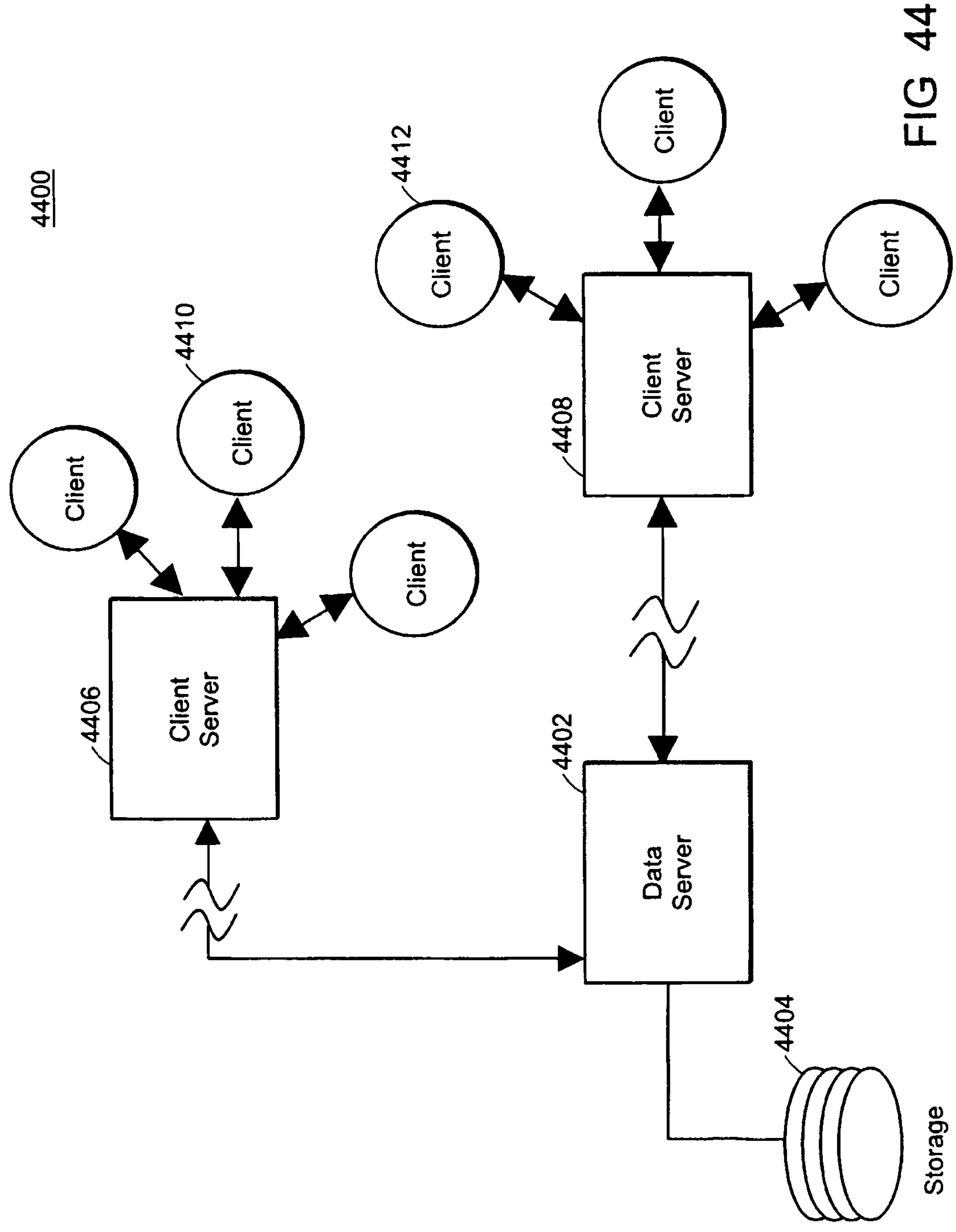
FIG. 44 depicts mediation in accordance with another practice of the invention.

The caching mechanism becomes more complex in a system such as the one shown in FIG. 44. When a system contains more than one Client Server per Data Server, the cache coherency mechanism must become more complex. This is because one client server can modify data that is in the local cache of the other client server, and the data will not match between the Client Servers.

Cache coherency can be maintained in the more complex system by determining the state of the cache on the Data Server. Before any data can be served from the Client Server local data cache, a message must be sent to the data server to determine if the data in the local data cache must be updated from the Data Server. One method of determining this is by employing time-stamps to determine if the data in the Client Server local data cache is older than that on the Data Server. If the cache on the Client Server needs to be updated before the data is served to the client, a transmission of the data segment from the Data Server will occur. In this case, the access from the client will look like a standard read operation as if the data were not in the local cache. The local data cache will be updated by the transmission from the Data Server, and the time-stamps will be updated.

Similarly, in the data write case, the Data Server must be consulted to see if the write data segments are locked by another client. If the segments are being written by another Client Server during the time a new Client Server wants to write the same segments (or overlapping segments), the new write must wait for the segments to be free (write operation complete from first Client Server). A light weight messaging system can be utilized to check and maintain the cache coherency by determining the access state of the data segments on the Data Server.

The order of operation for read access in the complex system is as follows: 1) check the local write cache for data segment match 2) (if not found in 1) check the local read cache for data segment match 3) (if the segment is found in local cache) send a request to the Data Server to determine the validity of the local read cache 4) If the local read cache is not valid, or the segment is not found in the local cache, issue a read operation to the Data Server. 5) Once the data is transmitted from the Data Server save it in the local data cache.

Note that the case where the data cache is not valid can be optimized by returning the read data in the event that the local cache data is invalid. This saves an additional request round-trip. The order of operation for write access in the complex system is 1) check the local read cache for a matching data segment and invalidate the matching read segments 2) check the local write cache for matching write segments and invalidate (or re-use) 3) Send a message to the Data Server to determine if the write segment is available for writing (if the segment is not available, wait for the segment to become available) 4) generate a new write cache entry representing the write data segments. 5) Send a message to the Data Server to unlock the data segments.

Note that in step 3, the message will generate a lock on the data segment if the segment is available; this saves an additional request round-trip.

X. Server Health Monitoring

The following discussion describes the Pirus Server Health Manager, a system process that runs within the Pirus chassis and monitors the state of storage services that are available to external clients. Server Health manages the state of Pirus Storage services, and uses that data to regulate the flow of data into the Pirus chassis. Server health will use this information to facilitate load balancing, fast-forwarding or discarding of traffic coming into the system.

The Pirus Server Health Manager (SHM) is responsible for monitoring the status or health of a target device within the Pirus chassis. Pirus target devices can include, for example, NAS and mediation/iSCSI services that run on processors connected to storage devices.

In one practice of the invention, the SHM runs on the Pirus system processor (referred to herein as Network Engine Card or NEC) where NAS or FISCS) storage requests first enter the system. These requests are forwarded from this high-speed data path across a switched fabric to target devices.

SHM will communicate with software components in the system and provide updated status to the data-forwarding path.

1. Operation with Network Access Server (NAS): In accordance with the invention, SHM communicates with components on the NAS Storage Resource Card (SRC) to monitor the health of NF S services. NFS requests are originated from the NEC and inserted into the data stream along with customer traffic that enters from the high-speed data path. Statistics are gathered to keep track of latency, timeouts and any errors that may be returned from the server. SHM also exchanges IPC messages with the NFS Coherency Manager (NCM) on the SRC to pass state information between the two processors. Message sequences exchanged between these two systems can originate from the NAS or from the NEC.

2. Operation with iSCSI/Mediation Devices: SHM will also communicate with a Mediation Device Manager (MDM) that runs on a SRC card and manages mediation devices like iSCSI. SHM will send ICMP messages to each target and wait on responses. Statistics are also gathered for mediation devices to keep track of latency, timeouts and error codes. IPC messages will also be sent from the NEC to MDM whenever an ICMP request times out.

Interaction with Data Forwarding Services: Data arrives into the Pirus chassis from high-speed network interfaces like Ethernet. Low-level drivers and the Intelligent Filtering and Forwarding (IFF) component, described elsewhere in this document, receive this data. IFF works with code in the IXP 1200 Micro-engine to forward traffic across the backplane to the NAS or FISCS) service.

3. Forwarding of NFS Traffic: Either a single server or multiple servers within the Pirus chassis can consume NFS traffic. It is contemplated that NFS traffic forwarded to a single server will always be sent to the same target CPU across the backplane as long as that CPU and server are alive and healthy.

A group of NFS servers can provide the same 'virtual' service where traffic can be forwarded to multiple servers that reside on multiple CPUs. In this configuration, NFS write and create operations are replicated to every member of the group, while read operations can be load balanced to a single member of the group. The forwarding decision is based on the configured policy along with server health of each of the targets.

Load balancing decisions for read operations may be based on a virtual service (defined by a single virtual IP address) and could be as simple as round-robin, or, alternatively, use a configured weight to determine packet forwarding. Health of an individual target could drop one of these servers out of the list of candidates for forwarding or affect the weighting factor.

Load balancing may also be based on NFS file handles. This requires that server health, IFF and micro-engine code manage state on NFS file handles and use this state for load balancing within the virtual service. File handle load balancing will work with target server balancing to provide optimum use of services within the Pirus chassis.

4. NFS Read Load Balancing Algorithms: The following read load balancing algorithms can be employed: Round robin to each server within a virtual service Configured weight of each server within a virtual service Fastest response time determines weight of each server within a virtual service New file handle round robin to a server within a virtual service, accesses to the same file handle are always directed to the same server New file handle configured weight to a server within a virtual service, accesses to the same file handle are always directed to the same server Heavily accessed file list split across multiple servers Each of the algorithms above will be affected by server health status along with previous traffic loads that have been forwarded. Servers may drop out of the server set if there is congestion or failure on the processor or associated disk subsystem.

XI. Fast-Path: Description of Illustrated Embodiments

Figure 45:
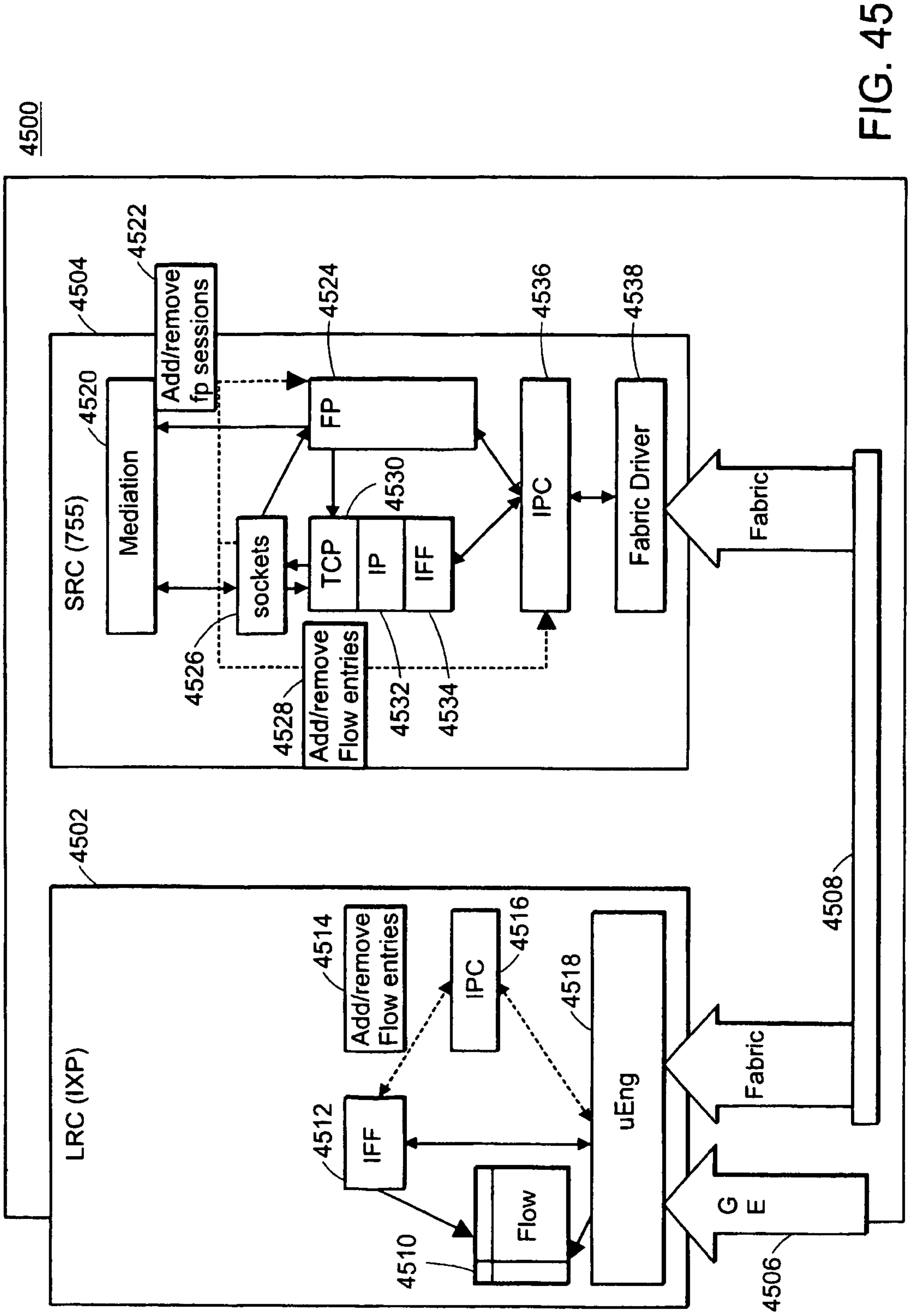
FIG. 45 depicts fast-path architecture in accordance with the invention.
Figure 46:
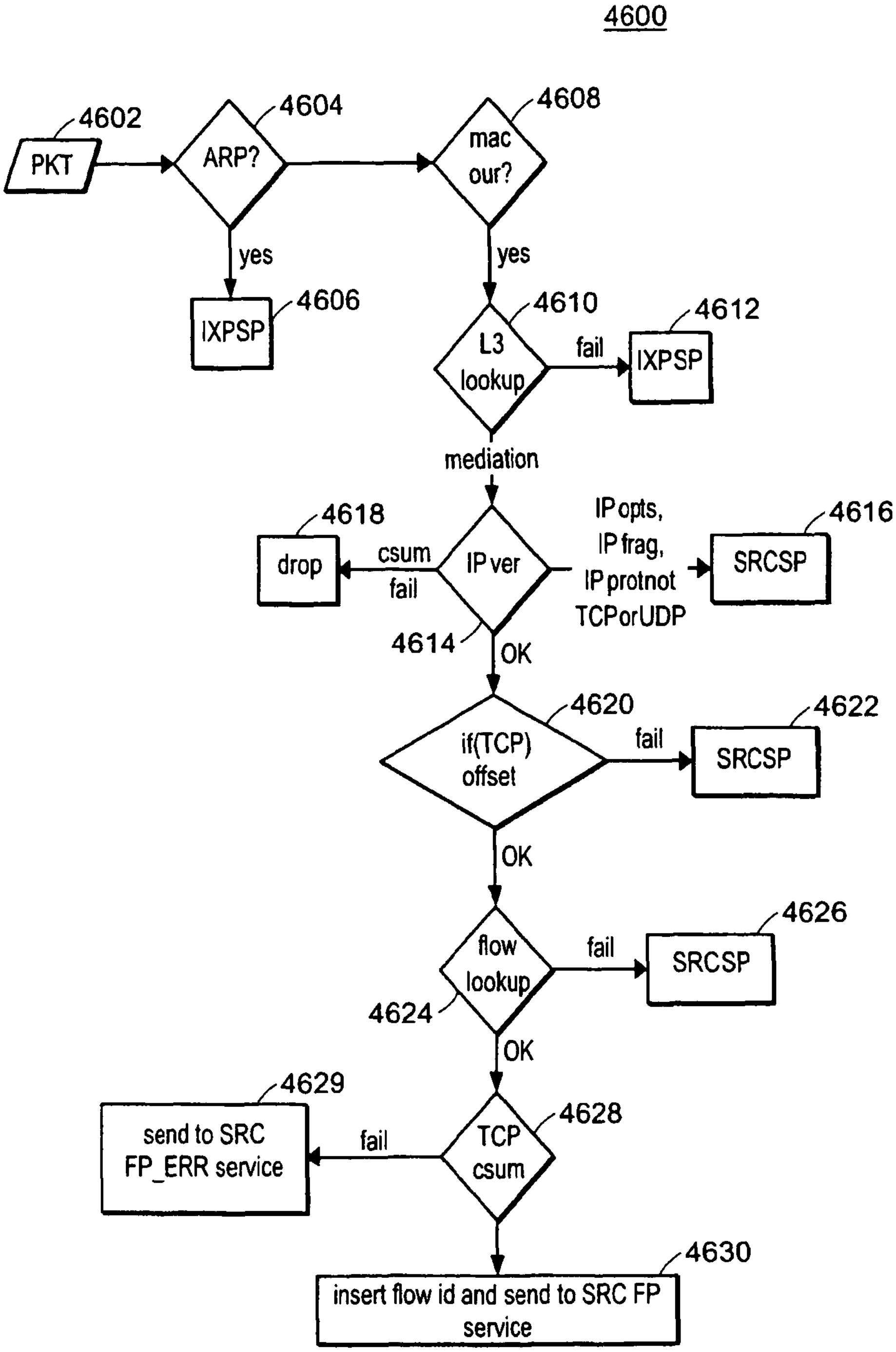
FIG. 46 depicts IXP packet receive processing for mediation.

The following description refers to examples of Fast-Path implemented in the Pirus Box and depicted in the attached FIGS. 45 and 46. As noted above, however, the Fast-Path methods are not limited to the Pirus Box, and can be implemented in substantially any TCP/UDP processing system, with different combinations of hardware and software, the selection of which is a matter of design choice. The salient aspect is that Fast-Path code is accelerated using distributed, synchronized, fast-path and slow-path processing, enabling TCP (and UDP) sessions to run faster and with higher reliability. The described methods simultaneously maintain TCP state information in both the fast-path and the slow-path, with control messages exchanged between fast-path and slow-path processing engines to maintain state synchronization and hand off control from one processing engine to another. These control messages can be optimized to require minimal processing in the slow-path engines while enabling efficient implementation in the fast path hardware. In particular, the illustrated embodiments provide acceleration in accordance with the following principles:

1. Packet processing in a conventional TCP/IP stack is complex and time consuming. However, most packets do not represent an exceptional case and can be handled with much simpler and faster processing. The illustrated embodiments (1) establish a parallel, fast-path TCP/IP stack that handles the majority of packets with minimal processing, (2) pass exceptions to the conventional (slow-path) stack for further processing and (3) maintain synchronization between fast and slow paths.

2. As a matter of design choice, the illustrated embodiments employ IXP micro-engines to execute header verification, flow classification, and TCP/IP check-summing. The micro-engines can also be used for other types of TCP/IP processing. Processing is further accelerated by this us of multiple, high-speed processors for routine operations.

3. The described system also enables full control over the Mediation applications described in other sections of this document. Limits can be placed on the behavior of such applications, further simplifying TCP/IP processing.

1. Fast-Path Architecture Referring to FIG. 45, the illustrated Fast-Path implementations in the Pirus Box include the following three units, the functions of which are described below:
   1. The Fast-Path module of the SRC card, which integrates the Fast-Path TCP/IP stack. This module creates and destroys Fast-Path sessions based on the TCP socket state, and executes TCP/UDP/IP processing for Fast-Path packets.
   2. Micro-engine code running on the IXPs. This element performs IP header verification, flow classification (by doing a four-tuple lookup in a flow forwarding table) and TCP/UDP check summing.
   3. IFF control code running on the IXP ARM. This module creates/destroys forwarding entries in the flow forwarding table based on the IPC messages from the SRC.
2. Fast-Path Functions 2.1 LRC Processing:

Referring now to FIGS. 1 and 2, it will be seen that the illustrated embodiments of Fast-Path utilize both LRC and SRC processing. When VSEs (Virtual Storage Endpoints) are created, IP addresses are assigned to each, and these IP addresses are added to the IFF forwarding databases on all IXPs.

For Mediation VSEs, forwarding table entries will be labeled as Mediation in the corresponding destination IPC service number. When the IXP Receive micro-engine receives a packet from its Ethernet interface, it executes a lookup in the IFF forwarding database. If a corresponding entry is found for that packet, and the associated destination service is Mediation, the packet is passed to the IXP Mediation micro-engine for Fast-Path processing. The IXP Mediation micro-engine first verifies the IP header for correctness (length, protocol, IP checksum, no IP options and the like), verifies TCP/UDP checksum, and then executes a flow lookup. If a corresponding entry is found, flow ID is inserted into the packet (overwriting the MAC address) and the packet is forwarded to the Fast-Path service on the destination SRC. If a corresponding entry is not found, the packet is forwarded to the IFF service on the destination SRC.

2.2 SRC processing: Referring again to FIGS. 45 and 46, when the Fast-Path service on the SRC receives packets from the IPC layer, the SRC extracts Session ID from the packet and uses it to look up socket and TCP control blocks. It then determines whether the packet can be processed by the Fast-Path: i.e., the packet is in sequence, no retransmission, no data queued in the socket's Send buffer, no unusual flags, no options other then timestamp, and timestamp is correct. If any condition is not met, the packet is injected into the slow-path TCP input routine for full processing. Otherwise, TCP counters are updated, ACK-ed data (if any) is released, an ACK packet is generated (if necessary), and the packet is handed directly to the application.

2.3 Session creation/termination: In the illustrated embodiments, a Fast-Path session is established immediately after establishment of a standard TCP session (Inside Accept and Connect Calls); and destroyed just before the socket is closed (Inside Close Call). A socket's Send Call will be modified to attempt a Fast-Path Send from the user task's context all the way to the IPC. If Fast-Path fails, the job will fail back to the regular (slow-path) code path of the TCP Send Call, by sending a message to the TCP task. Conversely, the Fast-Path Receive routines, which can be executed from an interrupt or as a separate task, can forward received packets to the user task's message queue, just as conventional TCP Receive processing does. As a result, from the perspective of the user application, packets received by the Fast-Path system are indistinguishable from packets received via the slow-path.

Referring again to FIGS. 45 and 46, at an initial time (i.e., prior to Fast-Path session creation), there will be no entries in the flow forwarding table, and all packets will pass through the IFF/IP/TCP path on the SRC as described in the other sections of this document. When a TCP (or UDP) connection is established, the TCP socket's code will call Fast-Path code to create a Fast-Path session. When the Fast-Path session is created, all IXPs will be instructed to create a flow forwarding table entry for the session. This ensures that if the route changes and a different IXP begins to receive connection data, appropriate routing information will be available to the"new" IXP. (In IP architectures it is possible to have an asymmetric path, in which outgoing packets are sent to an IXP different from the one receiving the incoming packets. As a result, it would be insufficient to maintain a forwarding table only on the IXP that sends packets out.) Each time a Mediation forwarding table entry is added to the associated IXP's forwarding table, it will broadcast to all SRCs (or, in an alternative embodiment, uni-cast to the involved SRC) a request to re-post any existing Fast-Path sessions for the corresponding address. This step ensures that when a new IXP is added (or crashes and is then re-booted), the pre-existing Fast-Path state is restored. Subsequently, when the TCP (or UDP) connection is terminated, the TCP socket's code will call Fast-Path code to delete the previously-created Fast-Path session. All IXPs then will be instructed to destroy the corresponding flow forwarding table entry.

In the case that an SRC processor crashed or was removed from service, the MIC module will detect the crash or removal, and issue a command to remove the associated Mediation IP address. Similarly, if the SRC processor is restarted, it will issue a command to once again add the corresponding Mediation IP address. When the IFF module on the IXP removes the forwarding entry for the corresponding Mediation IP address, it will also remove all corresponding Fast-Path session forwarding entries.

2.4 Session Control Blocks: The described Fast-Path system maintains a table of Fast-Path Session Control blocks, each containing at least the following information: 1. Socket SID and SUID, for Fast TCP and Socket Control blocks in Receive operations.

2. TCP/IP/Ethernet or UDP/IP/Ethernet header templates for Send operations.

3. Cached IP next-hop information, including outgoing source and destination MAC addresses, and the associated IXP's slot, processor and port numbers.

An index of the Session Control block serves as a Session ID, enabling rapid session lookups. When a Fast-Path Session is created, the Session ID is stored in the socket structure to enable quick session lookup during Sends.

2. 5 IXP Services: Referring again to FIGS. 45 and 46, when a new Fast-Path session is established, the IXPs in the Pirus Box are set to forward TCP or UDP flow to a well-known Fast-Path service on the destination SRC processor. The associated IXP will insert an associated Fast-Path flow ID into the first word of the packet's Ethernet header (thereby overriding the destination MAC address) to permit easy flow identification by the Fast-Path processing elements. The IXP will execute a lookup of a four-tuple value (consisting of ip_src, ip_dst, portsrt, portdst) in the forwarding table to determine destination (card, processor, flow ID). In addition, the IXP will execute the following steps for packets that match the four-tuple lookup:

1. Check IP header for correctness. Drop packet if this fails.

2. Execute IP checksum. Drop packet if this fails.

3. Confirm that there is/are no fragmentation or IP option. (As a matter of design choice, certain TCP options are permitted, for timestamp and RDMA.) If this fails, forward the packet to the SRC "slow path" (IFF on SRC).

4. Execute TCP or UDP checksum. If this fails, send packet to a special error service on the SRC.

The IXP can also execute further TCP processing, including, but not limited to, the following steps:

1. Confirm that header length is correct.
2. Confirm that TCP flags are ACK and nothing else.
3. Confirm that the only option is TCP timestamp.
4. Remember last window value and confirm that it has not changed.

The IXP can also have two special well-known services: TCPADDCHECKSUM and UDP ADD CHECKSUM. Packets sent to these services will have TCP and IP, or UDP and IP checksums added to them.

Thus, the illustrated Fast-Path embodiment can utilize a number of well-known services, including 2 on the IXP IPC_SVC_IXP_CSUM -adds TCP checksum to outbound packets IPC_SVC_IXP_UDP_CSUM -adds UDP checksum to outbound packets -and 3 on the SRC:

IPC_SVC_SRC_FP -Fast-Path input

IPC_SVC_SRC_SP -"slow path" input

IPC_DVC_SRC_FP_ERR -error service that increments

3. Further Fast Path Aspects Referring again to FIGS. 45 and 46, all Fast-Path IPC services (i.e., each service corresponding to a TCP or UDP connection) will have the same IPC callback routine. Flow ID can be readily extracted from the associated Ethernet header information, and can be easily translated into socket descriptor/socket queue ID by executing a lookup in a Fast-Path session table.

Subsequently, both TCB and socket structure pointers can also be quickly obtained by a lookup.

Fast-Path processing will be somewhat different for TCP and UDP. In the case of UDP, Fast-Path processing of each packet can be simplified substantially to the updating of certain statistics. In the case of TCP, however, a given packet may or may not be eligible for Fast-Path processing, depending on the congestion/flow-control state of the connection. Thus, a Fast-Path session table entry will have a function pointer for either TCP or UDP Fast-Path protocol handler routines, depending on the socket type. In addition, the TCP handler will determine whether a packet is Fast-Path eligible by examining the associated Fast-Path connection entry, TCP header, TCP control block, and socket structure. If a packet is Fast-Path eligible, the TCP handler will maintain the TCP connection, and transmit control information to the Mediation task's message queue. If the TCP stack's Send process needs to be restarted, the TCP handler will send a message to the TCP stack's task to restart the buffered Send. Conversely, if a packet is not eligible for Fast-Path, the TCP handler will send it to the slow-path IP task.

In the illustrated embodiments, the Socket Send Call checks to determine whether the socket is Fast-Path enabled, and if it is, calls the Fast-Path Send routine. The Fast-Path Send routine will obtain socket and TCB pointers and will attempt to execute a TCP/IP shortcut and send the packet directly to the IPC. In order to leave a copy of the data in the socket, in case TCP needs to retransmit, the Fast-Path module will duplicate BJ and IBD, increment the REF count on the buffer, and add IBD to the socket buffer. The illustrated embodiments of Fast-Path do not calculate TCP and IP check-sums, but maintain two well-known service numbers, TCP CHECKSUM ADD, UDPCHECKSUMADD; and the IXP will add checksums on the packets received on these services. The destination IXP will be determined by referencing the source IXP of the last received packet. If the Fast-Path system is unable to transmit the packet directly to the IPC it will return an error code to the Socket Send Routine, which will then simply continue its normal code path and send the packet to the slow-path TCP task's message queue for further processing.

To provide additional streamlining and acceleration of TCP/UDP packet processing, a number of optional simplifications can be made. For example, the described Fast-Path does not itself handle TCP connection establishment and teardown. These tasks are handled by the conventional TCP stack on the SRC. Similarly, the described Fast-Path does not itself handle IP options and IP fragmentation; these conditions are handled by the conventional TCP stacks on both the LRC and the SRC. In the illustrated embodiments, Fast-Path handles the TCP timestamp option, while the conventional TCP stack on the SRC handles all other options. Similarly, the described Fast-Path system does not handle TCP retransmission and reassembly; these aspects are handled by the conventional TCP stack on the SRC. Certain security protocols, such as IPSec, change the IP protocol field and insert their own headers between the IP and TCP headers. The illustrated Fast-Path embodiments can be modified to handle this circumstance.

Fast-Path can be enabled by each socket's application on a per-socket basis. The system can be set to be disabled by default, and can be enabled by doing a socket ioctl after a socket is created, but before a connection is established. Apart from this, the described Fast-Path is transparent for the socket application, from the viewpoint of the socket interface.

The performance gains provided by Fast-Path are in part a function of the number of TCP retransmissions in the network. In networks having a large number of packet drops, most of the packets will go through the conventional TCP stack instead of the Fast-Path system. However, in a "good" LAN with limited packet drops, more than 90% of packets will go through Fast-Path, thus providing significant performance improvements.

For example, the invention can be implemented in the Pirus interconnection system described below and in U.S. provisional patent application 60/245,295 (referred to as the"Pirus Box"). The Pirus Box routes, switches and bridges multiple protocols across Fibre Channel, Gigabit Ethernet and SCSI protocols and platforms, thereby enabling interoperability of servers, NAS (network attached storage) devices, IP and Fibre Channel switches on SANs (storage area networks), WANs (wide area networks) or LANs (wide area networks). Within the Pirus Box, multiple front-end controllers (IXPs) connect to a high-speed switching fabric and point-to-point serial interconnect.

Back-end controllers connect to switched Ethernet or other networks, managing the flow of data from physical storage devices.

In one implementation of the invention within the Pirus Box, the Fast-Path includes Fast-Path code running on 750-series microprocessors, with hardware acceleration in IXP micro-engines. Alternatively, in a configuration having a close coupling between the IXP modules and the processors terminating TCP sessions, the Fast-Path code is executed together with the hardware acceleration in the IXP micro-engines. In each case, the described Fast-Path code can be highly optimized and placed in gates or micro-engines.

Such code will execute much faster than a conventional TCP/IP stack, even when running on the same processor as a conventional stack.

The Fast-Path methods described herein are not limited to the Pirus Box, but can be implemented in substantially any TCP/UDP processing system.

GLOSSARY OF TERMS

Backplane—the Pirus box chassis is referred to herein a backplane; however, it will be recognized that the chassis could alternatively be a midplane design.

CLI—Command Line Interface

FC—Fibre Channel

FSC—Fibre Channel Switching Card

IFF—Layer 2, 3, 4 and 5 Intelligent Filtering and Forwarding switch

JBOD—Just a Bunch of Disks

LIC—LAN Interface Card

MAC—Media Access Control-usually refers to an Ethernet interface chip

MIC—Management Interface Card

MTU—Maximum Transfer Unit-largest payload that can be sent on a medium.

NEC—Network Engine Card

NP—Network Processor

SCSI—Small Computer Systems Interface

SRC—Resource Module Card uP—Microprocessor

ARP—Address Resolution Protocol

CLI—Command Line Interface

CONSOLE—System Console

CPCM—Card/Processor Configuration Manager

CSA—Configuration and Statistics Agent

CSM—Configuration and Statistics Manager

DC—Disk Cache

Eth Dryer—Ethernet Driver

FC Nx—Fibre Channel Nx Port

FFS—Flash File System

FS—File System

HTTP—Hyper Text Transfer Protocol

HTTPS—Hyper Test Transfer Protocol Secured

IP—Internet Protocol

IPC—Inter Process Communication

L2—Layer 2

LHC—Local Hardware Control

LOGI—Logging Interface

MLAN—Management LAN

MNT—Mount

NFS—Network File Seryer

RCB—Rapid Control Backplane

RPC—Remote Procedure Call

RSS—Remote Shell Service

S2—System Services

SAM—System Abstraction Model

SB—Service Broker

SCSI—Small Computer System Interface

SFI—Switch Fabric Interface

SGLUE—SNMP Glue

SNMP—Simple Network Management Protocol

SSC—Server State Client

SSH—Secured Shell

SSM—Server State Manager

TCP—Transmission Control Protocol

UDP—User Datagram Protocol

VM—Volume Manager

WEBH—WEB Handlers

Current Filesystem Server Set: The subset of the configured filesystem server set that is made up of members that have synchronized copies of the filesystem.

Joining Filesystem Server Set: Members not part of the Current Filesystem Set that are in the process of joining that set.

Complete copy of a Filesystem: A copy of a filesystem containing file data for all file inodes of a filesystem.

Construction of a Filesystem Copy: Building a sparse or complete copy of a filesystem by copying every element of the source filesystem.

Filesystem Checkpoint: NCM has insured that all members of the current filesystem server set have the same copy of the filesystem. A new filesystem checkpoint value was written to all copies and placed on stable storage. The filesystem modification sequence number on all members of the current filesystem server set is the same. The IN-MOD has been cleared on all members of the current filesystem server set.

Filesystem Checkpoint Value: Filesystems and NVRAM are marked with a filesystem checkpoint value to indicate when running copies of the filesystem were last checkpointed. This is used to identify stale (non-identical, non-synchronized) filesystems.

Filesystem Modification Sequence Number: The number of NFS modification requests performed by a NAS server since the last filesystem checkpoint.

Each NAS server is responsible for maintaining its own stable storage copy that is accessible to the NCM after a failure. The filesystem checkpoint value combined with this number indicate which NAS server has the most recent copy of the filesystem.

Inode List Allocated (IN-Alloc): The list of inodes in a filesystem that have been allocated.

Inode List Content (IN-Con): The list of inodes in a filesystem that have content present on a server; this must be a subset of IN-Alloc. This will include every non-file (i.e. directory) inode. If this is a Complete Copy of a Filesystem, then IN-Con is identical to IN-Alloc.

Inode List Copy (IN-Copy): Which inodes of a filesystem have been modified since we began copying the filesystem (during Construction/Restoration); in the disclosed embodiments, this must be a subset of IN-Con.

Inode List Modified (IN-Mod): Which inodes have been modified since the last filesystem checkpoint. 2 filesystems with the same filesystem checkpoint value should only differ by the changes represented by their modified InodeList. A Filesystem Checkpoint between two filesystems means that each is a logical image of one another, and the IN-Mod can be cleared.

NCM-NAS Coherency Manager: The Pirus chassis process that is responsible for synchronizing peer NAS servers.

Peer NAS Server: Any CPU that is a member of a virtual storage target group (VST).

Recovery of a Filesystem Copy: Bringing an out of date filesystem copy in sync with a later copy. This can be accomplished by construction or restoration.

Restoration of a Filesystem Copy: Bringing a previously served filesystem from its current state to the state of an up to date copy by a means other than an element by element copy of the original.

Sparse copy of a filesystem: A copy of a filesystem containing file data for less than all file inodes of a filesystem.

VST—Virtual Storage Target: As used herein, this term refers to a group of NAS server CPUs within a Pirus chassis that creates the illusion of a single NAS server to an external client.

ARM, StrongARM processors: general-purpose processors with embedded networking protocols and/or applications compliant with those of ARM Holdings, PLC (formerly Advanced RISC Machines) of Cambridge, U. K.

BSD: sometimes referred to as Berkeley UNIX, an open source operating system developed in the 1970s at U. C. Berkeley. BSD is found in nearly every variant of UNIX, and is widely used for Internet services and firewalls, timesharing, and multiprocessing systems.

IFF—Intelligent Forwarding and Filtering (described elsewhere in this document in the context of the Pirus Box architecture).

IOCTL: A system-dependent device control system call, the ioctl function typically performs a variety of device-specific control functions on device special files.

IPC: Inter-Process Communications. On the Internet, IPC is implemented using TCP transport-layer protocol.

IPSec: IP security protocol, a standard used for interoperable network encryption.

IXP: Internet Exchange Processors, such as Intel's IXP 1200 Network Processors, can be used at various points in a network or switching system to provide routing and other switching functions. Intel's IXP 1200, for example, is an integrated network processor based on the StrongARM architecture and six packet-processing micro-engines. It supports software and hardware compliant with the Intel Internet Exchange Architecture (IXA). See Pirus Box architecture described elsewhere in this document.

LRC: LAN Resource Card. In the Pirus Box described herein, the LRC interfaces to external LANs, servers or WANS, performs load balancing and content-aware switching, implements storage mediation protocols and provides TCP hardware acceleration in accordance with the present invention.

MAC address: Media Access Control address; a hardware address that uniquely identifies each node of a network.

Micro-engine: Micro-coded processor in the IXP. In one implementation of the Pirus Box, there are six in each IXP.

NFS: Network File Server Protocol Mediation: applications and/or devices that translate between and among different protocols, such as TCP/IP, X. 25, SNMP and the like. Particular Mediation techniques and systems are described elsewhere in this document in connection with the Pirus Box.

RDMA: Remote Direct Memory Access. The transfer of application data from a remote buffer into a contiguous local buffer. Typically refers to memory-to-memory copying between processors over TCP protocols such as HTTP and NFS across an Ethernet.

SCSI: Small Computer System Interface, widely-used ANSI standards-based family of protocols for communicating with)/0 devices, particularly storage devices.

FISCS): Internet SCSI, a proposed transport protocol for SCSI that operates on top of TCP, and transmits native SCSI over a layer of the IP stack. The Pirus Box described herein provides protocol mediation services to FISCS) devices and networks ("iSCSI Mediation Services"), using TCP/IP to provide LAN-attached servers with access to block-oriented storage.

Silly Window Avoidance Algorithm (Send-Side): A technique in which the sender delays sending segments until it can accumulate a reasonable amount of data in its output buffer. In some cases, a "reasonable amount" is defined to be a maximum-sized segment (MST).

SRC: Storage Resource Card. In the Pirus Box architecture described herein, the SRC interfaces to external storage devices, provides NFS and CIFS services, implements IP to Fibre Channel (FC) storage mediation, provides volume management services (including dynamic storage partitioning and JBOD (Just a Bunch of Disks) aggregation to create large storage pools), supports RAID functionality and provides integrated Fibre Channel SAN switching.

TCP: Transmission Control Protocol, a protocol central to TCP/IP networks.

TCP guarantees delivery of data and that packets will be delivered in the same order in which they were sent.

TCP/IP: Transmission Control Protocol/Internet Protocol, the suite of communications protocols used to connect hosts on the Internet.

UDP: User Datagram Protocol (UDP) supports a datagram mode of packet-switched communications in an interconnected set of computer networks, and enables applications to message other programs with a minimum of protocol mechanism. UDP is considerably simpler than TCP and is useful in situations where the reliability mechanisms of TCP are not necessary. The UDP header has only four fields: source port, destination port, length, and UDP checksum.

VxWorks: a real-time operating system, part of the Tornado II embedded development platform commercially available from WindRiver Systems, Inc. of Alameda, Calif., which is designed to enable developers to create complex real-time applications for embedded microprocessors.

TABLE OF CONTENTS

Incorporation by Reference/Priority Claim
Field of the Invention
Background of the Inventor
Summary of the Invention
Brief Description of the Drawings
Detailed Description of the Invention
I. Overview
II. Hardware/Software Architecture
1. Software Architecture Overview
1.1. System Services
1.1.1. SanStreaM (SSM) System Services (S2)

TABLE OF CONTENTS 1.1.2. SSM Application Service (AS)
2. Management Interface Card
2.1. Management Software
2.2. Management Software Overview
2.2.1. User Interfaces (Uis)
2.2.2. Rapid Control Backplane (RBI)
2.2.3. System Abstraction Model (SAM}
2.2.4. Configuration & Statistics Manager (CSM)
2.2.5. Logging I Billing (APis)
2.2.6. Configuration & Statistics Agent (CSA)
2.3. Dynamic Configuration
2.4. Management Applications
2.4.1. Volume Manager
2.4.2. Load Balancer
2.4.3. Server-less Backup (NDMP)
2.4.4. IP-ized Storage Management
2.4.5. Mediation Manager
2.4.6. VLAN Manager
2.4.7. File System Manager
2.5. Virtual Storage Domain (VSD)
2.5.1. Services
2.5.2. Policies
2.6. Boot Sequence and Configuration
3. LIC Software
3.1. VLANs
3.1.1. Intelligent Filtering and Forwarding (IFF)
3.2. Load Balance Data Flow
3.3. LIC-NAS Software
3.3.1. Virtual Storage Domains (VSD)
3.3.2. Network Address Translation (NAT)
3.3.3. Local Load Balance (LLB)
3.3.3.1. Load Balancing Order of Operations
3.3.3.2. File System Server Load Balance (FSLB)
3.3.3.3. NFS Server Load Balancing (NLB)
3.3.3.4. TCP and UDP-Methods of Balancing
3.3.3.5. Write Replication
3.3.4. Load Balancer Failure Indication
3.3.4.1. CIFS Server Load Balancing
3.3.4.2. Content Load Balance
3.4. LIC-SCSI/IP Software
3.5. Network Processor Functionality
3.5.1. Flow Control
3.5.1.1. Flow Definition
3.5.1.2. Flow Control Model
3.5.2. Flow Thru V. Buffering
3.5.2.1. Flow Thru
3.5.2.2. Buffering
4. SRC NAS (Software Features)
4.1. SRC NAS Storage Features
4.1.1. Volume Manager
4.1.2. Disk Cache
4.1.3. SCSI
4.1.4. Fibre Channel
4.1.5. Switch Fabric Interface
4.2. NAS Pirus System Features
4.2.1. Configuration/Statistics.
4.2.2. NSF Load Balancing
4.2.3. NFS Mirroring Service
5. SRC Mediation
5.1. Supported Mediation Protocols
5.1.1. SCSI/UDP
5.2. Storage Components
5.2.1. SCSI/IP Layer
5.2.2. SCSI Mediator
5.2.3. Volume Manager
5.2.4. SCSI Originator
5.2.5. SCSI Target
5.2.6. Fibre Channel
5.3. Mediation Example
III. NFS Load Balancing
1 Operation
1.1. Read Requests
1.2. Determining the Number of Servers for a File
1.3. Server Lists
1.3.1. Single Server List
1.3.2. Multiple Server Lists
1.4. Synchronizing Lists Across Multiple IXP's

TABLE OF CONTENTS

IV. Intelligent Forwarding and Filtering
1. Definitions
2. Virtual Domains
2.1. Network Address Translation
3. VLAN Definition
3.1. Default VLAN
3.2. Server Administration VLAN
3.3. Server Access VLAN
3.4. Port Types
3.4.1. Router Port
3.4.2. Server Port
3.4.3. Combo Port
3.4.4. Server Administration Port
3.4.5. Server Access Port
3.4.6. Example of VLAN
4. Filtering Function
5. Forwarding Function
5.1. Flow Entry Description
5.1.1. Source IP Address
5.1.2. Destination IP Address
5.1.3. Destination TCP/UOP port
5.1.4. Source physical port
5.1.5. Source next-hop MAC address
5.1.6. Destination physical port
5.1.7. Destination next-hop MAC address
5.1.8. NAT IP address
5.1.9. NAT TCP/UDP port
5.1.10. Flags
5.1.11. Received packets
5.1.12. Transmitted packets
5.1.13. Received bytes
5.1.14. Transmitted bytes
5.1.15. Next pointer (receive path)
5.1.16. Next pointer (transmit path)
5.2. Adding Forwarding Entries
5.2.1. Client IP Addresses
5.2.2. Virtual Domain IP Addresses
5.2.3. Server IP Addresses
5.3. Distribute the Forwarding Table
5.4. Ingress Function
6. Egress Function
V. IP-Based Storage Management-Device Discovery & Monitoring
Examples:
Server Health
Mediation Target
Mediation Initiator
NCM
VI DATA STRUCTURE LAYOUT
1. VSD__CFG__T
2. VSE__CFG__T
3. SERVER__CFG__T
4. MED__TARG__CFG__T
5. LUN__MAP CFG__T
6. FILESYS__CFT T
VII. NAS Mirroring and Content Distribution
1. Content Distribution and Mirroring
2. Mirror Initialization via NAS
Mirror Initialization via NDMP
Sparse Content Distribution
NCM
NCM Objectives
NCM Architecture
NCM Processes and Locations
NCM and IPC Services
NCM and lnode Management
lnode Allocation Synchronization
lnode Inconsistency Identification
3. Filesystem Server Sets
3.1. Types
3.2. State of the Current Server Set
4. Description of Operations
Create__Current__Filesystem__Server__Set (fsid, slots/cpus)
Add__Member__To__Current Filesystem__Server__Set (fsid, slot/cpu)
5. Description of Operations that Change the State of the Current Server Set
Activate__Server__Set (fsid)
Pause Filesystem Server Set (fsid)

-continued

TABLE OF CONTENTS

Continue Filesystem Server Set (fsid)
Deactivate_Server_Set (fsid)
6. Recovery Operations on a Filesystem Copy
Construction
Restoration
NAS-FS-Copy
  Construction of Complete Copy
  Copy Method
  Special Inodes
  Locking
  Restoration of Complete Copy
  Data structures
  Modified-Inodes-list (IN-Mod)
    Copy-Inodes-list (IN-Copy)
    Copy progress
    Copying Inodes
    Construction case
  Restoration Case
Examples - Set 1
Examples - Set 2
VIII. System Mediation Manager
Components
Storage Hierarchy
Functional Specification
Functional Requirement
Design
Data Structures
Flow Chart
X. Mediation Caching
XI. Server Health Monitoring
  Operation with Network Access Server (NAS)
  Operation with iSCS/Mediation Devices
Forwarding of NFS Traffic
NFS Read Load Balancing Algorithms
XII. Fast-Path: Description of Illustrated Embodiments
  Fast-Path Architecture
  Fast-Path Functions
  LRC Processing
  SRC processing
  Session creation/termination
  Session Control Blocks
IXP Services
Further Fast Path Aspect

What is claimed is:

1. A digital processing system for processing data packets in at least one data network, comprising:

a storage resource card;

wherein storage resource card includes a first stack for performing a first type of packet processing with a first number of processing steps on data packets received in the at least one network and a second stack for performing a second type of packet processing that comprises a second number of processing steps on data packets received in the at least one network, wherein the second number of processing steps is less than the first number of processing steps;

wherein the storage resource card receives packets and determines whether the received packets correspond to the first type or second type of packet processing, wherein the storage resource card injects packets that correspond to the first type of packet processing into the first stack, and wherein the storage resource card processes packets that correspond to the second type of packet processing according to the second stack.

2. The system of claim 1, wherein the storage resource card determines whether the received packets correspond to the first or second types of packet processing based on Session IDs associated with the received packets.

3. The system of claim 2, wherein the packets requiring exceptions processing are injected into the first stack.

4. The system of claim 1, wherein the storage resource card determines whether the received packets correspond to the first or second types of packet processing based on TCP socket states associated with the received packets.

5. The system of claim 1, wherein the first stack is implemented by a first processor of the storage resource card and the second stack is implemented by a second processor of the storage resource card, and wherein the first and second processors exchange control messages to maintain state synchronization.

6. The system of claim 1, wherein the first stack and the second stack are implemented by a single processor disposed on the storage resource card.

7. A method for processing data packets, comprising:

receiving a data packet at a storage resource card that comprises a first stack for processing data packets according to a slow path and a second stack for processing data packets according to a fast path;

determining whether the data packet is eligible for processing by the second stack; and routing the data packet to the second stack as a function of the packet being eligible for processing by the second stack or routing the data packet to the first stack as a function of the packet being ineligible for processing by the second stack.

8. The method of claim 7, wherein the determining comprises:

extracting a Session ID from the data packet;

using the Session ID to look up socket and TCP control blocks corresponding to the data packet; and examining the socket and TCP control blocks, a TCP header, and an associated Fast-Path connection entry to determine whether the data packet is eligible for processing by the second stack.

9. The method of claim 7, wherein the determining comprises assessing whether the data packet will require exception processing based on at least one of:

an out of order sequence of the data packet in relation to other data packets;

a TCP-atypical flag corresponding to the data packet;

an option associated with the data packet;

an incorrect timestamp associated with the data packet;

data queued in a send buffer of a socket associated with the data packet; and a retransmission requirement.

10. The method of claim 7, wherein the determining comprises sending the data packet directly to an interprocessor communication module, wherein receiving an error code at a socket send routine indicates that the data packet is ineligible for processing by the second stack.

11. The method of claim 7, wherein the data packet is received from an internet exchange point.

12. The method of claim 7, further comprising:

establishing, using the first stack, a TCP connection; and tearing down, using the first stack, the TCP connection.

13. A digital processing system for processing data packets in at least one data network, comprising:

a first stack for performing a first type of packet processing with a first number of processing steps on data packets received in the at least one network; and a second stack for performing a second type of packet processing that comprises a second number of processing steps on data packets received in the at least one network;

wherein the second number of processing steps is less than the first number of processing steps, wherein the system receives packets and determines whether the received packets correspond to the first or second types of packet processing, wherein the system injects packets that correspond to the first type of packet processing into the first stack, wherein the system processes packets that correspond to the second type of packet processing according to the second stack, and wherein the data packets are transmitted from one or both of the first stack and the second stack to one or both of a first storage medium of a first type and a second storage medium of a second type via mediation.

* * * * *

UNITED STATES PATENT AND TRADEMARK OFFICE

CERTIFICATE OF CORRECTION

PATENT NO. : 11,140,084 B2
APPLICATION NO. : 15/488113
DATED : October 5, 2021
INVENTOR(S) : Hall et al.

It is certified that error appears in the above-identified patent and that said Letters Patent is hereby corrected as shown below:

In the Drawings

On sheet 8 of 48, in FIG. 8, under Reference Numeral 834, Line 2, delete “offsitelocation” and insert -- offsite location --, therefor.

On sheet 18 of 48, in FIG. 16, under Reference Numeral 1612, Line 3, delete “MIRRORINGSERVICE” and insert -- MIRRORING SERVICE --, therefor.

On sheet 27 of 48, in FIG. 25A, Line 11, delete “Parmameters” and insert -- Parameters --, therefor.

On sheet 29 of 48, in FIG. 26, under Reference Numeral 2622, Line 1, delete “Updat” and insert -- Update --, therefor.

In the Specification

In Column 1, Line 46, delete “5,941, 972” and insert -- 5,941,972 --, therefor.

In Column 1, Line 47, delete “Network,” and insert -- Networks, --, therefor.

In Column 2, Line 20, delete “internet” and insert -- Internet --, therefor.

In Column 2, Line 35, delete “6,163, 812” and insert -- 6,163,812 --, therefor.

In Column 2, Line 38, delete “Sangate,” and insert -- Sandgate, --, therefor.

In Column 4, Line 33, after “FIG. 9” insert -- . --.

In Column 4, Line 35, after “FIG. 9” insert -- . --.

In Column 4, Line 34, after “FIG. 9” insert -- . --.

Signed and Sealed this
Twenty-third Day of January, 2024

Katherine Kelly Vidal

Katherine Kelly Vidal
*Director of the United States Patent and Trademark Office*

In Column 5, Line 45, delete “salable” and insert -- scalable --, therefor.

In Column 5, Line 51, delete “salable” and insert -- scalable --, therefor.

In Column 6, Line 1, delete “Slows” and insert -- SIO --, therefor.

In Column 6, Line 6, delete “10/100 Base-T” and insert -- 10/100Base-T --, therefor.

In Column 6, Line 11, after “FC-N)” insert -- . --.

In Column 6, Line 14, delete “MlCs"” and insert -- "MICs" --, therefor.

In Column 6, Line 35, delete “virtual service"” and insert -- "virtual service" --, therefor.

In Column 6, Line 52, delete “10/100 Base-T,” and insert -- 10/100Base-T, --, therefor.

In Column 6, Line 56, delete “FISCS)” and insert -- iSCSI --, therefor.

In Column 6, Line 59, delete “SAN"islands"” and insert -- SAN "islands" --, therefor.

In Column 7, Line 32, delete “716,802. 1” and insert -- 716, 802.1 --, therefor.

In Column 7, Line 47, delete “SCSCI” and insert -- SCSI --, therefor.

In Column 7, Line 52, delete “Gigagbit” and insert -- Gigabit --, therefor.

In Column 7, Line 58, delete “FISCS)” and insert -- iSCSI --, therefor.

In Column 7, Line 65, delete “816,802. 1” and insert -- 816, 802.1 --, therefor.

In Column 8, Lines 46-47, delete “while"hiding"” and insert -- while "hiding" --, therefor.

In Column 9, Line 59, delete “to"run” and insert -- to "run --, therefor.

In Column 9, Line 66, delete “(Uls)” and insert -- (UIs) --, therefor.

In Column 10, Line 8, delete “(Uls)” and insert -- (UIs) --, therefor.

In Column 10, Line 14, delete “Uls” and insert -- UIs --, therefor.

In Column 10, Line 21, delete “Uls.” and insert -- UIs. --, therefor.

In Column 11, Line 54, delete “to"accept” and insert -- to "accept --, therefor.

In Column 11, Line 61, delete “and"hide"” and insert -- and "hide" --, therefor.

In Column 12, Line 22, delete “1306,1308,” and insert -- 1306, 1308, --, therefor.

In Column 12, Line 52, delete “r” and insert -- or --, therefor.

In Column 12, Line 53, delete “if” and insert -- "if --, therefor.

In Column 12, Line 53, delete “1.1 1.1” and insert -- 1.1.1.1 --, therefor.

In Column 12, Line 54, delete “2.2. 2. 2” and insert -- 2.2.2.2 --, therefor.

In Column 12, Line 55, delete ““ load” and insert -- “load --, therefor.

In Column 12, Line 56, delete “servers.)” and insert -- servers. --, therefor.

In Column 13, Line 36, delete “802. 1 p” and insert -- 802.1p --, therefor.

In Column 13, Line 36, delete “802. 1 Q” and insert -- 802.1Q --, therefor.

In Column 13, Line 46, delete “VIRUTAL” and insert -- VIRTUAL --, therefor.

In Column 14, Line 13, delete “1.1 1.1” and insert -- 1.1.1.1 --, therefor.

In Column 15, Line 7, delete “100.100. 100. 100” and insert -- 100.100.100.100 --, therefor.

In Column 15, Line 8, delete “1.1. 1.1, 1.1. 1.2” and insert -- 1.1.1.1,1.1.1.2 --, therefor.

In Column 15, Line 8, delete “1.1. 1.3” and insert -- 1.1.1.3 --, therefor.

In Column 16, Line 25, delete “192.32. 1.1” and insert -- 192.32.1.1 --, therefor.

In Column 16, Line 25, delete “(192.32. 1.1,” and insert -- (192.32.1.1, --, therefor.

In Column 16, Line 26, delete “192.32. 1.2,” and insert -- 192.32.1.2, --, therefor.

In Column 16, Line 59, delete “psuedo-proxy” and insert -- pseudo-proxy --, therefor.

In Column 16, Line 64, delete “simples” and insert -- simplest --, therefor.

In Column 17, Line 24, delete “3.3. 3.5” and insert -- 3.3.3.5 --, therefor.

In Column 17, Line 53, delete “15t” and insert -- 1st --, therefor.

In Column 18, Line 38, after “time” insert -- . --.

In Column 20, Line 5, after “mirroring” insert -- . --.

In Column 20, Line 42, delete “4.1. 5 “” and insert -- 4.1.5 --, therefor.

In Column 20, Line 51, delete “4.2. 2” and insert -- 4.2.2 --, therefor.

In Column 21, Line 17, delete “SCSIIUDP” and insert -- SCSI/UDP --, therefor.

In Column 21, Line 38, delete “5.2 2” and insert -- 5.2.2 --, therefor.

In Column 21, Line 60, delete “5.2 5” and insert -- 5.2.5 --, therefor.

In Column 21, Line 65, delete “5.2 6” and insert -- 5.2.6 --, therefor.

In Column 22, Line 18, delete “IXPA” and insert -- IXP^ --, therefor.

In Column 22, Line 20, delete “Target-.” and insert -- Target~. --, therefor.

In Column 22, Line 21, delete “Target-” and insert -- Target~ --, therefor.

In Column 22, Line 27, delete “OriginatorA” and insert -- Originator^ --, therefor.

In Column 22, Line 67, delete “acccessed” and insert -- accessed --, therefor.

In Column 23, Line 18, delete “un-sychronized.” and insert -- unsynchronized. --, therefor.

In Column 23, Line 56, delete “and" Micro-engine"” and insert -- and "Micro-engine" --, therefor.

In Column 23, Line 63, delete “as"load” and insert -- as "load --, therefor.

In Column 23, Line 64, delete “and"content” and insert -- and "content --, therefor.

In Column 23, Line 65, delete “both"Load” and insert -- both "Load --, therefor.

In Column 23, Line 66, delete “and"Content” and insert -- and "Content --, therefor.

In Column 24, Line 1, delete “salable” and insert -- scalable --, therefor.

In Column 24, Line 2, delete “while"hiding"” and insert -- while "hiding" --, therefor.

In Column 27, Line 1, delete “1,2 ,” and insert -- 1,2, --, therefor.

In Column 27, Line 28, delete “to"tie” and insert -- to "tie --, therefor.

In Column 27, Line 61, delete “1.1. 1.1” and insert -- 1.1.1.1 --, therefor.

In Column 27, Line 62, delete “1.1. 1.100.” and insert -- 1.1.1.100. --, therefor.

In Column 27, Line 65, delete “1.1. 1.0/255. 255.255. 0” and insert -- 1.1.1.0/255.255.255.0 --, therefor.

In Column 27, Line 66, delete “1.1. 1.1” and insert -- 1.1.1.1 --, therefor.

In Column 27, Line 67, delete “192.168. 1.100.” and insert -- 192.168.1100. --, therefor.

In Column 28, Line 44, delete “4.4. 1,” and insert -- 4.4.1, --, therefor.

In Column 28, Line 45, delete “4.4. 2,” and insert -- 4.4.2, --, therefor.

In Column 29, Line 45, after “request)” insert -- . --.

In Column 29, Line 66, delete “www. larry.com” and insert -- www.larry.com --, therefor.

In Column 29, Lines 66-67, delete “www. curly. com.” and insert -- www.curly.com. --, therefor.

In Column 30, Line 56, delete “carry"tagged” and insert -- carry "tagged --, therefor.

In Column 30, Line 60, delete “802. 1Q” and insert -- 802.1Q --, therefor.

In Column 30, Line 63, delete “802. 1Q” and insert -- 802.1Q --, therefor.

In Column 31, Line 2, delete “slot number>.” and insert -- <slot number>. --, therefor.

In Column 31, Line 22, delete “1§Server” and insert -- 1 §Server --, therefor.

In Column 31, Line 30, delete “300.1. 1.1” and insert -- 300.1.1.1 --, therefor.

In Column 31, Line 42, delete “1.1. 1.4.” and insert -- 1.1.1.4. --, therefor.

In Column 31, Line 59, after “Internet” insert -- . --.

In Column 32, Line 15, delete “MC” and insert -- MAC --, therefor.

In Column 32, Line 19, delete “No.” and insert -- No. of --, therefor.

In Column 32, Line 21, delete “No.” and insert -- No. of --, therefor.

In Column 32, Line 23, delete “No.” and insert -- No. of --, therefor.

In Column 32, Line 25, delete “No.” and insert -- No. of --, therefor.

In Column 34, Line 6, after “packet” insert -- . --.

In Column 34, Line 10, after “MAC” insert -- address --.

In Column 34, Line 11, after “server” delete “address”.

In Column 34, Line 16, after “used” insert -- . --.

In Column 34, Line 16, delete “Can” and insert -- can --, therefor.

In Column 34, Line 33, after “port” insert -- . --.

In Column 34, Line 41, delete “Can” and insert -- can --, therefor.

In Column 34, Line 41, delete “determined 5.2. 2” and insert -- determined. 5.2.2 --, therefor.

In Column 34, Line 43, delete “www. fred. com)” and insert -- www.fred.com) --, therefor.

In Column 34, Line 44, delete “The"next hop"” and insert -- The "next hop" --, therefor.

In Column 34, Line 57, delete “5.2. 3” and insert -- 5.2.3 --, therefor.

In Column 35, Line 56, delete “www. fred. com)” and insert -- www.fred.com) --, therefor.

In Column 36, Line 13, delete “3:” and insert -- 3. --, therefor.

In Column 37, Line 19, delete “then"ping"” and insert -- then "ping" --, therefor.

In Column 37, Line 25, delete “the"ping"” and insert -- the "ping" --, therefor.

In Column 38, Line 12, delete “CFGT:” and insert -- CFG_T: --, therefor.

In Column 38, Line 12, delete “witha:” and insert -- with a --, therefor.

In Column 38, Line 34, delete “forVSD” and insert -- for VSD --, therefor.

In Column 38, Line 35, after “structure” insert -- . --.

In Column 39, Line 11, delete “VIl.” and insert -- VII. --, therefor.

In Column 39, Line 44, delete “DO” and insert -- IXP --, therefor.

In Column 40, Line 9, delete “server"life"” and insert -- server" life" --, therefor.

In Column 40, Line 10, delete “accept"death” and insert -- accept "death --, therefor.

In Column 40, Line 31, delete “Multiast” and insert -- Multicast --, therefor.

In Column 40, Line 41, delete “Node” and insert -- Inode --, therefor.

In Column 40, Line 44, delete “NC” and insert -- NCM --, therefor.

In Column 40, Line 55, delete “2nd"content"” and insert -- 2nd "content" --, therefor.

In Column 41, Line 8, delete “D) XP” and insert -- IXP --, therefor.

In Column 41, Line 10, delete “fatality” and insert -- fatality. --, therefor.

In Column 41, Lines 43-44, delete “checkpoint checkpoint” and insert -- checkpoint --, therefor.

In Column 42, Line 5, after “fault” insert -- . --.

In Column 42, Line 16, delete “Chckpoint” and insert -- Checkpoint --, therefor.

In Column 42, Line 31, after “Set” insert -- . --.

In Column 43, Line 8, delete “on-line” and insert -- online --, therefor.

In Column 44, Line 7, delete “node” and insert -- Inode --, therefor.

In Column 44, Line 15, delete “lnodes” and insert -- Inodes --, therefor.

In Column 44, Line 17, delete “Similarily” and insert -- Similarly --, therefor.

In Column 44, Line 22, delete “lnodes” and insert -- Inodes --, therefor.

In Column 44, Line 27, before “Best-case,” delete “D”.

In Column 44, Line 35, delete “NAS'crash),” and insert -- NAS' crash), --, therefor.

In Column 44, Line 54, delete “Copy-lnodes” and insert -- Copy-Inodes --, therefor.

In Column 45, Line 18, delete “6.11. 5” and insert -- 6.11.5 --, therefor.

In Column 45, Line 37, delete “6.11. 6” and insert -- 6.11.6 --, therefor.

In Column 46, Line 8, before “NAS” delete “D”.

In Column 46, Line 67, delete “Boxl” and insert -- Box1 --, therefor.

In Column 47, Line 1, delete “Box 2” and insert -- Box2 --, therefor.

In Column 47, Line 1, delete “Boxl” and insert -- Box1 --, therefor.

In Column 47, Line 14, delete “Vol 1” and insert -- Vol1 --, therefor.

In Column 47, Line 14, delete “Vol 5).” and insert -- Vol5). --, therefor.

In Column 47, Line 15, delete “(VLO” and insert -- (VL0 --, therefor.

In Column 47, Line 15, delete “VL 2)” and insert -- (VL2 --, therefor.

In Column 47, Line 16, delete “(VTO” and insert -- (VT0 --, therefor.

In Column 48, Line 1, delete “to"inactivity"” and insert -- to "inactivity" --, therefor.

In Column 48, Line 3, delete “to"max” and insert -- to "max --, therefor.

In Column 48, Line 42, delete “FIG. 9-6.” and insert -- FIGS. 6-9. --, therefor.

In Column 49, Line 24, delete “the"wait” and insert -- the "wait --, therefor.

In Column 49, Line 25, delete “the"wait” and insert -- the "wait --, therefor.

In Column 50, Line 9, delete “that” and insert -- than --, therefor.

In Column 51, Line 37, delete “FISCS)” and insert -- iSCSI --, therefor.

In Column 51, Line 47, delete “NF S” and insert -- NFS --, therefor.

In Column 52, Line 3, after “IXP” insert -- . --.

In Column 52, Line 5, delete “FISCS)” and insert -- iSCSI --, therefor.

In Column 53, Line 16, delete “us” and insert -- use --, therefor.

In Column 54, Line 3, delete “then” and insert -- than --, therefor.

In Column 55, Line 9, delete “2. 5” and insert -- 2.5 --, therefor.

In Column 55, Line 19, delete “portsrt, portdst)” and insert -- port_srt, port_dst) --, therefor.

In Column 55, Line 52, delete “DVC” and insert -- SVC --, therefor.

In Column 57, Line 42, delete “LlC” and insert -- LIC --, therefor.

In Column 57, Line 60, delete “Eth Dryer” and insert -- Eth Drver --, therefor.

In Column 58, Line 6, delete “Seryer” and insert -- Server --, therefor.

In Column 59, Line 67, delete “X. 25,” and insert -- X.25, --, therefor.

In Column 60, Line 12, delete “with)/0” and insert -- with I/O --, therefor.

In Column 60, Line 13, delete “FISCS)” and insert -- iSCSI --, therefor.

In Column 60, Line 16, delete “FISCS)” and insert -- iSCSI --, therefor.

In Column 61, Line 9, delete “(SAM}” and insert -- (SAM) --, therefor.

In Column 61, Line 11, delete “Logging I Billing (APis)” and insert -- Logging/Billing (APIs) --, therefor.

In Column 61, Line 61, delete “1” and insert -- 1. --, therefor.

In Column 62, Line 21, delete “TCP/UOP” and insert -- TCP/UDP --, therefor.

In Column 62, Line 46, delete “MAP CFG” and insert -- MAP_CFG --, therefor.

In Column 62, Line 47, delete “CFT T” and insert -- CFG_T --, therefor.

In Column 62, Line 56, delete “lnode” and insert -- Inode --, therefor.

In Column 62, Line 57, delete “lnode” and insert -- Inode --, therefor.

In Column 62, Line 58, delete “lnode” and insert -- Inode --, therefor.

In Column 63, Line 11, delete “lnode” and insert -- Inodes --, therefor.

In Column 63, Line 14, delete “lnodes” and insert -- Inodes --, therefor.

In Column 63, Line 15, delete “Copy-lnodes” and insert -- Copy-Inodes --, therefor.

In Column 63, Line 17, delete “lnodes” and insert -- Inodes --, therefor.

In the Claims

In Column 63, Line 45, in Claim 1, after “wherein” insert -- the --.